US012407996B2

(12) United States Patent
Binn et al.

(10) Patent No.: US 12,407,996 B2
(45) Date of Patent: *Sep. 2, 2025

(54) SYSTEM AND METHOD FOR PROVIDING A SPATIALIZED SOUNDFIELD

(71) Applicant: Comhear Inc., San Diego, CA (US)

(72) Inventors: Michael Binn, San Diego, CA (US); Jeffrey M. Claar, Aliso Viejo, CA (US); Henry R. Goldansky, Chula Vista, CA (US); James Satloff, New York, NY (US)

(73) Assignee: Com hear inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,841

(22) Filed: Sep. 1, 2023

(65) Prior Publication Data

US 2023/0413004 A1 Dec. 21, 2023

Related U.S. Application Data

(63) Continuation of application No. 17/369,780, filed on Jul. 7, 2021, now Pat. No. 11,750,997.

(60) Provisional application No. 63/049,035, filed on Jul. 7, 2020.

(51) Int. Cl.
*H04S 7/00* (2006.01)
*H04R 1/40* (2006.01)

(52) U.S. Cl.
CPC ............ *H04S 7/303* (2013.01); *H04R 1/403* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 6,243,476 | B1 * | 6/2001 | Gardner | H04S 3/002 381/1 |
| 2013/0121515 | A1 * | 5/2013 | Hooley | H04R 5/02 381/300 |
| 2014/0064526 | A1 * | 3/2014 | Otto | H04R 5/04 381/300 |
| 2015/0193197 | A1 * | 7/2015 | Nahman | G06F 3/011 715/716 |
| 2018/0240471 | A1 * | 8/2018 | Markovich Golan | G10L 21/0232 |
| 2019/0215637 | A1 * | 7/2019 | Lee | H04S 7/304 |
| 2019/0394607 | A1 * | 12/2019 | Laaksonen | H04R 5/04 |
| 2020/0245092 | A1 * | 7/2020 | Badhwar | H04L 67/10 |

(Continued)

*Primary Examiner* — Duc Nguyen
*Assistant Examiner* — Assad Mohammed
(74) *Attorney, Agent, or Firm* — Hoffberg & Associates; Steven M. Hoffberg

(57) ABSTRACT

A signal processing system and method for delivering spatialized sound, comprising: a spatial mapping sensor, configured to map an environment, to determine at least a position of at least one listener and at least one object; a signal processor configured to: transform a received audio program according to a spatialization model comprising parameters defining a head-related transfer function, and an acoustic interaction of the object, to form spatialized audio; generate an array of audio transducer signals for an audio transducer array representing the spatialized audio; and a network port configured to communicate physical state information for the at least one listener through digital packet communication network.

20 Claims, 16 Drawing Sheets

(56) References Cited

U.S. PATENT DOCUMENTS

2021/0281965 A1* 9/2021 Malik .................... H04R 3/005

* cited by examiner

Beamforming Mode polar_0deg_10000Hz 10079.3864 Hz polar_0deg_5000Hz 5039.6842 Hz Binaural Mode Binaural mode

SYSTEM AND METHOD FOR PROVIDING A SPATIALIZED SOUNDFIELD

CROSS REFERENCE TO RELATED APPLICATIONS

The present application is a Continuation of U.S. patent application Ser. No. 17/369,780, filed Jul. 6, 2020, now U.S. Pat. No. 11,750,997, issued Sep. 5, 2023, which is a Non-provisional of, and claims benefit of priority under 35 U.S.C. § 119(e) from, U.S. Provisional Patent Application No. 63/049,035, filed Jul. 7, 2020, the entirety of which are each expressly incorporated herein by reference.

FIELD OF THE INVENTION

The present invention relates to a system and method for spatial analysis of a soundfield, and more particularly to digital signal processing for control of speakers and more particularly to a mapping a soundfield method for spatialized audio.

BACKGROUND OF THE INVENTION

Each reference, patent, patent application, or other specifically identified piece of information is expressly incorporated herein by reference in its entirety, for all purposes.

Spatialized sound is useful for a range of applications, including virtual reality, augmented reality, and modified reality. Such systems generally consist of audio and video devices, which provide three-dimensional perceptual virtual audio and visual objects. A challenge to creation of such systems is how to update the audio signal processing scheme for a non-stationary listener, so that the listener perceives the intended sound image, and especially using a sparse transducer array.

A sound reproduction system that attempts to give a listener a sense of space seeks to make the listener perceive the sound coming from a position where no real sound source may exist. For example, when a listener sits in the "sweet spot" in front of a good two-channel stereo system, it is possible to present a virtual soundstage between the two loudspeakers. If two identical signals are passed to both loudspeakers facing the listener, the listener should perceive the sound as coming from a position directly in front of him or her. If the input is increased to one of the speakers, the virtual sound source will be deviated towards that speaker. This principle is called amplitude stereo, and it has been the most common technique used for mixing two-channel material ever since the two-channel stereo format was first introduced.

However, amplitude stereo cannot itself create accurate virtual images outside the angle spanned by the two loudspeakers. In fact, even in between the two loudspeakers, amplitude stereo works well only when the angle spanned by the loudspeakers is 60 degrees or less.

Virtual source imaging systems work on the principle that they optimize the acoustic waves (amplitude, phase, delay) at the ears of the listener. A real sound source generates certain interaural time- and level differences at the listener's ears that are used by the auditory system to localize the sound source. For example, a sound source to left of the listener will be louder, and arrive earlier, at the left ear than at the right. A virtual source imaging system is designed to reproduce these cues accurately. In practice, loudspeakers are used to reproduce a set of desired signals in the region around the listener's ears. The inputs to the loudspeakers are determined from the characteristics of the desired signals, and the desired signals must be determined from the characteristics of the sound emitted by the virtual source. Thus, a typical approach to sound localization is determining a head-related transfer function (HRTF) which represents the binaural perception of the listener, along with the effects of the listener's head, and inverting the HRTF and the sound processing and transfer chain to the head, to produce an optimized "desired signal". Be defining the binaural perception as a spatialized sound, the acoustic emission may be optimized to produce that sound. For example, then HRTF models the pinna of the ears. Barreto, Armando, and Navarun Gupta. "Dynamic modeling of the pinna for audio spatialization." WSEAS Transactions on Acoustics and Music 1, no. 1 (2004): 77-82.

Typically, a single set of transducers only optimally delivers sound for a single head, and seeking to optimize for multiple listeners requires very high order cancellation so that sounds intended for one listener are effectively cancelled at another listener. Outside of an anechoic chamber, accurate multiuser spatialization is difficult, unless headphones are employed.

Binaural technology is often used for the reproduction of virtual sound images. Binaural technology is based on the principle that if a sound reproduction system can generate the same sound pressures at the listener's eardrums as would have been produced there by a real sound source, then the listener should not be able to tell the difference between the virtual image and the real sound source.

A typical discrete surround-sound system, for example, assumes a specific speaker setup to generate the sweet spot, where the auditory imaging is stable and robust. However, not all areas can accommodate the proper specifications for such a system, further minimizing a sweet spot that is already small. For the implementation of binaural technology over loudspeakers, it is necessary to cancel the cross-talk that prevents a signal meant for one ear from being heard at the other. However, such cross-talk cancellation, normally realized by time-invariant filters, works only for a specific listening location and the sound field can only be controlled in the sweet-spot.

A digital sound projector is an array of transducers or loudspeakers that is controlled such that audio input signals are emitted in a controlled fashion within a space in front of the array. Often, the sound is emitted as a beam, directed into an arbitrary direction within the half-space in front of the array. By making use of carefully chosen reflection paths from room features, a listener will perceive a sound beam emitted by the array as if originating from the location of its last reflection. If the last reflection happens in a rear corner, the listener will perceive the sound as if emitted from a source behind him or her. However, human perception also involves echo processing, so that second and higher reflections should have physical correspondence to environments to which the listener is accustomed, or the listener may sense distortion.

Thus, if one seeks a perception in a rectangular room that the sound is coming from the front left of the listener, the listener will expect a slightly delayed echo from behind, and a further second order reflection from another wall, each being acoustically colored by the properties of the reflective surfaces.

One application of digital sound projectors is to replace conventional discrete surround-sound systems, which typically employ several separate loudspeakers placed at different locations around a listener's position. The digital sound projector, by generating beams for each channel of the surround-sound audio signal, and steering the beams into the appropriate directions, creates a true surround-sound at the listener's position without the need for further loudspeakers or additional wiring. One such system is described in U.S. Patent Publication No. 2009/0161880 of Hooley, et al., the disclosure of which is incorporated herein by reference.

Cross-talk cancellation is in a sense the ultimate sound reproduction problem since an efficient cross-talk canceller gives one complete control over the sound field at a number of "target" positions. The objective of a cross-talk canceller is to reproduce a desired signal at a single target position while cancelling out the sound perfectly at all remaining target positions. The basic principle of cross-talk cancellation using only two loudspeakers and two target positions has been known for more than 30 years. Atal and Schroeder U.S. Pat. No. 3,236,949 (1966) used physical reasoning to determine how a cross-talk canceller comprising only two loudspeakers placed symmetrically in front of a single listener could work. In order to reproduce a short pulse at the left ear only, the left loudspeaker first emits a positive pulse. This pulse must be cancelled at the right ear by a slightly weaker negative pulse emitted by the right loudspeaker. This negative pulse must then be cancelled at the left ear by another even weaker positive pulse emitted by the left loudspeaker, and so on. Atal and Schroeder's model assumes free-field conditions. The influence of the listener's torso, head and outer ears on the incoming sound waves is ignored.

In order to control delivery of the binaural signals, or "target" signals, it is necessary to know how the listener's torso, head, and pinnae (outer ears) modify incoming sound waves as a function of the position of the sound source. This information can be obtained by making measurements on "dummy-heads" or human subjects. The results of such measurements are referred to as "head-related transfer functions", or HRTFs.

HRTFs vary significantly between listeners, particularly at high frequencies. The large statistical variation in HRTFs between listeners is one of the main problems with virtual source imaging over headphones. Headphones offer good control over the reproduced sound. There is no "cross-talk" (the sound does not wrap around the head to the opposite ear), and the acoustical environment does not modify the reproduced sound (room reflections do not interfere with the direct sound). Unfortunately, however, when headphones are used for the reproduction, the virtual image is often perceived as being too close to the head, and sometimes even inside the head. This phenomenon is particularly difficult to avoid when one attempts to place the virtual image directly in front of the listener. It appears to be necessary to compensate not only for the listener's own HRTFs, but also for the response of the headphones used for the reproduction. In addition, the whole sound stage moves with the listener's head (unless head-tracking and sound stage resynthesis is used, and this requires a significant amount of additional processing power). Spatialized Loudspeaker reproduction using linear transducer arrays, on the other hand, provides natural listening conditions but makes it necessary to compensate for cross-talk and also to consider the reflections from the acoustical environment.

The Comhear "MyBeam" line array employs Digital Signal Processing (DSP) on identical, equally spaced, individually powered and perfectly phase-aligned speaker elements in a linear array to produce constructive and destructive interference. See, U.S. Pat. No. 9,578,440. The speakers are intended to be placed in a linear array parallel to the inter-aural axis of the listener, in front of the listener.

Beamforming or spatial filtering is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the array. Adaptive beamforming is used to detect and estimate the signal of interest at the output of a sensor array by means of optimal (e.g., least-squares) spatial filtering and interference rejection.

The Mybeam speaker is active—it contains its own amplifiers and I/O and can be configured to include ambience monitoring for automatic level adjustment, and can adapt its beam forming focus to the distance of the listener, and operate in several distinct modalities, including binaural (transaural), single beam-forming optimized for speech and privacy, near field coverage, far field coverage, multiple listeners, etc. In binaural mode, operating in either near or far field coverage, Mybeam renders a normal PCM stereo music or video signal (compressed or uncompressed sources) with exceptional clarity, a very wide and detailed sound stage, excellent dynamic range, and communicates a strong sense of envelopment (the image musicality of the speaker is in part a result of sample-accurate phase alignment of the speaker array). Running at up to 96K sample rate, and 24-bit precision, the speakers reproduce Hi Res and HD audio with exceptional fidelity. When reproducing a PCM stereo signal of binaurally processed content, highly resolved 3D audio imaging is easily perceived. Height information as well as frontal 180-degree images are well-rendered and rear imaging is achieved for some sources. Reference form factors include 12 speaker, 10 speaker and 8 speaker versions, in widths of ~8 to 22 inches.

A spatialized sound reproduction system is disclosed in U.S. Pat. No. 5,862,227. This system employs z domain filters, and optimizes the coefficients of the filters $H_1(z)$ and $H_2(z)$ in order to minimize a cost function given by $J=E[e_1^2(n)+e_2^2(n)]$, where E[ ] is the expectation operator, and $e_m(n)$ represents the error between the desired signal and the reproduced signal at positions near the head. The cost function may also have a term which penalizes the sum of the squared magnitudes of the filter coefficients used in the filters $H_1(z)$ and $H_2(z)$ in order to improve the conditioning of the inversion problem.

Another spatialized sound reproduction system is disclosed in U.S. Pat. No. 6,307,941. Exemplary embodiments may use, any combination of (i) FIR and/or IIR filters (digital or analog) and (ii) spatial shift signals (e.g., coefficients) generated using any of the following methods: raw impulse response acquisition; balanced model reduction; Hankel norm modeling; least square modeling; modified or unmodified Prony methods; minimum phase reconstruction; Iterative Pre-filtering; or Critical Band Smoothing.

U.S. Pat. No. 9,215,544 relates to sound spatialization with multichannel encoding for binaural reproduction on two loudspeakers. A summing process from multiple channels is used to define the left and right speaker signals.

U.S. Pat. No. 7,164,768 provides a directional channel audio signal processor.

U.S. Pat. No. 8,050,433 provides an apparatus and method for canceling crosstalk between two-channel speakers and two ears of a listener in a stereo sound generation system.

U.S. Pat. Nos. 9,197,977 and 9,154,896 relate to a method and apparatus for processing audio signals to create "4D" spatialized sound, using two or more speakers, with multiple-reflection modelling.

ISO/IEC FCD 23003-2:200x, Spatial Audio Object Coding (SAOC), Coding of Moving Pictures And Audio, ISO/IEC JTC 1/SC 29/WG 11N10843, July 2009, London, UK, discusses stereo downmix transcoding of audio streams from an MPEG audio format. The transcoding is done in two steps: In one step the object parameters (OLD, NRG, IOC, DMG, DCLD) from the SAOC bitstream are transcoded into spatial parameters (CLD, ICC, CPC, ADG) for the MPEG Surround bitstream according to the information of the rendering matrix. In the second step the object downmix is modified according to parameters that are derived from the object parameters and the rendering matrix to form a new downmix signal.

Calculations of signals and parameters are done per processing band m and parameter time slot l. The input signals to the transcoder are the stereo downmix denoted as $$X = x^{n,k} = \begin{pmatrix} l_0^{n,k} \\ r_0^{n,k} \end{pmatrix}.$$

The data that is available at the transcoder is the covariance matrix E, the rendering matrix $M_{ren}$, and the downmix matrix D. The covariance matrix E is an approximation of the original signal matrix multiplied with its complex conjugate transpose, $SS^* \approx E$, where $S=s^{n,k}$. The elements of the matrix E are obtained from the object OLDs and IOCs, $e_{ij}=\sqrt{OLD_i OLD_j} IOC_{ij}$, where $OLD_i^{l,m}=D_{OLD}(i,l,m)$ and $IOC_{ij}^{l,m}=D_{IOC}(i,j,l,m)$. The rendering matrix $M_{ren}$ of size 6×N determines the target rendering of the audio objects S through matrix multiplication $Y=y^{n,k}=M_{ren}S$. The downmix weight matrix D of size 2×N determines the downmix signal in the form of a matrix with two rows through the matrix multiplication X=DS.

The elements $d_{ij}$ (i=1, 2; j=0 . . . N−1) of the matrix are obtained from the dequantized DCLD and DMG parameters $$d_{1j} = 10^{0.05 DMG_j} \sqrt{\frac{10^{0.1 DCLD_j}}{1+10^{0.1 DCLD_j}}},$$

$$d_{2j} = 10^{0.05 DMG_j} \sqrt{\frac{1}{1+10^{0.1 DCLD_j}}},$$

where $DMG_j = D_{DMG}(j, l)$ and $DCLD_j = D_{DCLD}(j, l)$.

The transcoder determines the parameters for the MPEG Surround decoder according to the target rendering as described by the rendering matrix $M_{ren}$. The six-channel target covariance is denoted with F and given by $F=YY^*=M_{ren}S(M_{ren}S)^*=M_{ren}(SS^*)M_{ren}^*=M_{ren}EM_{ren}^*$. The transcoding process can conceptually be divided into two parts. In one part a three-channel rendering is performed to a left, right and center channel. In this stage the parameters for the downmix modification as well as the prediction parameters for the TTT box for the MPS decoder are obtained. In the other part the CLD and ICC parameters for the rendering between the front and surround channels (OTT parameters, left front—left surround, right front—right surround) are determined. The spatial parameters are determined that control the rendering to a left and right channel, consisting of front and surround signals. These parameters describe the prediction matrix of the TTT box for the MPS decoding $C_{TTT}$ (CPC parameters for the MPS decoder) and the downmix converter matrix G. $C_{TTT}$ is the prediction matrix to obtain the target rendering from the modified downmix $\hat{X}=GX$: $C_{TTT}\hat{X}=C_{TTT}GX \approx A_3S$. $A_3$ is a reduced rendering matrix of size 3×N, describing the rendering to the left, right and center channel, respectively. It is obtained as $A_3=D_{36}M_{ren}$ with the 6 to 3 partial downmix matrix $D_{36}$ defined by $$D_{36} = \begin{bmatrix} w_1 & 0 & 0 & 0 & w_1 & 0 \\ 0 & w_2 & 0 & 0 & 0 & w_2 \\ 0 & 0 & w_3 & w_3 & 0 & 0 \end{bmatrix}.$$

The partial downmix weights $w_p$, p=1,2,3 are adjusted such that the energy of $w_p(y_{2p-1}+y_{2p})$ is equal to the sum of energies $\|y_{2p-1}\|^2+\|y_{2p}\|^2$ up to a limit factor.

$$w_1 = \frac{f_{1,1}+f_{5,5}}{f_{1,1}+f_{5,5}+2f_{1,5}},\ w_2 = \frac{f_{2,2}+f_{6,6}}{f_{2,2}+f_{6,6}+2f_{2,6}},\ w_3 = 0.5,$$

where $f_{i,j}$ denote the elements of F. For the estimation of the desired prediction matrix $C_{TTT}$ and the downmix preprocessing matrix G we define a prediction matrix $C_3$ of size 3×2, that leads to the target rendering $C_3X=A_3S$. Such a matrix is derived by considering the normal equations $C_3(DED^*) \approx A_3ED^*$. The solution to the normal equations yields the best possible waveform match for the target output given the object covariance model. G and $C_{TTT}$ are now obtained by solving the system of equations $C_{TTT}G=C_3$. To avoid numerical problems when calculating the term $J=(DED^*)^{-1}$, J is modified. First the eigenvalues $\lambda^{1,2}$ of J are calculated, solving $\det(J-\lambda_{1,2}I)=0$ Eigenvalues are sorted in descending ($\lambda_1 \geq \lambda_2$) order and the eigenvector corresponding to the larger eigenvalue is calculated according to the equation above. It is assured to lie in the positive x-plane (first element has to be positive). The second eigenvector is obtained from the first by a −90 degrees rotation:

$$J = (v_1 v_2)\begin{pmatrix} \lambda_1 & 0 \\ 0 & \lambda_2 \end{pmatrix}(v_1 v_2)^*.$$

A weighting matrix $W=(D\cdot \mathrm{diag}(C_3))$ is computed from the downmix matrix D and the prediction matrix $C_3$. Since $C_{TTT}$ is a function of the MPEG Surround prediction parameters $c_1$ and $c_2$ (as defined in ISO/IEC 23003-1:2007), $C_{TTT}G=C_3$ is rewritten in the following way, to find the stationary point or points of the function, $$\Gamma\begin{pmatrix} \tilde{c}_1 \\ \tilde{c}_2 \end{pmatrix} = b,$$

with $\delta=(D_{TTT}C_3)W(D_{TTT}C_3)^*$ and $b=GWC_3v$, where $$D_{TTT} = \begin{pmatrix} 1 & 0 & 1 \\ 0 & 1 & 1 \end{pmatrix}$$

and v=(1 1 −1). If Γ does not provide a unique solution ($\det(\Gamma)<10^{-3}$), the point is chosen that lies closest to the point resulting in a TTT pass through. As a first step, the row i of $\Gamma$ is chosen $\gamma=[\gamma_{i,1}\ \gamma_{i,2}]$ where the elements contain most energy, thus $\gamma_{i,1}^2+\gamma_{i,2}^2\geq\gamma_{j,1}^2+\gamma_{j,2}^2$, j=1,2. Then a solution is determined such that $$\begin{pmatrix}\tilde{c}_1\\ \tilde{c}_2\end{pmatrix}=\begin{pmatrix}1\\ 1\end{pmatrix}-3y \text{ with } y=\frac{b_{i,3}}{\left(\sum_{j=1,2}(\gamma_{i,j})^2\right)+\varepsilon}\gamma^T.$$

If the obtained solution for $\tilde{c}_1$ and $\tilde{c}_2$ is outside the allowed range for prediction coefficients that is defined as $-2\leq\tilde{c}_j\leq 3$ (as defined in ISO/IEC 23003-1:2007), $\tilde{c}_j$ are calculated as follows. First define the set of points, $x_\rho$ as:

$$x_p\in\left\{\begin{pmatrix}\min\left(3,\max\left(-2,-\frac{-2\gamma_{12}-b_1}{\gamma_{11}+\varepsilon}\right)\right)\\ -2\end{pmatrix},\begin{pmatrix}\min\left(3,\max\left(-2,-\frac{3\gamma_{12}-b_1}{\gamma_{11}+\varepsilon}\right)\right)\\ 3\end{pmatrix},\begin{pmatrix}-2\\ \min\left(3,\max\left(-2,-\frac{-2\gamma_{21}-b_2}{\gamma_{22}+\varepsilon}\right)\right)\end{pmatrix},\begin{pmatrix}3\\ \min\left(3,\max\left(-2,-\frac{3\gamma_{21}-b_2}{\gamma_{22}+\varepsilon}\right)\right)\end{pmatrix}\right\},$$

and the distance function, $\text{distFunc}(x_\rho)=x_\rho{}^*\Gamma x_{\rho 1}-2bx_\rho$.

Then the prediction parameters are defined according to:

$$\begin{pmatrix}\tilde{c}_1\\ \tilde{c}_2\end{pmatrix}=\arg\min_{x\in x_p}(distFunc(x)).$$

The prediction parameters are constrained according to: $c_1=(1-\lambda)\tilde{c}_1+\lambda\gamma_1$, $c_2=(1-\lambda)\tilde{c}_2+\lambda\gamma_2$, where $\lambda$, $\gamma_1$ and $\gamma_2$ are defined as $$\gamma_1=\frac{2f_{1,1}+2f_{5,5}-f_{3,3}+f_{1,3}+f_{5,3}}{2f_{1,1}+2f_{5,5}+2f_{3,3}+4f_{1,3}+4f_{5,3}},$$

$$\gamma_2=\frac{2f_{2,2}+2f_{6,6}-f_{3,3}+f_{2,3}+f_{6,3}}{2f_{2,2}+2f_{6,6}+2f_{3,3}+4f_{2,3}+4f_{6,3}},$$

$$\lambda=\left(\frac{(f_{1,2}+f_{1,6}+f_{5,2}+f_{5,6}+f_{1,3}+f_{5,3}+f_{2,3}+f_{6,3}+f_{3,3})^2}{(f_{1,1}+f_{5,5}+f_{3,3}+2f_{1,3}+2f_{5,3})(f_{2,2}+f_{6,6}+f_{3,3}+2f_{2,3}+2f_{6,3})}\right)^8.$$

For the MPS decoder, the CPCs are provided in the form $D_{CPC\_1}=c_1(l,m)$ and $D_{CPC\_2}=c_2(l,m)$. The parameters that determine the rendering between front and surround channels can be estimated directly from the target covariance matrix F $$CLD_{a,b}=10\log_{10}\left(\frac{f_{a,a}}{f_{b,b}}\right),\ ICC_{a,b}+\frac{f_{a,b}}{\sqrt{f_{a,a}f_{b,b}}},$$

with (a,b)=(1,2) and (3,4).

The MPS parameters are provided in the form $CLD_h^{l,m}=D_{CLD}(h,l,m)$ and $ICC_h^{l,m}=D_{ICC}(h,l,m)$, for every OTT box h.

The stereo downmix X is processed into the modified downmix signal $\tilde{X}$: $\tilde{X}=GX$, where $G=D_{TTT}C_3=D_{TTT}M_{ren}ED^*J$. The final stereo output from the SAOC transcoder $\tilde{X}$ is produced by mixing X with a decorrelated signal component according to: $\hat{X}=G_{Mod}X+P_2X_d$, where the decorrelated signal $X_d$ is calculated as noted herein, and the mix matrices $G_{Mod}$ and $P_2$ according to below.

First, define the render upmix error matrix as $R=A_{diff}EA_{diff}^*$, where $A_{diff}=D_{TTT}A_3-GD$, and moreover define the covariance matrix of the predicted signal $\hat{R}$ as $$\hat{R}=\begin{pmatrix}\hat{r}_{11}&\hat{r}_{12}\\ \hat{r}_{21}&\hat{r}_{22}\end{pmatrix}=GDED^*G^*.$$

The gain vector $g_{vec}$ can subsequently be calculated as:

$$g_{vec}=\left(\min\left(\sqrt{\frac{r_{\hat{o}11}+r_{11}+\varepsilon}{r_{11}+\varepsilon}},1.5\right)\min\left(\sqrt{\frac{r_{\hat{o}22}+r_{22}+\varepsilon}{r_{22}+\varepsilon}},1.5\right)\right)$$

and the mix matrix $G_{Mod}$ will be given as $$G_{Mod}=\begin{cases}\text{diag}(g_{vec})G, & r_{12}>0,\\ G, & \text{otherwise.}\end{cases}$$

Similarly, the mix matrix $P_2$ is given as:

$$P_2=\begin{cases}\begin{pmatrix}0&0\\ 0&0\end{pmatrix}, & r_{12}>0,\\ v_R\text{diag}(W_d), & \text{otherwise.}\end{cases}$$

To derive $v_R$ and $W_d$, the characteristic equation of R needs to be solved: $\det(R-\lambda_{1,2}I)=0$, giving the eigenvalues, $\lambda_1$ and $\lambda_2$. The corresponding eigenvectors $V_{R1}$ and $V_{R2}$ of R can be calculated solving the equation system: $(R-\lambda_{1,2}I)v_{R1,R2}=0$. Eigenvalues are sorted in descending $(\lambda_1\geq\lambda_2)$ order and the eigenvector corresponding to the larger eigenvalue is calculated according to the equation above. It is assured to lie in the positive x-plane (first element has to be positive). The second eigenvector is obtained from the first by a −90 degrees rotation:

$$R=(v_{R1}v_{R2})\begin{pmatrix}\lambda_1&0\\ 0&\lambda_2\end{pmatrix}(v_{R1}v_{R2})^*.$$

Incorporating $P_1=(1\ 1)G$, $R_d$ can be calculated according to:

$$R_d=\begin{pmatrix}r_{d11}&r_{d12}\\ r_{d21}&r_{d22}\end{pmatrix}=\text{diag}(P_1(DED^*)P_1^*),$$

which gives:

$$\begin{cases} w_{d1} = \min\left(\sqrt{\frac{\lambda_1}{r_{d1}+\varepsilon}}, 2\right), \\ w_{d2} = \min\left(\sqrt{\frac{\lambda_2}{r_{d2}+\varepsilon}}, 2\right), \end{cases}$$

and finally, the mix matrix, $$P_2 = \begin{pmatrix} v_{R1} & v_{R2} \end{pmatrix}\begin{pmatrix} w_{d1} & 0 \\ 0 & w_{d2} \end{pmatrix}.$$

The decorrelated signals $x_d$ are created from the decorrelator described in ISO/IEC 23003-1:2007. Hence, the decorrFunc( ) denotes the decorrelation process:

$$X_d = \begin{pmatrix} x_{1d} \\ x_{2d} \end{pmatrix} = \begin{pmatrix} decorrFunc((1\ \ 0)P_1X) \\ decorrFunc((0\ \ 1)P_1X) \end{pmatrix}.$$

The SAOC transcoder can let the mix matrices $P_1$, $P_2$ and the prediction matrix $C_3$ be calculated according to an alternative scheme for the upper frequency range. This alternative scheme is particularly useful for downmix signals where the upper frequency range is coded by a non-waveform preserving coding algorithm e.g. SBR in High Efficiency AAC. For the upper parameter bands, defined by bsTttBandsLow≤pb<numBands, $P_1$, $P_2$ and $C_3$ should be calculated according to the alternative scheme described below:

$$\begin{cases} P_1 = \begin{pmatrix} 0 & 0 \\ 0 & 0 \end{pmatrix}, \\ P_2 = G. \end{cases}$$

Define the energy downmix and energy target vectors, respectively:

$$\begin{cases} e_{dmx} = \begin{pmatrix} e_{dmx1} \\ e_{dmx2} \end{pmatrix} = \mathrm{diag}(DED^*) + \varepsilon I, \\ e_{tar} = \begin{pmatrix} e_{tar1} \\ e_{tar2} \\ e_{tar3} \end{pmatrix} = \mathrm{diag}(A_3EA_3^*), \end{cases}$$

and the help matrix $$T = \begin{pmatrix} t_{11} & t_{12} \\ t_{21} & t_{22} \\ t_{31} & t_{32} \end{pmatrix} = A_3D^* + \varepsilon I.$$

Then calculate the gain vector $$g = \begin{pmatrix} g_1 \\ g_2 \\ g_3 \end{pmatrix} = \begin{pmatrix} \sqrt{\frac{e_{tar1}}{t_{11}^2 e_{dmx1} + t_{12}^2 e_{dmx2}}} \\ \sqrt{\frac{e_{tar2}}{t_{21}^2 e_{dmx1} + t_{22}^2 e_{dmx2}}} \\ \sqrt{\frac{e_{tar3}}{t_{31}^2 e_{dmx1} + t_{32}^2 e_{dmx2}}} \end{pmatrix},$$

which finally gives the new prediction matrix $$C_3 = \begin{pmatrix} g_1t_{11} & g_1t_{12} \\ g_2t_{21} & g_2t_{22} \\ g_3t_{31} & g_3t_{32} \end{pmatrix}.$$

For the decoder mode of the SAOC system, the output signal of the downmix preprocessing unit (represented in the hybrid QMF domain) is fed into the corresponding synthesis filterbank as described in ISO/IEC 23003-1:2007 yielding the final output PCM signal. The downmix preprocessing incorporates the mono, stereo and, if required, subsequent binaural processing.

The output signal $\hat{X}$ is computed from the mono downmix signal $\hat{X}$ and the decorrelated mono downmix signal $X_d$ as $\hat{X}=GX+P_2X_d$. The decorrelated mono downmix signal $X_d$ is computed as $X_d$=decorrFunc(X). In case of binaural output the upmix parameters G and $P_2$ derived from the SAOC data, rendering information and Head-Related Transfer Function (HRTF) parameters are applied to the downmix signal X (and $X_d$) yielding the binaural output $\hat{X}$. The target binaural rendering matrix $A^{l,m}$ of size 2×N consists of the elements $a_{x,y}^{l,m}$. Each element $a_{x,y}^{l,m}$ is derived from HRTF parameters and rendering matrix $M_{ren}^{l,m}$ with elements $m_{i,y}^{l,m}$. The target binaural rendering matrix $A^{l,m}$ represents the relation between all audio input objects y and the desired binaural output.

$$a_{1,y}^{l,m} = \sum_{i=0}^{N_{HRTF}-1} m_{i,y}^{l,m} P_{i,L}^m \exp\left(j\frac{\phi_i^m}{2}\right),$$

$$a_{2,y}^{l,m} = \sum_{i=0}^{N_{HRTF}-1} m_{i,y}^{l,m} P_{i,R}^m \exp\left(-j\frac{\phi_i^m}{2}\right).$$

The HRTF parameters are given by $P_{i,L}^m$, $P_{i,R}^m$ and $\phi_i^m$ for each processing band m. The spatial positions for which HRTF parameters are available are characterized by the index i. These parameters are described in ISO/IEC 23003-1:2007.

The upmix parameters $G^{l,m}$ and $P_2^{l,m}$ are computed as $$G^{l,m} = \begin{pmatrix} P_L^{l,m}\exp\left(j\frac{\phi_C^{l,m}}{2}\right)\cos(\beta^{l,m}+\alpha^{l,m}) \\ P_R^{l,m}\exp\left(-j\frac{\phi_C^{l,m}}{2}\right)\cos(\beta^{l,m}-\alpha^{l,m}) \end{pmatrix},$$

$$\text{and } P_2^{l,m} = \begin{pmatrix} P_L^{l,m}\exp\left(j\frac{\phi_C^{l,m}}{2}\right)\sin(\beta^{l,m}+\alpha^{l,m}) \\ P_R^{l,m}\exp\left(-j\frac{\phi_C^{l,m}}{2}\right)\sin(\beta^{l,m}-\alpha^{l,m}) \end{pmatrix}.$$

The gains $P_L^{l,m}$ and $P_R^{l,m}$ for the left and right output channels are $$P_L^{l,m} = \sqrt{\frac{f_{1,1}^{l,m}}{v^{l,m}}}, \text{ and } P_R^{l,m} = \sqrt{\frac{f_{2,2}^{l,m}}{v^{l,m}}}.$$

The desired covariance matrix $F^{l,m}$ of size 2×2 with elements $f_{i,j}^{l,m}$ is given as $F^{l,m}=A^{l,m}E^{l,m}(A^{l,m})$. The scalar $v^{l,m}$ is computed as $v^{l,m}=D^lE^{l,m}(D^l)^*+\varepsilon$. The downmix matrix $D^l$ of size 1×N with elements $d_j^l$ can be found as $d_j^l=10^{0.05\ DMG_j^l}$.

The matrix $E^{l,m}$ with elements $e_{ij}^{l,m}$ are derived from the following relationship $e_{ij}^{l,m}=\sqrt{OLD_i^{l,m}OLD_j^{l,m}}\max(IOC_{ij}^{l,m},0)$. The inter channel phase difference $\phi_C^{l,m}$ is given as $$\phi_C^{l,m} = \begin{cases} \arg(f_{1,2}^{l,m}), & 0 \le m \le 11,\ \rho_C^{l,m} \ge 0.6, \\ 0, & \text{otherwise.} \end{cases}$$

The inter channel coherence $\rho_C^{l,m}$ is computed as $$\rho_C^{l,m} = \min\left(\frac{|f_{1,2}^{l,m}|}{\sqrt{f_{1,1}^{l,m} f_{2,2}^{l,m}}}, 1\right).$$

The rotation angles $\alpha^{l,m}$ and $\beta^{l,m}$ are given as $$\alpha^{l,m} = \begin{cases} \frac{1}{2}\arccos(\rho_C^{l,m}\cos(\arg(f_{1,2}^{l,m}))), & 0 \le m \le 11,\ \rho_C^{l,m} < 0.6, \\ \frac{1}{2}\arccos(\rho_C^{l,m}), & \text{otherwise.} \end{cases}$$

$$\beta^{l,m} = \arctan\left(\tan(\alpha^{l,m})\frac{P_R^{l,m} - P_L^{l,m}}{P_L^{l,m} + R_R^{l,m} + \varepsilon}\right).$$

In case of stereo output, the "x-1-b" processing mode can be applied without using HRTF information. This can be done by deriving all elements $a_{x,y}^{l,m}$ of the rendering matrix A, yielding: $a_{1,y}^{l,m}=m_{Lf,y}^{l,m}$, $a_{2,y}^{l,m}=m_{Lf,y}^{l,m}$. In case of mono output the "x-1-2" processing mode can be applied with the following entries: $a_{1,y}^{l,m}=m_{C,y}^{l,m}$, $a_{2,y}^{l,m}=0$ In a stereo to binaural "x-2-b" processing mode, the upmix parameters $G^{l,m}$ and $P_2^{l,m}$ are computed as $$G^{l,m} = \begin{pmatrix} P_L^{l,m,1}\exp\left(j\frac{\phi^{l,m,1}}{2}\right)\cos(\beta^{l,m}+\alpha^{l,m}) & P_L^{l,m,2}\exp\left(j\frac{\phi^{l,m,2}}{2}\right)\cos(\beta^{l,m}+\alpha^{l,m}) \\ P_R^{l,m,1}\exp\left(-j\frac{\phi^{l,m,1}}{2}\right)\cos(\beta^{l,m}-\alpha^{l,m}) & P_R^{l,m,2}\exp\left(-j\frac{\phi^{l,m,2}}{2}\right)\cos(\beta^{l,m}-\alpha^{l,m}) \end{pmatrix},$$

$$P_2^{l,m} = \begin{pmatrix} P_L^{l,m}\exp\left(j\frac{\arg(c_{12}^{l,m})}{2}\right)\sin(\beta^{l,m}+\alpha^{l,m}) \\ P_R^{l,m}\exp\left(-j\frac{\arg(c_{12}^{l,m})}{2}\right)\sin(\beta^{l,m}-\alpha^{l,m}) \end{pmatrix}.$$

The corresponding gains $P_L^{l,m,x}$, $P_R^{l,m,x}$ and $P_L^{l,m}$, $P_R^{l,m}$ for the left and right output channels are $$P_L^{l,m,x} = \sqrt{\frac{f_{1,1}^{l,m,x}}{v^{l,m,x}}},\ P_R^{l,m,x} = \sqrt{\frac{f_{2,2}^{l,m,x}}{v^{l,m,x}}},\ P_L^{l,m} = \sqrt{\frac{c_{1,1}^{l,m}}{v^{l,m}}},\ P_R^{l,m} = \sqrt{\frac{c_{2,2}^{l,m}}{v^{l,m}}}.$$

The desired covariance matrix $F^{l,m,x}$ of size 2×2 with elements $f_{u,v}^{l,m,x}$ is given as $F^{l,m,x}=A^{l,m,x}E^{l,m,x}(A^{l,m})^*$. The covariance matrix $C^{l,m}$ of size 2×2 with elements $c_{u,v}^{l,m}$ of the dry binaural signal is estimated as $C^{l,m}=\tilde{G}^{l,m}D^lE^{l,m}(D^l)^*(\tilde{G}^{l,m})^*$, where $$\tilde{G}^{l,m} = \begin{pmatrix} P_L^{l,m,1}\exp\left(j\frac{\phi^{l,m,1}}{2}\right) & P_L^{l,m,2}\exp\left(j\frac{\phi^{l,m,2}}{2}\right) \\ P_R^{l,m,1}\exp\left(-j\frac{\phi^{l,m,1}}{2}\right) & P_R^{l,m,2}\exp\left(-j\frac{\phi^{l,m,2}}{2}\right) \end{pmatrix}.$$

The corresponding scalars $v^{l,m,x}$ and $v^{l,m}$ are computed as $v^{l,m,x}=D^{l,x}E^{l,m}(D^{l,x})^*+\varepsilon$, $v^{l,m}=(D^{l,1}+D^{l,2})E^{l,m}(D^{l,1}+D^{l,2})^*+\varepsilon$.

The downmix matrix $D^{l,x}$ of size 1×N with elements $d_i^{l,x}$ can be found as $$d_i^{l,1} = 10^{0.05\,DMG_i^l}\sqrt{\frac{10^{0.1\,DCLD_i^l}}{1+10^{0.1\,DCLD_i^l}}},$$

$$d_i^{l,2} = 10^{0.05\,DMG_i^l}\sqrt{\frac{1}{1+10^{0.1\,DCLD_i^l}}}.$$

The stereo downmix matrix $D^l$ of size 2×N with elements $d_{x,i}^l$ can be found as $d_{x,i}^l=d_i^{l,x}$.

The matrix $E^{l,m,x}$ with elements $e_{ij}^{l,m,x}$ are derived from the following relationship $$e_{ij}^{l,m,x} = e_{ij}^{l,m}\left(\frac{d_i^{l,x}}{d_i^{l,1}+d_i^{l,2}}\right)\left(\frac{d_j^{l,x}}{d_j^{l,1}+d_j^{l,2}}\right).$$

The matrix with $E^{l,m}$ elements $e_{ij}^{l,m}$ are given as $e_{ij}^{l,m}=\sqrt{OLD_i^{l,m}OLD_j^{l,m}}\max(IOC_{ij}^{l,m},0)$.

The inter channel phase differences $\phi_C^{l,m}$ are given as $$\phi^{l,m,x} = \begin{cases} \arg(f_{1,2}^{l,m,x}), & 0 \le m \le 11,\ \rho_C^{l,m} > 0.6, \\ 0, & \text{otherwise.} \end{cases}$$

The ICCs $\rho_C^{l,m}$ and $\rho_T^{l,m}$ are computed as $$\rho_T^{l,m} = \min\left(\frac{|f_{1,2}^{l,m}|}{\sqrt{f_{1,1}^{l,m} f_{2,2}^{l,m}}}, 1\right),$$

$$\rho_c^{l,m} = \min\left(\frac{|c_{12}^{l,m}|}{\sqrt{c_{11}^{l,m} - c_{22}^{l,m}}}, 1\right).$$

The rotation angles $\alpha^{l,m}$ and $\beta^{l,m}$ are given as $$\alpha^{l,m} = \frac{1}{2}\left(\arccos\left(\rho_T^{l,m}\right) - \arccos\left(\rho_c^{l,m}\right)\right),$$

$$\beta^{l,m} = \frac{1}{2}\arctan\left(\tan\left(\alpha^{l,m}\right)\frac{P_R^{l,m} - P_L^{l,m}}{P_L^{l,m} + P_R^{l,m}}\right).$$

In case of stereo output, the stereo preprocessing is directly applied as described above. In case of mono output, the MPEG SAOC system the stereo preprocessing is applied with a single active rendering matrix entry $M_{ren}^{l,m} = (m_{0,Lf}^{l,m}, \ldots, m_{N-1,Lf}^{l,m})$.

The audio signals are defined for every time slot n and every hybrid subband k. The corresponding SAOC parameters are defined for each parameter time slot l and processing band m. The subsequent mapping between the hybrid and parameter domain is specified by Table A.31, ISO/IEC 23003-1:2007. Hence, all calculations are performed with respect to the certain time/band indices and the corresponding dimensionalities are implied for each introduced variable. The OTN/TTN upmix process is represented either by matrix M for the prediction mode or $M_{Energy}$ for the energy mode. In the first case M is the product of two matrices exploiting the downmix information and the CPCs for each EAO channel. It is expressed in "parameter-domain" by $M = A\tilde{D}^{-1}C$, where $\tilde{D}^{-1}$ is the inverse of the extended downmix matrix $\tilde{D}$ and C implies the CPCs. The coefficients $m_j$ and $n_j$ of the extended downmix matrix $\tilde{D}$ denote the downmix values for every EAO j for the right and left downmix channel as $m_j = d_{1,EAO(j)}$, $n = d_{2,EAO(j)}$.

In case of a stereo, the extended downmix matrix $\tilde{D}$ is $$\tilde{D} = \begin{pmatrix} 1 & 0 & m_0 & \ldots & m_{N_{EAO}-1} \\ 0 & 1 & n_0 & \ldots & n_{N_{EAO}-1} \\ m_0 & n_0 & -1 & \ldots & 0 \\ \vdots & \vdots & 0 & \ddots & \vdots \\ m_{N_{EAO}-1} & n_{N_{EAO}-1} & 0 & \ldots & -1 \end{pmatrix},$$

and for a mono, it becomes $$\tilde{D} = \begin{pmatrix} 1 & m_0 & \ldots & m_{N_{EAO}-1} \\ 1 & n_0 & \ldots & n_{N_{EAO}-1} \\ m_0 + n_0 & -1 & \ldots & 0 \\ \vdots & 0 & \ddots & \vdots \\ m_{N_{EAO}-1} + n_{N_{EAO}-1} & 0 & \ldots & -1 \end{pmatrix}.$$

With a stereo downmix, each EAO j holds two CPCs $c_{j,0}$ and $c_{j,1}$ yielding matrix C $$C = \begin{pmatrix} 1 & 0 & 0 & \ldots & 0 \\ 0 & 1 & 0 & \ldots & 0 \\ c_{0,0} & c_{0,1} & 1 & \ldots & 0 \\ \vdots & \vdots & \vdots & \ddots & \vdots \\ c_{N_{EAO}-1,0} & c_{N_{EAO}-1,1} & 0 & \ldots & 1 \end{pmatrix}.$$

The CPCs are derived from the transmitted SAOC parameters, i.e., the OLDs, IOCs, DMGs and DCLDs. For one specific EAO channel $j = 0 \ldots N_{EAO}-1$ the CPCs can be estimated by $$\tilde{c}_{j,0} = \frac{P_{LoCo,j}P_{Ro} - P_{RoCo,j}P_{LoRo}}{P_{Lo}P_{Ro} - P_{LoRo}^2},$$

$$\tilde{c}_{j,1} = \frac{P_{RoCo,j}P_{Lo} - P_{LoCo,j}P_{LoRo}}{P_{Lo}P_{Ro} - P_{LoRo}^2}.$$

In the following description of the energy quantities $P_{Lo}$, $P_{Ro}$, $P_{LoRo}$, $P_{LoCo,j}$ and $P_{RoCo,j}$.

$$P_{Lo} = OLD_L + \sum_{j=0}^{N_{EAO}-1}\sum_{k=0}^{N_{EAO}-1} m_j m_k e_{j,k},$$

$$P_{Ro} = OLD_R + \sum_{j=0}^{N_{EAO}-1}\sum_{k=0}^{N_{EAO}-1} n_j n_k e_{j,k},$$

$$P_{LoRo} = e_{L,R} + \sum_{j=0}^{N_{EAO}-1}\sum_{k=0}^{N_{EAO}-1} m_j n_k e_{j,k},$$

$$P_{LoCo,j} = m_j OLD_L + n_j e_{L,R} - m_j OLD_j - \sum_{\substack{i=0\\ i\neq j}}^{N_{EAO}-1} m_i e_{i,j},$$

$$P_{RoCo,j} = n_j OLD_R + m_j e_{L,R} - n_j OLD_j - \sum_{\substack{i=0\\ i\neq j}}^{N_{EAO}-1} n_i e_{i,j}.$$

The parameters $OLD_L$, $OLD_R$ and $IOC_{LR}$ correspond to the regular objects and can be derived using downmix information:

$$OLD_L = \sum_{i=0}^{N-N_{EAO}-1} d_{0,i}^2 OLD_i,$$

$$OLD_R = \sum_{i=0}^{N-N_{EAO}-1} d_{1,i}^2 OLD_i,$$

$$IOC_{LR} = \begin{cases} IOC_{0,1}, & N - N_{EAO} = 2, \\ 0, & \text{otherwise.} \end{cases}$$

The CPCs are constrained by the subsequent limiting functions:

$$\gamma_{j,1} = \frac{m_j OLD_L + n_j e_{L,J} - \sum_{i=0}^{N_{EAO}-1} m_i e_{i,j}}{2\left(OLD_L + \sum_{i=0}^{N_{EAO}-1}\sum_{k=0}^{N_{EAO}-1} m_i m_k e_{i,k}\right)},$$

$$\gamma_{j,2} = \frac{n_j OLD_R + m_j e_{L,R} - \sum_{t-0}^{N_{EAO}-1} n_i e_{i,j}}{2\left(OLD_L + \sum_{i=0}^{N_{EAO}-1}\sum_{k=0}^{N_{EAO}-1} m_i n_k e_{i,k}\right)}.$$

With the weighting factor $$\lambda=\left(\frac{P_{LoRo}^2}{P_{Lo}P_{Ro}}\right)^8.$$

The constrained CPCs become $c_{j,0}=(1-\lambda)\tilde{c}_{j,0}+\lambda\gamma_{j,0}$, $c_{j,1}=(1-\lambda)\tilde{c}_{j,1}+\lambda\gamma_{j,1}$.

The output of the TTN element yields $$Y=\begin{pmatrix} y_L \\ y_R \\ \hline Y_{0,EAO} \\ \vdots \\ Y_{N_{EAO}-1},\ EAO \end{pmatrix}=MX=A\tilde{D}^{-1}C\begin{pmatrix} l_0 \\ r_0 \\ \hline res_0 \\ \vdots \\ res_{N_{EAO}-1} \end{pmatrix},$$

where X represents the input signal to the SAOC decoder/transcoder.

In case of a stereo, the extended downmix matrix $\tilde{D}$ matrix is $$\tilde{D}=\begin{pmatrix} 1 & 1 & m_0 & \ldots & m_{N_{EAO}-1} \\ m_0/2 & m_0/2 & -1 & \ldots & 0 \\ \vdots & \vdots & 0 & \ddots & \vdots \\ m_{N_{EAO}-1}/2 & m_{N_{EAO}-1}/2 & 0 & \ldots & -1 \end{pmatrix},$$

and for a mono, it becomes $$\tilde{D}=\begin{pmatrix} 1 & m_0 & \ldots & m_{N_{EAO}-1} \\ m_0 & -1 & \ldots & 0 \\ \vdots & 0 & \ddots & \vdots \\ m_{N_{EAO}-1} & 0 & \ldots & -1 \end{pmatrix}.$$

With a mono downmix, one EAO j is predicted by only one coefficient $c_j$ yielding $$C=\begin{pmatrix} 1 & 0 & \ldots & 0 \\ c_0 & 1 & \ldots & 0 \\ \vdots & 0 & \ddots & \vdots \\ c_{N_{EAO}-1} & 0 & \ldots & 1 \end{pmatrix}.$$

All matrix elements $c_j$ are obtained from the SAOC parameters according to the relationships provided above. For the mono downmix case the output signal Y of the OTN element yields:

$$Y=M\begin{pmatrix} d_0 \\ res_0 \\ \vdots \\ res_{N_{EAO}-1} \end{pmatrix}.$$

In case of a stereo, the matrix $M_{Energy}$ are obtained from the corresponding OLDs according to:

$$M_{Energy}=A\begin{pmatrix} \sqrt{\frac{\mathrm{OLD}_L}{\mathrm{OLD}_L+\sum_{i=0}^{N_{EAO}-1}m_i^2\mathrm{OLD}_i}} & 0 \\ 0 & \sqrt{\frac{\mathrm{OLD}_R}{\mathrm{OLD}_R+\sum_{i=0}^{N_{EAO}-1}n_i^2\mathrm{OLD}_i}} \\ \hline \sqrt{\frac{m_0^2\mathrm{OLD}_0}{\mathrm{OLD}_L+\sum_{i=0}^{N_{EAO}-1}m_i^2\mathrm{OLD}_i}} & \sqrt{\frac{n_0^2\mathrm{OLD}_0}{\mathrm{OLD}_R+\sum_{i=0}^{N_{EAO}-1}n_i^2\mathrm{OLD}_i}} \\ \vdots & \vdots \\ \sqrt{\frac{m_{N_{EAO}-1}^2\mathrm{OLD}_{N_{EAO}-1}}{\mathrm{OLD}_L+\sum_{i=0}^{N_{EAO}-1}m_i^2\mathrm{OLD}_i}} & \sqrt{\frac{n_{N_{EAO}-1}^2\mathrm{OLD}_{N_{EAO}-1}}{\mathrm{OLD}_R+\sum_{i=0}^{N_{EAO}-1}n_i^2\mathrm{OLD}_i}} \end{pmatrix}.$$

The output of the TTN element yields:

$$Y=\begin{pmatrix} y_L \\ y_R \\ \hline y_{0,EAO} \\ \vdots \\ y_{N_{EAO}-1,EAO} \end{pmatrix}=M_{Energy}X=M_{Energy}\begin{pmatrix} l_0 \\ r_0 \end{pmatrix}.$$

The adaptation of the equations for the mono signal results in $$M_{Energy}=A\begin{pmatrix} \sqrt{\frac{\mathrm{OLD}_L}{\mathrm{OLD}_L+\sum_{i=0}^{N_{EAO}-1}m_i^2\mathrm{OLD}_i}} & \sqrt{\frac{\mathrm{OLD}_L}{\mathrm{OLD}_L+\sum_{i=0}^{N_{EAO}-1}n_i^2\mathrm{OLD}_i}} \\ \hline \sqrt{\frac{m_0^2\mathrm{OLD}_0}{\mathrm{OLD}_L+\sum_{i=0}^{N_{EAO}-1}m_i^2\mathrm{OLD}_i}} & \sqrt{\frac{n_0^2\mathrm{OLD}_0}{\mathrm{OLD}_L+\sum_{i=0}^{N_{EAO}-1}n_i^2\mathrm{OLD}_i}} \\ \vdots & \vdots \\ \sqrt{\frac{m_{N_{EAO}-1}^2\mathrm{OLD}_{N_{EAO}-1}}{\mathrm{OLD}_L+\sum_{i=0}^{N_{EAO}-1}m_i^2\mathrm{OLD}_i}} & \sqrt{\frac{n_{N_{EAO}-1}^2\mathrm{OLD}_{N_{EAO}-1}}{\mathrm{OLD}_L+\sum_{i=0}^{N_{EAO}-1}n_i^2\mathrm{OLD}_i}} \end{pmatrix}.$$

The output of the TTN element yields:

$$Y=\begin{pmatrix} y_L \\ \hline y_{0,EAO} \\ \vdots \\ y_{N_{EAO}-1,EAO} \end{pmatrix}=M_{Energy}X=M_{Energy}\begin{pmatrix} l_0 \\ r_0 \end{pmatrix}.$$

The corresponding OTN matrix $M_{Energy}$ for the stereo case can be derived as:

$$M_{Energy} = A\left(\frac{1}{\sqrt{\mathrm{OLD}_L + \sum_{i=0}^{N_{EAO}-1} m_i^2 \mathrm{OLD}_i}} + \frac{1}{\sqrt{\mathrm{OLD}_R + \sum_{i=0}^{N_{EAO}-1} n_i^2 \mathrm{OLD}_i}}\right)$$

$$\begin{pmatrix} \sqrt{\mathrm{OLD}_L} \\ \sqrt{\mathrm{OLD}_R} \\ \text{-----------------------------} \\ \sqrt{m_0^2 \mathrm{OLD}_0} + \sqrt{n_0^2 \mathrm{OLD}_0} \\ \vdots \\ \sqrt{m_{N_{EAO}-1}^2 OLD_{N_{EAO}-1}} + \sqrt{n_{N_{EAO}-1}^2 OLD_{N_{EAO}-1}} \end{pmatrix},$$

hence the output signal Y of the OTN element yields:

$$Y = M_{Energy} d_0.$$

For the mono case the OTN matrix $M_{Energy}$ reduces to:

$$M_{Energy} = A\frac{1}{\sqrt{\mathrm{OLD}_L + \sum_{i=0}^{N_{EAO}-1} m_i^2 \mathrm{OLD}_i}} \begin{pmatrix} \sqrt{\mathrm{OLD}_L} \\ \text{--------------} \\ \sqrt{m_0^2 \mathrm{OLD}_0} \\ \vdots \\ \sqrt{m_{N_{EAO}-1}^2 OLD_{N_{EAO}-1}} \end{pmatrix}.$$

Requirements for acoustically simulating a concert hall or other listening space are considered in Julius O. Smith III, Physical Audio Signal Processing for Virtual Musical Instruments And Audio Effects, Center for Computer Research in Music and Acoustics (CCRMA), Department of Music, Stanford University, Stanford, California 94305 USA, December 2008 Edition (Beta).

The response is considered at one or more discrete listening points in space ("ears") due to one or more discrete point sources of acoustic energy. The direct signal propagating from a sound source to a listener's ear can be simulated using a single delay line in series with an attenuation scaling or lowpass filter. Each sound ray arriving at the listening point via one or more reflections can be simulated using a delay-line and some scale factor (or filter). Two rays create a feedforward comb filter. More generally, a tapped delay line FIR filter can simulate many reflections. Each tap brings out one echo at the appropriate delay and gain, and each tap can be independently filtered to simulate air absorption and lossy reflections. In principle, tapped delay lines can accurately simulate any reverberant environment, because reverberation really does consist of many paths of acoustic propagation from each source to each listening point. Tapped delay lines are expensive computationally relative to other techniques, and handle only one "point to point" transfer function, i.e., from one point-source to one ear, and are dependent on the physical environment. In general, the filters should also include filtering by the pinnae of the ears, so that each echo can be perceived as coming from the correct angle of arrival in 3D space; in other words, at least some reverberant reflections should be spatialized so that they appear to come from their natural directions in 3D space. Again, the filters change if anything changes in the listening space, including source or listener position. The basic architecture provides a set of signals, $s_1(n)$, $s_2(n)$, $s_3(n)$, . . . that feed set of filters ($h_{11}$, $h_{12}$, $h_{13}$), ($h_{21}$, $h_{22}$, $h_{23}$), . . . which are then summed to form composite signals $y_1(n)$, $y_2(n)$, representing signals for two ears. Each filter $h_{ij}$ can be implemented as a tapped delay line FIR filter. In the frequency domain, it is convenient to express the input-output relationship in terms of the transfer-function matrix:

$$\begin{bmatrix} Y_1(z) \\ Y_2(z) \end{bmatrix} = \begin{bmatrix} H_{11}(z) & H_{12}(z) & H_{13}(z) \\ H_{21}(z) & H_{22}(z) & H_{23}(z) \end{bmatrix} \begin{bmatrix} S_1(z) \\ S_2(z) \\ S_3(z) \end{bmatrix}$$

Denoting the impulse response of the filter from source j to ear i by $h_{ij}(n)$, the two output signals are computed by six convolutions:

$$y_i(n) = \sum_{j=1}^{3} s_j * h_{ij}(n) = \sum_{j=1}^{3} \sum_{m=0}^{M_{ij}} s_j(m) h_{ij}(n-m),\ i = 1, 2,$$

where $M_{ij}$ denotes the order of FIR filter $h_{ij}$. Since many of the filter coefficients $h_{ij}(n)$ are zero (at least for small n), it is more efficient to implement them as tapped delay lines so that the inner sum becomes sparse. For greater accuracy, each tap may include a lowpass filter which models air absorption and/or spherical spreading loss. For large n, the impulse responses are not sparse, and must either be implemented as very expensive FIR filters, or limited to approximation of the tail of the impulse response using less expensive IIR filters.

For music, a typical reverberation time is on the order of one second. Suppose we choose exactly one second for the reverberation time. At an audio sampling rate of 50 kHz, each filter requires 50,000 multiplies and additions per sample, or 2.5 billion multiply-adds per second. Handling three sources and two listening points (ears), we reach 30 billion operations per second for the reverberator. While these numbers can be improved using FFT convolution instead of direct convolution (at the price of introducing a throughput delay which can be a problem for real-time systems), it remains the case that exact implementation of all relevant point-to-point transfer functions in a reverberant space is very expensive computationally.

While a tapped delay line FIR filter can provide an accurate model for any point-to-point transfer function in a reverberant environment, it is rarely used for this purpose in practice because of the extremely high computational expense. While there are specialized commercial products that implement reverberation via direct convolution of the input signal with the impulse response, the great majority of artificial reverberation systems use other methods to synthesize the late reverb more economically.

One disadvantage of the point-to-point transfer function model is that some or all of the filters must change when anything moves. If instead the computational model was of the whole acoustic space, sources and listeners could be moved as desired without affecting the underlying room simulation. Furthermore, we could use "virtual dummy heads" as listeners, complete with pinnae filters, so that all of the 3D directional aspects of reverberation could be captured in two extracted signals for the ears. Thus, there are compelling reasons to consider a full 3D model of a desired acoustic listening space. Let us briefly estimate the computational requirements of a "brute force" acoustic simulation of a room. It is generally accepted that audio signals require a 20 kHz bandwidth. Since sound travels at about a foot per millisecond, a 20 kHz sinusoid has a wavelength on the order of 1/20 feet, or about half an inch. Since, by elementary sampling theory, we must sample faster than twice the highest frequency present in the signal, we need "grid points" in our simulation separated by a quarter inch or less. At this grid density, simulating an ordinary 12'×12'×8' room in a home requires more than 100 million grid points. Using finite-difference or waveguide-mesh techniques, the average grid point can be implemented as a multiply-free computation; however, since it has waves coming and going in six spatial directions, it requires on the order of 10 additions per sample. Thus, running such a room simulator at an audio sampling rate of 50 kHz requires on the order of 50 billion additions per second, which is comparable to the three-source, two-ear simulation.

Based on limits of perception, the impulse response of a reverberant room can be divided into two segments. The first segment, called the early reflections, consists of the relatively sparse first echoes in the impulse response. The remainder, called the late reverberation, is so densely populated with echoes that it is best to characterize the response statistically in some way. Similarly, the frequency response of a reverberant room can be divided into two segments. The low-frequency interval consists of a relatively sparse distribution of resonant modes, while at higher frequencies the modes are packed so densely that they are best characterized statistically as a random frequency response with certain (regular) statistical properties. The early reflections are a particular target of spatialization filters, so that the echoes come from the right directions in 3D space. It is known that the early reflections have a strong influence on spatial impression, i.e., the listener's perception of the listening-space shape.

A lossless prototype reverberator has all of its poles on the unit circle in the z plane, and its reverberation time is infinity. To set the reverberation time to a desired value, we need to move the poles slightly inside the unit circle. Furthermore, we want the high-frequency poles to be more damped than the low-frequency poles. This type of transformation can be obtained using the substitution $z^{-1} \leftarrow G(z) z^{-1}$, where G(z) denotes the filtering per sample in the propagation medium (a lowpass filter with gain not exceeding 1 at all frequencies). Thus, to set the reverberation time in an feedback delay network (FDN), we need to find the G(z) which moves the poles where desired, and then design lowpass filters $H_i(z) \approx G^{M_i}(z)$ which will be placed at the output (or input) of each delay line. All pole radii in the reverberator should vary smoothly with frequency.

Let $t_{60}(\omega)$ denote the desired reverberation time at radian frequency ω, and let $H^i(z)$ denote the transfer function of the lowpass filter to be placed in series with delay line i. The problem we consider now is how to design these filters to yield the desired reverberation time. We will specify an ideal amplitude response for $H_i(z)$ based on the desired reverberation time at each frequency, and then use conventional filter-design methods to obtain a low-order approximation to this ideal specification. Since losses will be introduced by the substitution $z^{-1}G(z)z^{-1}$, we need to find its effect on the pole radii of the lossless prototype. Let $p_i \triangleq e^{j\omega_i T}$ denote the $i^{th}$ pole. (Recall that all poles of the lossless prototype are on the unit circle.) If the per-sample loss filter G(z) were zero phase, then the substitution $z^{-1}G(z)z^{-1}$ would only affect the radius of the poles and not their angles. If the magnitude response of G(z) is close to 1 along the unit circle, then we have the approximation that the $i^{th}$ pole moves from $z=e^{j\omega_i T}$ to $p_i=R_i e^{j\omega_i T}$, where $R_i=G(R_i e^{j\omega_i T}) \approx G(e^{j\omega_i T})$.

In other words, when $z^{-1}$ is replaced by $G(z)z^{-1}$, where G(z) is zero phase and $|G(e^{j\omega})|$ is close to (but less than) 1, a pole originally on the unit circle at frequency $\omega_i$ moves approximately along a radial line in the complex plane to the point at radius $R_i=G(e^{j\omega_i T})$. The radius we desire for a pole at frequency $\omega_i$ is that which gives us the desired $t_{60}(\omega_i)$: $R_i^{t_{60}(\omega_i)/T}=0.001$. Thus, the ideal per-sample filter G(z) satisfies $|G(\omega)|^{t_{60}(\omega)/T}=0.001$.

The lowpass filter in series with a length $M_i$ delay line should therefore approximate $H_i(z)=G^{M_i}(z)$ which implies $$\left|H_i\left(e^{j\omega T}\right)\right|^{\frac{t_{60}(\omega)}{M_i T}} = 0.001.$$

Taking 20 $\log_{10}$ of both sides gives $$20\log_{10}\left|H_i\left(e^{j\omega T}\right)\right| = -60\frac{M_i T}{t_{60}(\omega)}.$$

Now that we have specified the ideal delay-line filter $H_i(e^{j\omega T})$, any number of filter-design methods can be used to find a low-order $H_i(z)$ which provides a good approximation. Examples include the functions invfreqz and stmcb in Matlab. Since the variation in reverberation time is typically very smooth with respect to ω, the filters $H_i(z)$ can be very low order.

The early reflections should be spatialized by including a head-related transfer function (HRTF) on each tap of the early-reflection delay line. Some kind of spatialization may be needed also for the late reverberation. A true diffuse field consists of a sum of plane waves traveling in all directions in 3D space. Spatialization may also be applied to late reflections, though since these are treated statistically, the implementation is distinct.

US 20200008005 discloses a spatialized audio system includes a sensor to detect a head pose of a listener. The system also includes a processor to render audio data in first and second stages. The first stage includes rendering first audio data corresponding to a first plurality of sources to second audio data corresponding to a second plurality of sources. The second stage includes rendering the second audio data corresponding to the second plurality of sources to third audio data corresponding to a third plurality of sources based on the detected head pose of the listener. The second plurality of sources consists of fewer sources than the first plurality of sources.

US 20190327574 discloses a dual source spatialized audio system includes a general audio system and a personal audio system. The personal system may include a head pose sensor to collect head pose data of the user, and/or a room sensor. The system may include a personal audio processor to generate personal audio data based on the head pose of the user.

US 20200162140 provides for use of a spatial location and mapping (SLAM) sensor for controlling a spatialized audio system. The process of determining where the audio sources are located relative to the user may be referred to herein as "localization," and the process of rendering playback of the audio source signal to appear as if it is coming from a specific direction may be referred to herein as "spatialization." According to US 20200162140, localizing an audio source may be performed in a variety of different ways. In some cases, an AR or VR headset may initiate a direction of arrival (DOA) analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located. For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

As an alternate, a directional (vector) microphone may be used, e.g., U.S. Patent Appln. Nos. 20200077187; 20200070862; 20200021940; 20200005758; 20190387347; 20190385600; 20190258894; 20190253796; 20190172476; 20190139552; 20180374469; 20180293507; 20180262832; 20180261201; 20180213309; 20180206052; 20180184225; 20170308164; 20170140771; 20170134849; 20170053667; 20170047079; 20160337523; 20160322062; 20160302006; 20160300584; 20160241974; 20160192068; 20160118038; 20160063986; 20160029130; 20150249899; 20150139444; 20150003631; 20140355776; 20140270248; 20140112103; 20140003635; 20140003611; 20130332156; 20130304476; 20130301837; 20130300648; 20130275873; 20130275872; 20130275077; 20130272539; 20130272538; 20130272097; 20130094664; 20120263315; 20120237049; 20120183149; 20110235808; 20110232989; 20110200206; 20110131044; 20100195844; 20100030558; 20090326870; 20090310444; 20090228272; 20070028593; 20060002546; 20050100176; 20040032796; 20200162821; and 20180166062.

Different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, the device may perform localization based on information received from other types of sensors. These sensors may include cameras, infrared radiation (IR) sensors, heat sensors, motion sensors, global positioning system (GPS) receivers, or in some cases, sensor that detect a user's eye movements. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

The determined DOA may be used to generate a more customized output audio signal for the user. For instance, an acoustic transfer function may characterize or define how a sound is received from a given location. An acoustic transfer function may define the relationship between parameters of a sound at its source location and the parameters by which the sound signal is detected (e.g., detected by a microphone array or detected by a user's ear).

U.S. Patent Pub No. 20200112815 implements an augmented reality or mixed reality system. One or more processors (e.g., CPUs, DSPs) of an augmented reality system can be used to process audio signals or to implement steps of computer-implemented methods described below; sensors of the augmented reality system (e.g., cameras, acoustic sensors, IMUs, LIDAR, GPS) can be used to determine a position and/or orientation of a user of the system, or of elements in the user's environment; and speakers of the augmented reality system can be used to present audio signals to the user. In some embodiments, external audio playback devices (e.g. headphones, earbuds) could be used instead of the system's speakers for delivering the audio signal to the user's ears.

U.S. Patent Pub. No. 20200077221 discloses a system for providing spatially projected audio communication between members of a group, the system mounted onto a respective user of the group. The system includes a detection unit, configured to determine the three-dimensional head position of the user, and to obtain a unique identifier of the user. The system further includes a communication unit, configured to transmit the determined user position and the obtained user identifier and audio information to at least one other user of the group, and to receive a user position and user identifier and associated audio information from at least one other user of the group. The system may further include a processing unit, configured to track the user position and user identifier received from at least one other user of the group, to establish the relative position of the other user, and to synthesize a spatially resolved audio signal of the received audio information of the other user based on the updated position of the other user. The communication unit may be integrated with the detection unit configured to transmit and receive information via a radar-communication (RadCom) technique.

The detection unit may include one or Simultaneous Localization and Mapping (SLAM) sensors, such as at least one of: a radar sensor, a LIDAR sensor, an ultrasound sensor, a camera, a field camera, and a time-of-flight camera. The sensors may be arranged in a configuration so as to provide 3600 coverage around the user and capable of tracking individuals in different environments. In one embodiment, the sensor module is a radar module. A system on chip millimeter wave radar transceiver (such as the Texas Instruments IWR1243 or the NXP TEF8101 chips) can provide the necessary detection functionality while allowing for a compact and low power design, which may be an advantage in mobile applications. The transceiver chip may be integrated on an electronics board with a patch antenna design. The sensor module may provide reliable detection of persons for distances of up to 30 m, motorcycles of up to 50 m, and automobiles of up to 80 m, with a range resolution of up to 40 cm. The sensor module may provide up to a 120° azimuthal field of view (FoV) with a resolution of 15 degree. Three modules can provide a full 3600 azimuthal FoV, though in some applications it may be possible to use two modules or even a single module. The radar module in its basic mode of operation can detect objects in the proximity of the sensor but has limited identification capabilities. Lidar sensors and ultrasound sensors may suffer from the same limitations. Optical cameras and their variants can provide identification capabilities, but such identification may require considerable computational resources, may not be entirely reliable and may not readily provide distance information. Spatially projected communication requires the determination of the spatial position of the communicating parties, to allow for accurately and uniquely representing their audio information to a user in three-dimensional (3D) space. Some types of sensors, such as radar and ultrasound, can provide the instantaneous relative velocity of the detected objects in the vicinity of the user. The relative velocity information of the detected objects can be used to provide a Doppler effect on the audio representation of those detected objects.

A positioning unit is used to determine the position of the users. Such positioning unit may include localization sensors or systems, such as a global navigation satellite system (GNSS), a global positioning system (GPS), GLONASS, and the like, for outdoor applications. Alternatively, an indoor positioning sensor that is used as part of an indoor localization system may be used for indoor applications. The position of each user is acquired by the respective positioning unit of the user, and the acquired position and the unique user ID is transmitted by the respective communication unit of the user to the group. The other members of the group reciprocate with the same process. Each member of the group now has the location information and the accompanied unique ID of each user. To track the other members of the group in dynamic situations, where the relative positions can change, the user systems can continuously transmit, over the respective communication units, their acquired position to other members of the group and/or the detection units can track the position of other members independent of the transmission of the other members positions. Using the detection unit for tracking may provide lower latency (receiving the other members positions through the communications channel is no longer necessary) and the relative velocity of the other members positions relative to the user. Lower latency translates to better positioning accuracy in dynamic situations since between the time of transmission and the time of reception, the position of the transmitter position may have changed. A discrepancy between the system's representation of the audio source position and the actual position of the audio source (as may be visualized by the user) reduces the ability of the user to "believe" or to accurately perceive the spatial audio effect being generated. Both positioning accuracy and relative velocity are important to emulate natural human hearing.

A head orientation measurement unit provides continuous tracking of the user's head position. Knowing the user's head position is critical to providing the audio information in the correct position in 3D space relative to the user's head, since the perceived location of the audio information is head position-dependent and the user's head can swivel rapidly. The head orientation measurement unit may include a dedicated inertial measurement unit (IMU) or magnetic compass (magnetometer) sensor, such as the Bosch BM1160X. Alternatively, the head position can be measured and extracted through a head mounted detection system located on the head of the user. The detection unit can be configured to transmit information between users in the group, such as via a technique known as "radar communication" or "RadCom" as known in the art (as described for example in: Hassanein et al. A Dual Function Radar-Communications system using sidelobe control and waveform diversity, IEEE National Radar Conference—Proceedings 2015:1260-1263). This embodiment would obviate the need to correlate the ID of the user with their position to generate their spatial audio representation since the user's audio information will already be spatialized and detected coming from the direction that their RadCom signal is acquired from. This may substantially simplify the implementation since there is no need for additional hardware to provide localization of the audio source or to transmit the audio information, beyond the existing detection unit. Similar functionality described for RadCom can also be applied to ultrasound-based detection units (Jiang et al, Indoor wireless communication using airborne ultrasound and OFDM methods, 2016 IEEE International Ultrasonic Symposium). As such this embodiment can be achieved with a detection unit, power unit and audio unit only, obviating but not necessarily excluding, the need for the head orientation measurement, positioning, and communication units.

U.S. Patent Pub. No. 20190387352 describes an example of a system for determining spatial audio properties based on an acoustic environment. As examples, such properties may include a volume of a room; reverberation time as a function of frequency; a position of a listener with respect to the room; the presence of objects (e.g., sound-dampening objects) in the room; surface materials; or other suitable properties. These spatial audio properties may be retrieved locally by capturing a single impulse response with a microphone and loudspeaker freely positioned in a local environment, or may be derived adaptively by continuously monitoring and analyzing sounds captured by a mobile device microphone. An acoustic environment can be sensed via sensors of an XR system (e.g., an augmented reality system), a user's location can be used to present audio reflections and reverberations that correspond to an environment presented (e.g., via a display) to the user. An acoustic environment sensing module may identify spatial audio properties of an acoustic environment. Acoustic environment sensing module can capture data corresponding to an acoustic environment. For example, the data captured at a stage could include audio data from one or more microphones; camera data from a camera such as an RGB camera or depth camera; LIDAR data, sonar data; radar data; GPS data; or other suitable data that may convey information about the acoustic environment. In some instances, the data can include data related to the user, such as the user's position or orientation with respect to the acoustic environment.

A local environment in which the head-mounted display device is may include one or more microphones. In some embodiments, one or more microphones may be employed, and may be mobile device mounted or environment positioned or both. Benefits of such arrangements may include gathering directional information about reverberation of a room, or mitigating poor signal quality of any one microphone within the one or more microphones. Signal quality may be poor on a given microphone due for instance to occlusion, overloading, wind noise, transducer damage, and the like. Features can be extracted from the data. For example, the dimensions of a room can be determined from sensor data such as camera data, LIDAR data, sonar data, etc. The features can be used to determine one or more acoustic properties of the room—for example, frequency-dependent reverberation times—and these properties can be stored and associated with the current acoustic environment. The system can include a reflections adaptation module for retrieving acoustic properties for a room, and applying those properties to audio reflections (for example, audio reflections presented via headphones, or via speakers to a user).

U.S. Patent Pub. No. 20190387349 teaches a spatialized audio system in which object detection and location can also be achieved with radar-based technology (e.g., an object-detection system that transmits radio waves to determine one or more of an angle, distance, velocity, and identification of a physical object).

U.S. Patent Pub. No. 20190342693 teaches a spatialized audio system having an indoor positioning system (IPS) locates objects, people, or animals inside a building or structure using one or more of radio waves, magnetic fields, acoustic signals, or other transmission or sensory information that a PED receives or collects. Non-radio technologies can also be used in an IPS to determine position information with a wireless infrastructure. Examples of such non-radio technology include, but are not limited to, magnetic positioning, inertial measurements, and others. Further, wireless technologies can generate an indoor position and be based on, for example, a Wi-Fi positioning system (WPS), Bluetooth, RFID systems, identity tags, angle of arrival (AoA, e.g., measuring different arrival times of a signal between multiple antennas in a sensor array to determine a signal origination location), time of arrival (ToA, e.g., receiving multiple signals and executing trilateration and/or multi-lateration to determine a location of the signal), received signal strength indication (RSSI, e.g., measuring a power level received by one or more sensors and determining a distance to a transmission source based on a difference between transmitted and received signal strengths), and ultra-wideband (UWB) transmitters and receivers. Object detection and location can also be achieved with radar-based technology (e.g., an object-detection system that transmits radio waves to determine one or more of an angle, distance, velocity, and identification of a physical object).

See also, U.S. Pat. Nos. 10,499,153; 9,361,896; 9,173,032; 9,042,565; 8,880,413; 7,792,674; 7,532,734; 7,379,961; 7,167,566; 6,961,439; 6,694,033; 6,668,061; 6,442,277; 6,185,152; 6,009,396; 5,943,427; 5,987,142; 5,841,879; 5,661,812; 5,465,302; 5,459,790; 5,272,757; 20010031051; 20020150254; 20020196947; 20030059070; 20040141622; 20040223620; 20050114121; 20050135643; 20050271212; 20060045275; 20060056639; 20070109977; 20070286427; 20070294061; 20080004866; 20080025534; 20080137870; 20080144794; 20080304670; 20080306720; 20090046864; 20090060236; 20090067636; 20090116652; 20090232317; 20090292544; 20100183159; 20100198601; 20100241439; 20100296678; 20100305952; 20110009771; 20110268281; 20110299707; 20120093348; 20120121113; 20120162362; 20120213375; 20120314878; 20130046790; 20130163766; 20140016793; 20140064526; 20150036827; 20150131824; 20160014540; 20160050508; 20170070835; 20170215018; 20170318407; 20180091921; 20180217804; 20180288554; 20180288554; 20190045317; 20190116448; 20190132674; 20190166426; 20190268711; 20190289417; 20190320282; 20200143553; 20200014849; 20200008005; 20190387168; 20180278843; 20180182173; 20180077513; 20170256069; WO 00/19415; WO 99/49574; and WO 97/30566.

Baskind, Alexis, Thibaut Carpentier, Markus Noisternig, Olivier Warusfel, and Jean-Marc Lyzwa. "Binaural and transaural spatialization techniques in multichannel 5.1 production (Anwendung binauraler und transauraler Wiedergabetechnik in der 5.1 Musikproduktion)." 27th Tonmeistertagung—VDT International Convention, November, 2012

Begault, Durand R., and Leonard J. Trejo. "3-D sound for virtual reality and multimedia." (2000), NASA/TM-2000-209606 discusses various implementations of spatialized audio systems.

Begault, Durand, Elizabeth M. Wenzel, Martine Godfroy, Joel D. Miller, and Mark R. Anderson. "Applying spatial audio to human interfaces: 25 years of NASA experience." In Audio Engineering Society Conference: 40th International Conference: Spatial Audio: Sense the Sound of Space. Audio Engineering Society, 2010.

Bosun, Xie, Liu Lulu, and Chengyun Zhang. "Transaural reproduction of spatial surround sound using four actual loudspeakers." In Inter-Noise and Noise-Con Congress and Conference Proceedings, vol. 259, no. 9, pp. 61-69. Institute of Noise Control Engineering, 2019.

Casey, Michael A., William G. Gardner, and Sumit Basu. "Vision steered beam-forming and transaural rendering for the artificial life interactive video environment (alive)." In Audio Engineering Society Convention 99. Audio Engineering Society, 1995.

Cooper, Duane H., and Jerald L. Bauck. "Prospects for transaural recording." Journal of the Audio Engineering Society 37, no. 1/2 (1989): 3-19.

Duraiswami, Grant, Mesgarani, Shamma, Augmented Intelligibility in Simultaneous Multi-talker Environments. 2003, Proceedings of the International Conference on Auditory Display (ICAD'03).

en.wikipedia.org/wiki/Perceptual-based_3D_sound_localization

Fazi, Filippo Maria, and Eric Hamdan. "Stage compression in transaural audio." In Audio Engineering Society Convention 144. Audio Engineering Society, 2018.

Gardner, William Grant. Transaural 3-D audio. Perceptual Computing Section, Media Laboratory, Massachusetts Institute of Technology, 1995.

Glasal, ralph, Ambiophonics, Replacing Stereophonics to Achieve Concert-Hall Realism, 2nd Ed (2015).

Greff, Raphaël. "The use of parametric arrays for transaural applications." In Proceedings of the 20th International Congress on Acoustics, pp. 1-5. 2010.

Guastavino, Catherine, Véronique Larcher, Guillaume Catusseau, and Patrick Boussard. "Spatial audio quality evaluation: comparing transaural, ambisonics and stereo." Georgia Institute of Technology, 2007.

Guldenschuh, Markus, and Alois Sontacchi. "Application of transaural focused sound reproduction." In 6th Eurocontrol INO-Workshop 2009. 2009.

Guldenschuh, Markus, and Alois Sontacchi. "Transaural stereo in a beamforming approach." In Proc. DAFx, vol. 9, pp. 1-6. 2009.

Guldenschuh, Markus, Chris Shaw, and Alois Sontacchi. "Evaluation of a transaural beamformer." In 27th Congress of the International Council of the Aeronautical Sciences (ICAS 2010). Nizza, Frankreich, pp. 2010-10. 2010.

Guldenschuh, Markus. "Transaural beamforming." PhD diss., Master's thesis, Graz University of Technology, Graz, Austria, 2009.

Hartmann, William M., Brad Rakerd, Zane D. Crawford, and Peter Xinya Zhang. "Transaural experiments and a revised duplex theory for the localization of low-frequency tones." The Journal of the Acoustical Society of America 139, no. 2 (2016): 968-985.

Herder, Jens. "Optimization of sound spatialization resource management through clustering." In The Journal of Three Dimensional Images, 3D-Forum Society, vol. 13, no. 3, pp. 59-65. 1999 relates to algorithms for simplifying spatial audio processing.

Hollerweger, Florian. Periphonic sound spatialization in multi-user virtual environments. Institute of Electronic Music and Acoustics (IEM), Center for Research in Electronic Art Technology (CREATE) Ph.D dissertation 2006.

Ito, Yu, and Yoichi Haneda. "Investigation into Transaural System with Beamforming Using a Circular Loudspeaker Array Set at Off-center Position from the Listener." Proc. 23rd Int. Cong. Acoustics (2019).

Johannes, Reuben, and Woon-Seng Gan. "3D sound effects with transaural audio beam projection." In 10th Western Pacific Acoustic Conference, Beijing, China, paper, vol. 244, no. 8, pp. 21-23. 2009.

Jost, Adrian, and Jean-Marc Jot. "Transaural 3-d audio with user-controlled calibration." In Proceedings of COST-G6 Conference on Digital Audio Effects, DAFX2000, Verona, Italy. 2000.

Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, March 2011, 2011.

Lauterbach, Christian, Anish Chandak, and Dinesh Manocha. "Interactive sound rendering in complex and dynamic scenes using frustum tracing." IEEE Transactions on Visualization and Computer Graphics 13, no. 6 (2007): 1672-1679 also employs graphics-style analysis for audio processing.

LIU, Lulu, and Bosun XIE. "The limitation of static transaural reproduction with two frontal loudspeakers." (2019)

Malham, David G., and Anthony Myatt. "3-D sound spatialization using ambisonic techniques." Computer music journal 19, no. 4 (1995): 58-70 discusses use of ambisonic techniques (use of 3D sound fields).

McGee, Ryan, and Matthew Wright. "Sound element spatializer." In ICMC. 2011.; and McGee, Ryan, "Sound element spatializer." (M.S. Thesis, U. California Santa Barbara 2010), presents Sound Element Spatializer (SES), a novel system for the rendering and control of spatial audio. SES provides multiple 3D sound rendering techniques and allows for an arbitrary loudspeaker configuration with an arbitrary number of moving sound sources.

Méaux, Eric, and Sylvain Marchand. "Synthetic Transaural Audio Rendering (STAR): a Perceptive Approach for Sound Spatialization." 2019.

Murphy, David, and Flaithrí Neff. "Spatial sound for computer games and virtual reality." In Game sound technology and player interaction: Concepts and developments, pp. 287-312. IGI Global, 2011 discusses spatialized audio in a computer game and VR context.

Naef, Martin, Oliver Staadt, and Markus Gross. "Spatialized audio rendering for immersive virtual environments." In Proceedings of the ACM symposium on Virtual reality software and technology, pp. 65-72. ACM, 2002 discloses feedback from a graphics processor unit to perform spatialized audio signal processing.

Samejima, Toshiya, Yo Sasaki, Izumi Taniguchi, and Hiroyuki Kitajima. "Robust transaural sound reproduction system based on feedback control." Acoustical Science and Technology 31, no. 4 (2010): 251-259.

Shohei Nagai, Shunichi Kasahara, Jun Rekimot, "Directional communication using spatial sound in human-telepresence." Proceedings of the 6th Augmented Human International Conference, Singapore 2015, ACM New York, NY, USA, ISBN: 978-1-4503-3349-8

Simon Galvez, Marcos F., and Filippo Maria Fazi. "Loudspeaker arrays for transaural reproduction." (2015).

Simón Gálvez, Marcos Felipe, Miguel Blanco Galindo, and Filippo Maria Fazi. "A study on the effect of reflections and reverberation for low-channel-count Transaural systems." In Inter-Noise and Noise-Con Congress and Conference Proceedings, vol. 259, no. 3, pp. 6111-6122. Institute of Noise Control Engineering, 2019.

Siu-Lan Tan, Annabel J. Cohen, Scott D. Lipscomb, Roger A. Kendall, "The Psychology of Music in Multimedia", Oxford University Press, 2013.

Transaural audio processing is discussed in:

Verron, Charles, Mitsuko Aramaki, Richard Kronland-Martinet, and Grégory Pallone. "A 3-D immersive synthesizer for environmental sounds." IEEE Transactions on Audio, Speech, and Language Processing 18, no. 6 (2009): 1550-1561 relates to spatialized sound synthesis.

Villegas, Julian, and Takaya Ninagawa. "Pure-data-based transaural filter with range control." (2016).

SUMMARY OF THE INVENTION

In one aspect of the present invention, a system and method are provided for spatial audio technologies to create a complex immersive auditory scene that immerses the listener, using a sensor which defines a soundscape environment. For example, the sensor is an imaging radar sensor.

The sensor is capable of not only determining location of persons within an environment, as well as objects within an environment, and especially sound reflective and absorptive materials. For example, data from the sensor may be used to generate a model for an nVidia VRWorks Audio implementation. developer.nvidia.com/vrworks/vrworks-audio; developer.nvidia.com/vrworks-audio-sdk-depth.

By mapping location of physical surfaces using a spatial sensor, the acoustic qualities of these surfaces using acoustic feedback sensing may be determined with higher reliability.

It is therefore an object to provide a spatialized sound method, comprising: mapping an environment with a spatial mapping sensor, to determine at least a position of at least one listener and at least one object, e.g., an inanimate object; receiving an audio program to be delivered to the listener; transforming the audio program with a spatialization model, to generate an array of audio transducer signals for an audio transducer array representing spatialized audio, the spatialization model comprising parameters defining a head-related transfer function for the listener, and an acoustic interaction of the object; and communicating the physical state information for the at least one listener through a network port to digital packet communication network.

It is also an object to provide a spatialized sound method, comprising: determining a position of at least one listener;

receiving an audio program to be delivered to the listener and associated metadata; transforming the audio program with a spatialization model, to generate an array of audio transducer signals for an audio transducer array representing a spatialized audio program configured dependent on the received metadata, the spatialization model comprising parameters defining a head-related transfer function for the listener; and reproducing the spatialized audio program with a speaker array.

Another object provides a spatialized sound method, comprising: determining a position of at least one listener with a radar, lidar or acoustic sensor; receiving an audio program to be delivered to the listener; transforming the audio program with a spatialization model, to generate an array of audio transducer signals for an audio transducer array, the transformed audio program representing a spatialized audio program dependent on the determined positioner of the listener; and reproducing the spatialized audio program with a speaker array.

The method may further comprise receiving metadata with the audio program, the metadata representing a type of audio program, wherein the spatialization model is further dependent on the metadata. The metadata may comprise a metadata stream which varies during a course of presentation of the audio program. Data from the radar, lidar or acoustic sensor may be communicated to a remote server. An advertisement may be selectively delivered dependent on the data from the radar, lidar or acoustic sensor. The transformed audio program representing a spatialized audio program may be further dependent on at least one sensed object e.g., an inanimate object.

It is also an object to provide a spatialized sound system, comprising: a spatial mapping sensor, configured to map an environment, to determine at least a position of at least one listener and at least one object e.g., an inanimate object; a signal processor configured to: transform a received audio program according to a spatialization model comprising parameters defining a head-related transfer function, and an acoustic interaction of the object, to form spatialized audio; and generate an array of audio transducer signals for an audio transducer array representing the spatialized audio; and a network port configured to communicate physical state information for the at least one listener through digital packet communication network.

The spatial mapping sensor may comprise an imaging radar sensor having an antenna array. The imaging radar sensor having an antenna array comprises a radar operating in the 60 GHz band.

The audio transducer array may be provided within a single housing, and the spatial mapping sensor may be provided in the same housing. The spatial mapping sensor may comprise an imaging radar sensor having an antenna array.

A body pose, sleep-wake state, cognitive state, or movement of the listener may be determined. An interaction between two listeners may be determined.

The physical state information is preferably not an optical image of an identifiable listener.

Media content may be received through the network port selectively dependent on the physical state information.

Audio feedback may be received through at least one microphone, wherein the spatialization model parameters are further dependent on the audio feedback. Audio feedback may be analyzed for a listener command, and the command responded to. For example, an Amazon Alexa or Google Home client may be implemented within the system.

At least one advertisement may be communicated through the network port configured selectively dependent on the physical state information.

At least one financial account may be charged and/or debited selectively dependent on the physical state information.

The method may further comprise determining a location of each a first listener and a second listener within the environment; and transforming the audio program with the spatialization model, to generate the array of audio transducer signals for the audio transducer array representing the spatialized audio, selectively dependent on the respective location and respective head-related transfer function for each of the first listener and the second listener.

The method may further comprise determining presence of a first listener and a second listener; defining a first audio program for the first listener; defining a second audio program for the second listener; the first audio program and the second audio program being distinct; and transforming the first audio program and the second audio program with the spatialization model, to generate the array of audio transducer signals for the audio transducer array representing the spatialized audio to deliver the first audio program to the first listener while suppressing the second audio program, and to deliver the second audio program to the second listener while suppressing the first audio program, selectively dependent on respective locations and head-related transfer functions for the first listener and the second listener, and at least one acoustic reflection off the object.

The method may further comprise performing a statistical attention analysis of the physical state information for a plurality of listeners at a remote server. The method may further comprise performing a statistical sentiment analysis of the physical state information for a plurality of listeners at a remote server. The method may further comprise performing a statistical analysis of the physical state information for a plurality of listeners at a remote server, and altering a broadcast signal for conveying media content dependent on the statistical analysis. The method may further comprise aggregating the physical state information for a plurality of listeners at a remote server, and adaptively defining a broadcast signal for conveying media content dependent on the aggregated physical state information.

The method may further comprise transforming the audio program with a digital signal processor. The transforming may comprise processing the audio program and the physical state information with a digital signal processor. The transforming may comprise processing the audio program and the physical state information with a single-instruction multiple-data parallel processor. The physical state information may not specifically locate a listener's ears.

The array of audio transducers signals may comprise a linear array of at least four audio transducers. The audio transducer array may be a phased array of audio transducers having equal spacing along an axis.

The transforming may comprise cross-talk cancellation between a respective left ear and right ear of the at least one listener, though other means of channel separation, such as controlling the spatial emission patterns. For example, the spatial emission pattern for sounds intended for each ear may have a sharp fall-off along the sagittal plane. The acoustic amplitude pattern may have a cardioid shape with a deep and narrow notch aimed at the listener's nose. This spatial separation avoids the need for cross-talk cancellation, but is generally limited to a single listener. The transforming may comprise cross-talk cancellation between ears of at least two different listeners.

The method may further comprise tracking a movement of the listener, and adapting the transforming dependent on the tracked movement.

The head related transfer function of a listener may be adaptively determined.

A remote database record retrieval may be performed based on an identification or characteristic of the object, receiving parameters associated with the object, and employing the received parameters in the spatialization model.

The network port may be further configured to receive media content through the network port selectively dependent on the physical state information. The network port may be further configured to receive at least one media program selected dependent on the physical state information. The network port may be further configured to receive at least one advertisement selectively dependent on the physical state information.

A microphone may be configured to receive audio feedback, wherein the spatialization model parameters are further dependent on the audio feedback. The signal processor may be further configured to filter the audio feedback for a listener command, and responding to the command.

At least one automated processor may be provided, configured to charge and/or debit at least one financial account in an accounting database selectively dependent on the physical state information.

The signal processor may be further configured to determine a location of each a first listener and a second listener within the environment, and to transform the audio program with the spatialization model, to generate the array of audio transducer signals for the audio transducer array representing the spatialized audio, selectively dependent on the respective location and respective head-related transfer function for each of the first listener and the second listener.

The signal processor may be further configured to: determine presence of a first listener and a second listener; and transform a first audio program and a second audio program according to the spatialization model, to generate the array of audio transducer signals for the audio transducer array representing the spatialized audio to deliver the first audio program to the first listener while suppressing the second audio program, and to deliver the second audio program to the second listener while suppressing the first audio program, selectively dependent on respective locations and head-related transfer functions for the first listener and the second listener, and at least one acoustic reflection off the object.

At least one automated processor may be provided, configured to perform at least one of a statistical attention analysis, and a statistical sentiment analysis of the physical state information for a plurality of listeners at a remote server. The automated processor may perform a statistical analysis of the physical state information for a plurality of listeners at a remote server, and to alter a broadcast signal for conveying media content dependent on the statistical analysis. The at least one automated processor may be configured to aggregate the physical state information for a plurality of listeners at a remote server, and to adaptively define a broadcast signal for conveying media content dependent on the aggregated physical state information.

The signal processor may comprise a single-instruction multiple-data parallel processor.

The signal processor may be configured to perform a transform for cross-talk cancellation between a respective left ear and right ear of the at least one listener, and/or cross-talk cancellation between ears of at least two different listeners.

The signal processor may be further configured to track a movement of the listener, and adapt the transforming dependent on the tracked movement.

A remote database may be provided, configured to retrieve a record based on an identification or characteristic of the object, and communicate parameters associated with the object to the network port, wherein the signal processor may be further configured to employ the received parameters in the spatialization model.

The spatialized audio transducer may be a phased array or a sparse array. The array of audio transducers may be linear or curved. A sparse array is an array that has discontinuous spacing with respect to an idealized channel model, e.g., four or fewer sonic emitters, where the sound emitted from the transducers is internally modelled at higher dimensionality, and then reduced or superposed. In some cases, the number of sonic emitters is four or more, derived from a larger number of channels of a channel model, e.g., greater than eight.

Three dimensional acoustic fields are modelled from mathematical and physical constraints. The systems and methods provide a number of loudspeakers, i.e., free-field acoustic transmission transducers that emit into a space including both ears of the targeted listener. These systems are controlled by complex multichannel algorithms in real time.

The system may presume a fixed relationship between the sparse speaker array and the listener's ears, or a feedback system may be employed to track the listener's ears or head movements and position.

The algorithm employed provides surround-sound imaging and sound field control by delivering highly localized audio through an array of speakers. Typically, the speakers in a sparse array seek to operate in a wide-angle dispersion mode of emission, rather than a more traditional "beam mode," in which each transducer emits a narrow angle sound field toward the listener. That is the transducer emission pattern is sufficiently wide to avoid sonic spatial lulls.

In some cases, the system supports multiple listeners within an environment, though in that case, either an enhanced stereo mode of operation, or head tracking is employed. For example, when two listeners are within the environment, nominally the same signal is sought to be presented to the left and right ears of each listener, regardless of their orientation in the room. In a non-trivial implementation, this requires that the multiple transducers cooperate to cancel left-ear emissions at each listener's right ear, and cancel right-ear emissions at each listener's left ear. However, heuristics may be employed to reduce the need for a minimum of a pair of transducers for each listener.

Typically, the spatial audio is not only normalized for binaural audio amplitude control, but also group delay, so that the correct sounds are perceived to be present at each ear at the right time. Therefore, in some cases, the signals may represent a compromise of fine amplitude and delay control.

The source content can thus be virtually steered to various angles so that different dynamically-varying sound fields can be generated for different listeners according to their location.

A signal processing method is provided for delivering spatialized sound in various ways using deconvolution filters to deliver discrete Left/Right ear audio signals from the speaker array. The method can be used to provide private listening areas in a public space, address multiple listeners with discrete sound sources, provide spatialization of source material for a single listener (virtual surround sound), and enhance intelligibility of conversations in noisy environments using spatial cues, to name a few applications.

In some cases, a microphone or an array of microphones may be used to provide feedback of the sound conditions at a voxel in space, such as at or near the listener's ears. While it might initially seem that, with what amounts to a headset, one could simply use single transducers for each ear, the present technology does not constrain the listener to wear headphones, and the result is more natural. Further, the microphone(s) may be used to initially learn the room conditions, and then not be further required, or may be selectively deployed for only a portion of the environment. Finally, microphones may be used to provide interactive voice communications.

In a binaural mode, the speaker array produces two emitted signals, aimed generally towards the primary listener's ears—one discrete beam for each ear. The shapes of these beams are designed using a convolutional or inverse filtering approach such that the beam for one ear contributes almost no energy at the listener's other ear. This provides convincing virtual surround sound via binaural source signals. In this mode, binaural sources can be rendered accurately without headphones. A virtual surround sound experience is delivered without physical discrete surround speakers as well. Note that in a real environment, echoes of walls and surfaces color the sound and produce delays, and a natural sound emission will provide these cues related to the environment. The human ear has some ability to distinguish between sounds from front or rear, due to the shape of the ear and head, but the key feature for most source materials is timing and acoustic coloration. Thus, the liveness of an environment may be emulated by delay filters in the processing, with emission of the delayed sounds from the same array with generally the same beaming pattern as the main acoustic signal.

In one aspect, a method is provided for producing binaural sound from a speaker array in which a plurality of audio signals is received from a plurality of sources and each audio signal is filtered, through a Head-Related Transfer Function (HRTF) based on the position and orientation of the listener to the emitter array. The filtered audio signals are merged to form binaural signals. In a sparse transducer array, it may be desired to provide cross-over signals between the respective binaural channels, though in cases where the array is sufficiently directional to provide physical isolation of the listener's ears, and the position of the listener is well defined and constrained with respect to the array, cross-over may not be required. Typically, the audio signals are processed to provide cross talk cancellation.

When the source signal is prerecorded music or other processed audio, the initial processing may optionally remove the processing effects seeking to isolate original objects and their respective sound emissions, so that the spatialization is accurate for the soundstage. In some cases, the spatial locations inferred in the source are artificial, i.e., object locations are defined as part of a production process, and do not represent an actual position. In such cases, the spatialization may extend back to original sources, and seek to (re)optimize the process, since the original production was likely not optimized for reproduction through a spatialization system.

In a sparse linear speaker array, filtered/processed signals for a plurality of virtual channels are processed separately, and then combined, e.g., summed, for each respective virtual speaker into a single speaker signal, then the speaker signal is fed to the respective speaker in the speaker array and transmitted through the respective speaker to the listener.

The summing process may correct the time alignment of the respective signals. That is, the original complete array signals have time delays for the respective signals with respect to each ear. When summed without compensation, to produce a composite signal that signal would include multiple incrementally time-delayed representations, which arrive at the ears at different times, representing the same timepoint. Thus, the compression in space leads to an expansion in time. However, since the time delays are programmed per the algorithm, these may be algorithmically compressed to restore the time alignment.

The result is that the spatialized sound has an accurate time of arrival at each ear, phase alignment, and a spatialized sound complexity.

In another aspect, a method is provided for producing a localized sound from a speaker array by receiving at least one audio signal, filtering each audio signal through a set of spatialization filters (each input audio signal is filtered through a different set of spatialization filters, which may be interactive or ultimately combined), wherein a separate spatialization filter path segment is provided for each speaker in the speaker array so that each input audio signal is filtered through a different spatialization filter segment, summing the filtered audio signals for each respective speaker into a speaker signal, transmitting each speaker signal to the respective speaker in the speaker array, and delivering the signals to one or more regions of the space (typically occupied by one or multiple listeners, respectively).

In this way, the complexity of the acoustic signal processing path is simplified as a set of parallel stages representing array locations, with a combiner. An alternate method for providing two-speaker spatialized audio provides an object-based processing algorithm, which beam traces audio paths between respective sources, off scattering objects, to the listener's ears. This later method provides more arbitrary algorithmic complexity, and lower uniformity of each processing path.

In some cases, the filters may be implemented as recurrent neural networks or deep neural networks, which typically emulate the same process of spatialization, but without explicit discrete mathematical functions, and seeking an optimum overall effect rather than optimization of each effect in series or parallel. The network may be an overall network that receives the sound input and produces the sound output, or a channelized system in which each channel, which can represent space, frequency band, delay, source object, etc., is processed using a distinct network, and the network outputs combined. Further, the neural networks or other statistical optimization networks may provide coefficients for a generic signal processing chain, such as a digital filter, which may be finite impulse response (FIR) characteristics and/or infinite impulse response (IIR) characteristics, bleed paths to other channels, specialized time and delay equalizers (where direct implementation through FIR or IIR filters is undesired or inconvenient).

More typically, a discrete digital signal processing algorithm is employed to process the audio data, based on physical (or virtual) parameters. In some cases, the algorithm may be adaptive, based on automated or manual feedback. For example, a microphone may detect distortion due to resonances or other effects, which are not intrinsically compensated in the basic algorithm. Similarly, a generic HRTF may be employed, which is adapted based on actual parameters of the listener's head.

The spatial location and mapping sensor may be used to track both listeners (and either physically locate their ears in space, such as by using a camera, or inferentially locate their ears based on statistical head models), as well as objects e.g., inanimate objects, such as floor, ceiling and walls, furniture, and the like. Advantageously, the spatialization algorithm considers both direct transmission of acoustic waves through the air and reflected waves off surfaces. Further, the spatialization algorithm may consider multiple listeners and multiple objects in a soundscape, and their dynamic changes over time. In most cases, the SLAM sensor does not directly reveal acoustic characteristics of an object. However, there is typically sufficient information and context to identify the object, and based on that identification, a database lookup may be performed to provide typical acoustic characteristics for that type of object. A microphone or microphone array may be used to adaptively tune the algorithm. For example, a known signal sequence may be emitted from the speaker array, and the environment response received at the microphone used to calculate acoustic parameters. Since the emitted sounds from the speaker array are known, the media sounds may also be used to tune the spatialization parameters, similar to typical adaptive echo cancellation. Indeed, echo cancellation algorithms may be used to parameterize time, frequency-dependent attenuation, resonances, and other factors. The SLAM sensor can assist in making physical sense of the 1D acoustic response received at a respective microphone.

In a further aspect, a speaker array system for producing localized sound comprises an input which receives a plurality of audio signals from at least one source; a computer with a processor and a memory which determines whether the plurality of audio signals should be processed by an audio signal processing system; a speaker array comprising a plurality of loudspeakers; wherein the audio signal processing system comprises: at least one Head-Related Transfer Function (HRTF), which either senses or estimates a spatial relationship of the listener to the speaker array; and combiners configured to combine a plurality of processing channels to form a speaker drive signal. The audio signal processing system implements spatialization filters; wherein the speaker array delivers the respective speaker signals (or the beamforming speaker signals) through the plurality of loudspeakers to one or more listeners.

By beamforming, it is intended that the emission of the transducer is not omnidirectional or cardioid, and rather has an axis of emission, with separation between left and right ears greater than 3 dB, preferably greater than 6 dB, more preferably more than 10 dB, and with active cancellation between transducers, higher separations may be achieved.

The plurality of audio signals can be processed by the digital signal processing system including binauralization before being delivered to the one or more listeners through the plurality of loudspeakers.

A listener head-tracking unit may be provided which adjusts the binaural processing system and acoustic processing system based on a change in a location of the one or more listeners.

The binaural processing system may further comprise a binaural processor which computes the left HRTF and right HRTF, or a composite HRTF in real-time.

The inventive method employs algorithms that allow it to deliver beams configured to produce binaural sound—targeted sound to each ear—without the use of headphones, by using deconvolution or inverse filters and physical or virtual beamforming. In this way, a virtual surround sound experience can be delivered to the listener of the system. The system avoids the use of classical two-channel "cross-talk cancellation" to provide superior speaker-based binaural sound imaging.

Binaural 3D sound reproduction is a type of sound reproduction achieved by headphones. On the other hand, transaural 3D sound reproduction is a type of sound reproduction achieved by loudspeakers. See, Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, March 2011, 2011. Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, March 2011, 2011. Kaiser, Fabio. "Transaural Audio—The reproduction of binaural signals over loudspeakers." PhD diss., Diploma Thesis, Universität für Musik und darstellende Kunst Graz/Institut für Elekronische Musik und Akustik/IRCAM, March 2011, 2011. Transaural audio is a three-dimensional sound spatialization technique which is capable of reproducing binaural signals over loudspeakers. It is based on the cancellation of the acoustic paths occurring between loudspeakers and the listeners ears.

Studies in psychoacoustics reveal that well recorded stereo signals and binaural recordings contain cues that help create robust, detailed 3D auditory images. By focusing left and right channel signals at the appropriate ear, one implementation of 3D spatialized audio, called "MyBeam" (Comhear Inc., San Diego CA) maintains key psychoacoustic cues while avoiding crosstalk via precise beamformed directivity.

Together, these cues are known as Head Related Transfer Functions (HRTF). Briefly stated, HRTF component cues are interaural time difference (ITD, the difference in arrival time of a sound between two locations), the interaural intensity difference (IID, the difference in intensity of a sound between two locations, sometimes called ILD), and interaural phase difference (IPD, the phase difference of a wave that reaches each ear, dependent on the frequency of the sound wave and the ITD). Once the listener's brain has analyzed IPD, ITD, and ILD, the location of the sound source can be determined with relative accuracy.

The present invention improves on a prior method for the optimization of beamforming and controlling a small linear speaker array to produce spatialized, localized, and binaural or transaural virtual surround or 3D sound. The signal processing method allows a small speaker array to deliver sound in various ways using highly optimized inverse filters, delivering narrow beams of sound to the listener while producing negligible artifacts. Unlike earlier compact beamforming audio technologies, the method does not rely on ultra-sonic or high-power amplification. The technology may be implemented using low power technologies, producing 98 dB SPL at one meter, while utilizing around 20 watts of peak power. In the case of speaker applications, the primary use-case allows sound from a small (10"-20") linear array of speakers to focus sound in narrow beams to:

- Direct sound in a highly intelligible manner where it is desired and effective;
- Limit sound where it is not wanted or where it may be disruptive
- Provide non-headphone based, high definition, steerable audio imaging in which a stereo or binaural signal is directed to the ears of the listener to produce vivid 3D audible perception.

In the case of microphone applications, the basic use-case allows sound from an array of microphones (ranging from a few small capsules to dozens in 1-, 2- or 3-dimensional arrangements) to capture sound in narrow beams. These beams may be dynamically steered and may cover many talkers and sound sources within its coverage pattern, amplifying desirable sources and providing for cancellation or suppression of unwanted sources.

In a multipoint teleconferencing or videoconferencing application, the technology allows distinct spatialization and localization of each participant in the conference, providing a significant improvement over existing technologies in which the sound of each talker is spatially overlapped. Such overlap can make it difficult to distinguish among the different participants without having each participant identify themselves each time he or she speaks, which can detract from the feel of a natural, in-person conversation. Additionally, the invention can be extended to provide real-time beam steering and tracking of the listener's location using video analysis or motion sensors, therefore continuously optimizing the delivery of binaural or spatialized audio as the listener moves around the room or in front of the speaker array.

The system may be smaller and more portable than most, if not all, comparable speaker systems. Thus, the system is useful for not only fixed, structural installations such as in rooms or virtual reality caves, but also for use in private vehicles, e.g., cars, mass transit, such buses, trains and airplanes, and for open areas such as office cubicles and wall-less classrooms.

The SLAM sensor may be incorporated within a speaker housing, a set top box, game console (e.g., Microsoft Kinect sensor), etc.

The technology is improved over the MyBeam, in that it provides similar applications and advantages, while requiring fewer speakers and amplifiers. For example, the method virtualizes a 12-channel beamforming array to two channels. In general, the algorithm downmixes each pair of 6 channels (designed to drive a set of 6 equally spaced-speakers in a line array) into a single speaker signal for a speaker that is mounted in the middle of where those 6 speakers would be. Typically, the virtual line array is 12 speakers, with 2 real speakers located between elements 3-4 and 9-10. The real speakers are mounted directly in the center of each set of 6 virtual speakers. If (s) is the center-to-center distance between speakers, then the distance from the center of the array to the center of each real speaker is: A=3*s. The left speaker is offset −A from the center, and the right speaker is offset A. The primary algorithm is simply a downmix of the 6 virtual channels, with a limiter and/or compressor applied to prevent saturation or clipping. For example, the left channel is:

$$L_{out}=\text{Limit}(L_1+L_2+L_3+L_4+L_5+L_6)$$

However, because of the change in positions of the source of the audio, the delays between the speakers need to be taken into account as described below. In some cases, the phase of some drivers may be altered to limit peaking, while avoiding clipping or limiting distortion.

Since six speakers are being combined into one at a different location, the change in distance travelled, i.e. delay, to the listener can be significant particularly at higher frequencies. The delay can be calculated based on the change in travelling distance between the virtual speaker and the real speaker. For this discussion, we will only concern ourselves with the left side of the array. The right side is similar but inverted. To calculate the distance from the listener to each virtual speaker, assume that the speaker, n, is numbered 1 to 6, where 1 is the speaker closest to the center, and 6 is the farthest left. The distance from the center of the array to the speaker is: d=((n−1)+0.5)*s Using the Pythagorean theorem, the distance from the speaker to the listener can be calculated as follows:

$$d_n=\sqrt{l^2+(((n-1)+0.5)*s)^2}$$

The distance from the real speaker to the listener is $$d_r=\sqrt{l^2+(3*s)^2}$$

The sample delay for each speaker can be calculated by the different between the two listener distances. This can them be converted to samples (assuming the speed of sound is 343 m/s and the sample rate is 48 kHz.

$$\text{delay}=\frac{(d_n-d_r)}{343\ \frac{\text{m}}{\text{s}}}*48000\text{ Hz}$$

This can lead to a significant delay between listener distances. For example, if the speaker-to-speaker distance is 38 mm, and the listener is 500 mm from the array, the delay from the virtual far-left speaker (n=6) to the real speaker is:

$$d_n=\sqrt{.5^2+(5.5*.038)^2}=.541\text{ m}$$

$$d_r=\sqrt{.5^2+(3*.038)^2}=.513\text{ m}$$

$$\text{delay}=\frac{.541-.512}{343}*48000=4\text{ samples}$$

Though the delay seems small, the amount of delay is significant, particularly at higher frequencies, where an entire cycle may be as little as 3 or 4 samples.

TABLE 1

| Speaker | Delay relative to real speaker |
|---|---|
| 1 | −2 |
| 2 | −1 |
| 3 | −1 |
| 4 | 1 |
| 5 | 2 |
| 6 | 4 |

Thus, when combining the signals for the virtual speakers into the physical speaker signal, the time offset is preferably compensated based on the displacement of the virtual speaker from the physical one. This can be accomplished at various places in the signal processing chain.

When using a virtual speaker array that is represented through a physical array having a smaller number of transducers, the ability to localize sound for multiple listeners is reduced. Therefore, where a large audience is considered, providing spatialized audio to each listener based on a respective HRTF for each listener becomes difficult. In such cases, the strategy is typically to provide a large physical separation between speakers, so that the line of sight for a respective listener for each speaker is different, leading to stereo audio perception. However, in some cases, such as where different listeners are targeted with different audio programs, a large baseline stereo system is ineffective. In a large physical space with a sparse population of listeners, the SLAM sensor permits effective localization for each of the individual users.

The present technology therefore provides downmixing of spatialized audio virtual channels to maintain delay encoding of virtual channels while minimizing the number of physical drivers and amplifiers required.

At similar acoustic output, the power per speaker will, of course, be higher with the downmixing, and this leads to peak power handling limits. Given that the amplitude, phase and delay of each virtual channel is important information, the ability to control peaking is limited. However, given that clipping or limiting is particularly dissonant, control over the other variables is useful in achieving a high power rating. Control may be facilitated by operating on a delay, for example in a speaker system with a 30 Hz lower range, a 125 mS delay may be imposed, to permit calculation of all significant echoes and peak clipping mitigation strategies. Where video content is also presented, such a delay may be reduced. However, delay is not required.

In some cases, the listener is not centered with respect to the physical speaker transducers, or multiple listeners are dispersed within an environment. Further, the peak power to a physical transducer resulting from a proposed downmix may exceed a limit. The downmix algorithm in such cases, and others, may be adaptive or flexible, and provide different mappings of virtual transducers to physical speaker transducers.

For example, due to listener location or peak level, the allocation of virtual transducers in the virtual array to the physical speaker transducer downmix may be unbalanced, such as, in an array of 12 virtual transducers, 7 virtual transducers downmixed for the left physical transducer, and 5 virtual transducers for the right physical transducer. This has the effect of shifting the axis of sound, and also shifting the additive effect of the adaptively assigned transducer to the other channel. If the transducer is out of phase with respect to the other transducers, the peak will be abated, while if it is in phase, constructive interference will result.

The reallocation may be of the virtual transducer at a boundary between groups, or may be a discontiguous virtual transducer. Similarly, the adaptive assignment may be of more than one virtual transducer.

In addition, the number of physical transducers may be an even or odd number greater than 2, and generally less than the number of virtual transducers. In the case of three physical transducers, generally located at nominal left, center and right, the allocation between virtual transducers and physical transducers may be adaptive with respect to group size, group transition, continuity of groups, and possible overlap of groups (i.e., portions of the same virtual transducer signal being represented in multiple physical channels) based on location of listener (or multiple listeners), spatialization effects, peak amplitude abatement issues, and listener preferences.

The system may employ various technologies to implement an optimal HRTF. In the simplest case, an optimal prototype HRTF is used regardless of listener and environment. In other cases, the characteristics of the listener(s) are determined by logon, direct input, camera, biometric measurement, or other means, and a customized or selected HRTF selected or calculated for the particular listener(s). This is typically implemented within the filtering process, independent of the downmixing process, but in some cases, the customization may be implemented as a post-process or partial post-process to the spatialization filtering. That is, in addition to downmixing, a process after the main spatialization filtering and virtual transducer signal creation may be implemented to adapt or modify the signals dependent on the listener(s), the environment, or other factors, separate from downmixing and timing adjustment.

As discussed above, limiting the peak amplitude is potentially important, as a set of virtual transducer signals, e.g., 6, are time aligned and summed, resulting in a peak amplitude potentially six times higher than the peak of any one virtual transducer signal. One way to address this problem is to simply limit the combined signal or use a compander (non-linear amplitude filter). However, these produce distortion, and will interfere with spatialization effects. Other options include phase shifting of some virtual transducer signals, but this may also result in audible artifacts, and requires imposition of a delay. Another option provided is to allocate virtual transducers to downmix groups based on phase and amplitude, especially those transducers near the transition between groups. While this may also be implemented with a delay, it is also possible to near instantaneously shift the group allocation, which may result in a positional artifact, but not a harmonic distortion artifact. Such techniques may also be combined, to minimize perceptual distortion by spreading the effect between the various peak abatement options.

DETAILED DESCRIPTION OF THE PREFERRED EMBODIMENTS

Figure 1A:
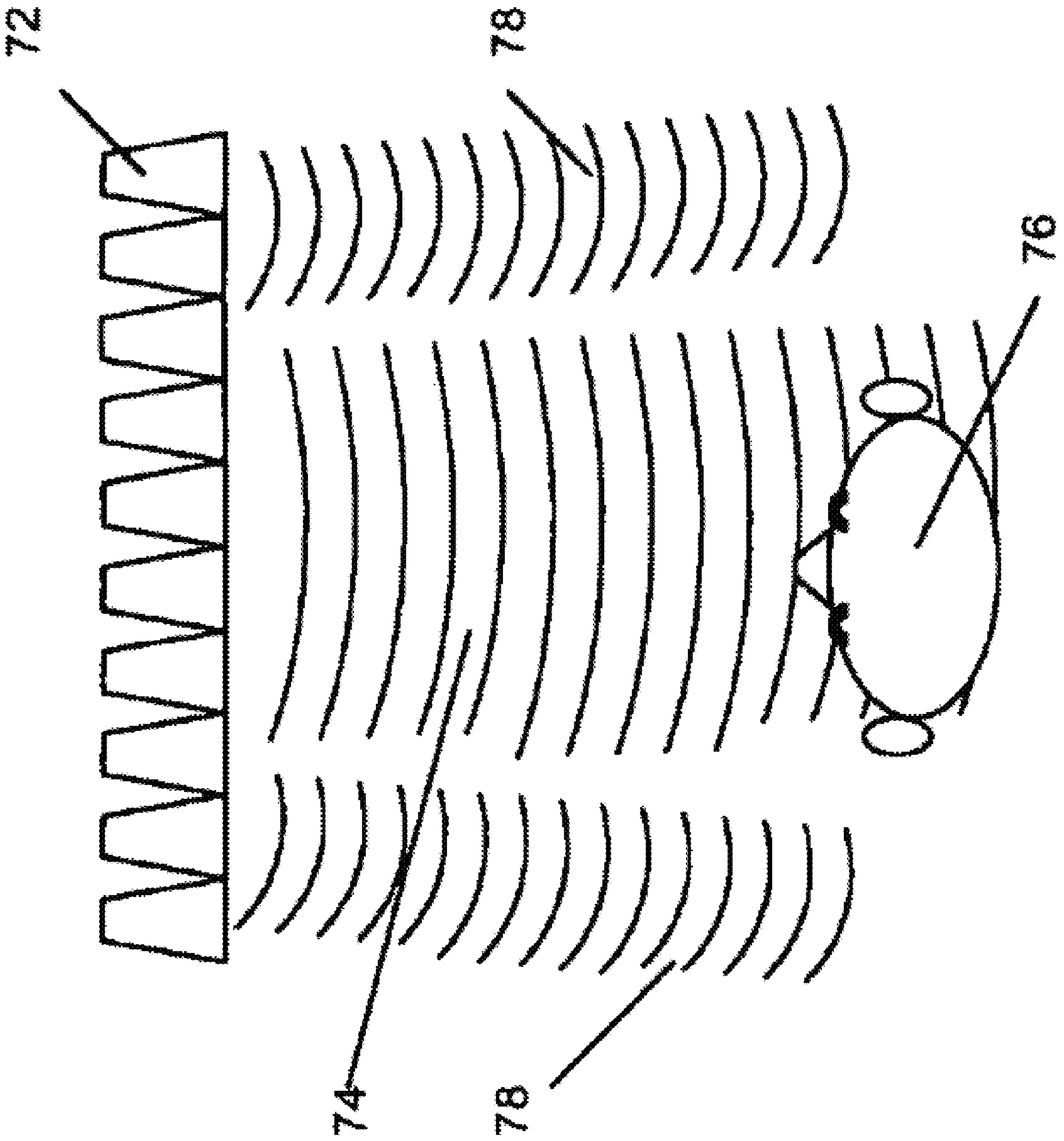
Fig. 1A Prior Art
FIGS. 1A and 1B show diagrams illustrating the wave field synthesis (WFS) mode operation used for private listening (FIG. 1A) and the use of WFS mode for multi-user, multi-position audio applications (FIG. 1B).

In binaural mode, the speaker array provides two sound outputs aimed towards the primary listener's ears. The inverse filter design method comes from a mathematical simulation in which a speaker array model approximating the real-world is created and virtual microphones are placed throughout the target sound field. A target function across these virtual microphones is created or requested. Solving the inverse problem using regularization, stable and realizable inverse filters are created for each speaker element in the array. The source signals are convolved with these inverse filters for each array element.

In a beamforming, or wave field synthesis (WFS), mode, the transform processor array provides sound signals representing multiple discrete sources to separate physical locations in the same general area. Masking signals may also be dynamically adjusted in amplitude and time to provide optimized masking and lack of intelligibility of listener's signal of interest. The WFS mode also uses inverse filters. Instead of aiming just two beams at the listener's ears, this mode uses multiple beams aimed or steered to different locations around the array.

The technology involves a digital signal processing (DSP) strategy that allows for both binaural rendering and WFS/sound beamforming, either separately or simultaneously in combination. As noted above, the virtual spatialization is then combined for a small number of physical transducers, e.g., 2 or 4.

For both binaural and WFS mode, the signal to be reproduced is processed by filtering it through a set of digital filters. These filters may be generated by numerically solving an electro-acoustical inverse problem. The specific parameters of the specific inverse problem to be solved are described below. In general, however, the digital filter design is based on the principle of minimizing, in the least squares sense, a cost function of the type $J=E+\beta V$.

The cost function is a sum of two terms: a performance error E, which measures how well the desired signals are reproduced at the target points, and an effort penalty $\beta V$, which is a quantity proportional to the total power that is input to all the loudspeakers. The positive real number $\beta$ is a regularization parameter that determines how much weight to assign to the effort term. Note that, according to the present implementation, the cost function may be applied after the summing, and optionally after the limiter/peak abatement function is performed.

By varying $\beta$ from zero to infinity, the solution changes gradually from minimizing the performance error only to minimizing the effort cost only. In practice, this regularization works by limiting the power output from the loudspeakers at frequencies at which the inversion problem is ill-conditioned. This is achieved without affecting the performance of the system at frequencies at which the inversion problem is well-conditioned. In this way, it is possible to prevent sharp peaks in the spectrum of the reproduced sound. If necessary, a frequency dependent regularization parameter can be used to attenuate peaks selectively.

Wave Field Synthesis/Beamforming Mode

WFS sound signals are generated for a linear array of virtual speakers, which define several separated sound beams. In WFS mode operation, different source content from the loudspeaker array can be steered to different angles by using narrow beams to minimize leakage to adjacent areas during listening. As shown in FIG. 1A, private listening is made possible using adjacent beams of music and/or noise delivered by loudspeaker array 72. The direct sound beam 74 is heard by the target listener 76, while beams of masking noise 78, which can be music, white noise or some other signal that is different from the main beam 74, are directed around the target listener to prevent unintended eavesdropping by other persons within the surrounding area. Masking signals may also be dynamically adjusted in amplitude and time to provide optimized masking and lack of intelligibility of listener's signal of interest as shown in later figures which include the DRCE DSP block.

When the virtual speaker signals are combined, a significant portion of the spatial sound cancellation ability is lost; however, it is at least theoretically possible to optimize the sound at each of the listener's ears for the direct (i.e., non-reflected) sound path.

Figure 1B:
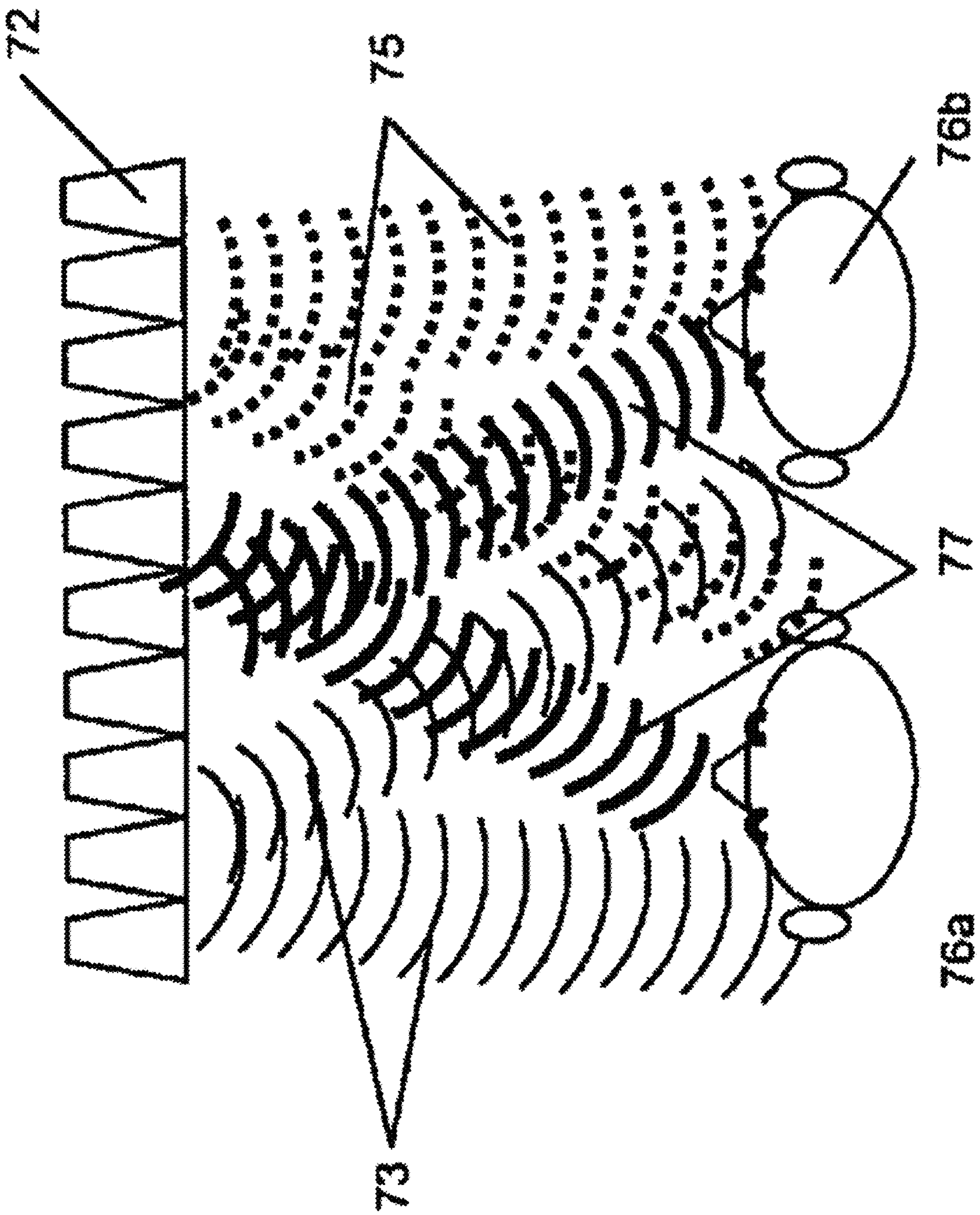
Fig. 1B Prior Art

In the WFS mode, the array provides multiple discrete source signals. For example, three people could be positioned around the array listening to three distinct sources with little interference from each others' signals. FIG. 1B illustrates an exemplary configuration of the WFS mode for multi-user/multi-position application. With only two speaker transducers, full control for each listener is not possible, though through optimization, an acceptable (improved over stereo audio) is available. As shown, array 72 defines discrete sounds beams 73, 75 and 77, each with different sound content, to each of listeners 76*a* and 76*b*. While both listeners are shown receiving the same content (each of the three beams), different content can be delivered to one or the other of the listeners at different times. When the array signals are summed, some of the directionality is lost, and in some cases, inverted. For example, where a set of 12 speaker array signals are summed to 4 speaker signals, directional cancellation signals may fail to cancel at most locations. However, preferably adequate cancellation is preferably available for an optimally located listener.

Figure 2:
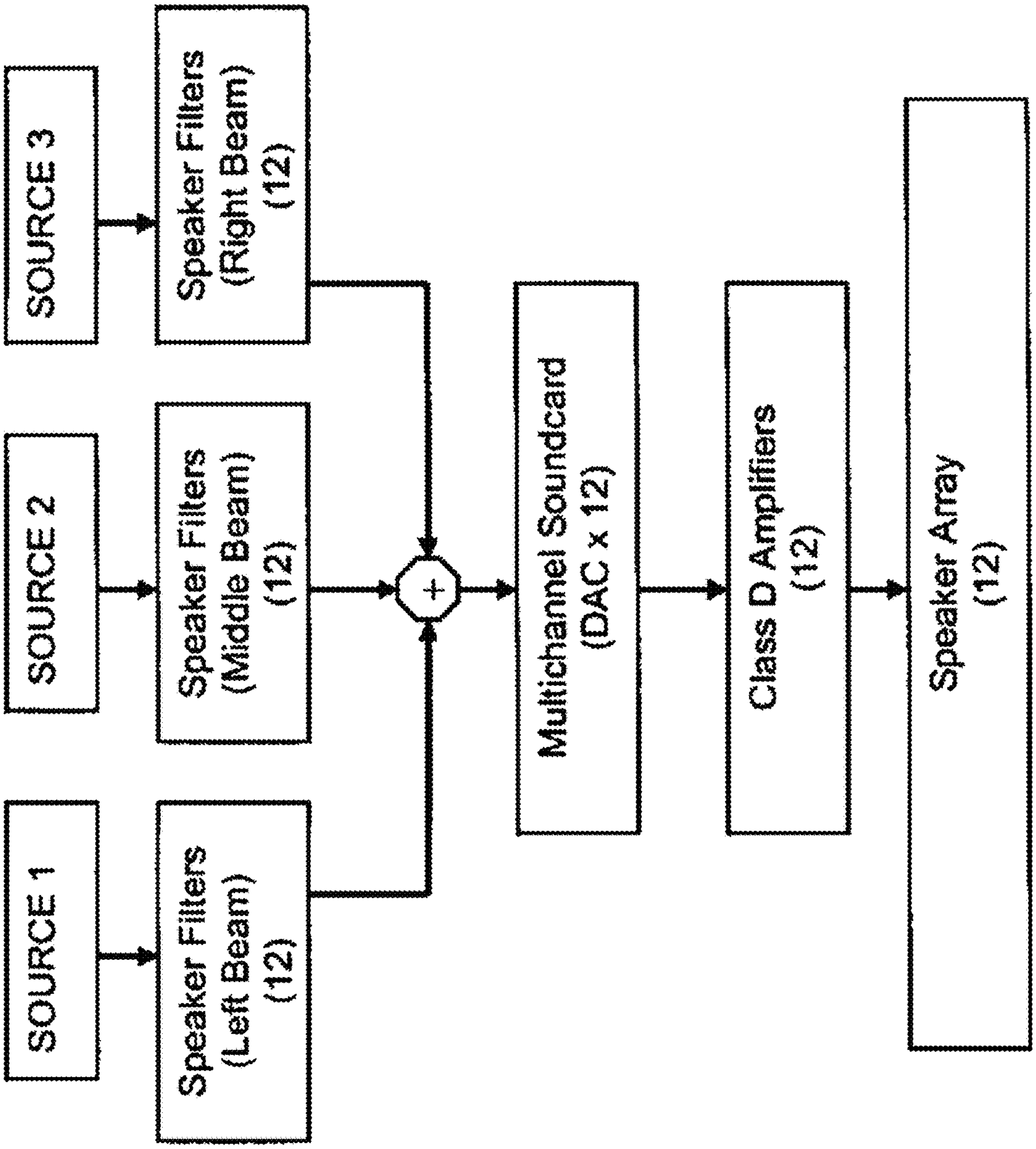
Fig. 2 Prior Art
FIG. 2 is a block diagram showing the WFS signal processing chain.

The WFS mode signals are generated through the DSP chain as shown in FIG. 2. Discrete source signals 801, 802 and 803 are each convolved with inverse filters for each of the loudspeaker array signals. The inverse filters are the mechanism that allows that steering of localized beams of audio, optimized for a particular location according to the specification in the mathematical model used to generate the filters. The calculations may be done real-time to provide on-the-fly optimized beam steering capabilities which would allow the users of the array to be tracked with audio. In the illustrated example, the loudspeaker array 812 has twelve elements, so there are twelve filters 804 for each source. The resulting filtered signals corresponding to the same $n^{th}$ loudspeaker signal are added at combiner 806, whose resulting signal is fed into a multi-channel soundcard 808 with a DAC corresponding to each of the twelve speakers in the array. The twelve signals are then divided into channels, i.e., 2 or 4, and the members of each subset are then time adjusted for the difference in location between the physical location of the corresponding array signal, and the respective physical transducer, and summed, and subject to a limiting algorithm. The limited signal is then amplified using a class D amplifier 810 and delivered to the listener(s) through the two or four speaker array 812.

Figure 3:
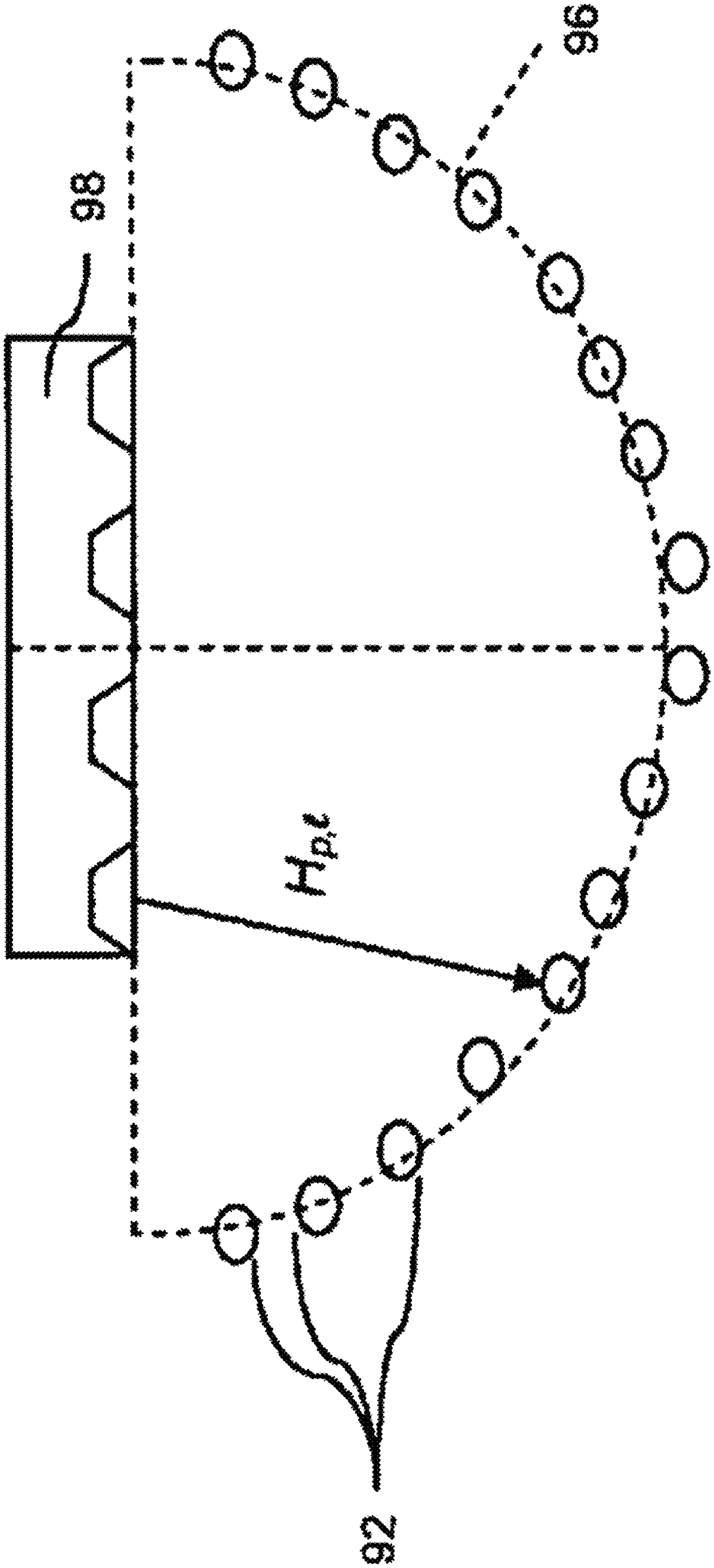
Fig. 3 Prior Art
FIG. 3 is a diagrammatic view of an exemplary arrangement of control points for WFS mode operation.

FIG. 3 illustrates how spatialization filters are generated. Firstly, it is assumed that the relative arrangement of the N array units is given. A set of M virtual control points 92 is defined where each control point corresponds to a virtual microphone. The control points are arranged on a semicircle surrounding the array 98 of N speakers and centered at the center of the loudspeaker array. The radius of the arc 96 may scale with the size of the array. The control points 92 (virtual microphones) are uniformly arranged on the arc with a constant angular distance between neighboring points.

An M×N matrix H(f) is computed, which represents the electro-acoustical transfer function between each loudspeaker of the array and each control point, as a function of the frequency f, where $H_p$,l corresponds to the transfer function between the $l^{th}$ speaker (of N speakers) and the $p^{th}$ control point 92. These transfer functions can either be measured or defined analytically from an acoustic radiation model of the loudspeaker. One example of a model is given by an acoustical monopole, given by the following equation:

$$H_{p,\ell(f)} = \frac{\exp[-j2\pi f r_{p,\ell}/c]}{4\pi r_{p,\ell}}$$

where c is the speed of sound propagation, f is the frequency and $r_{p,l}$ is the distance between the l the loudspeaker and the $p^{th}$ control point.

Instead of correcting for time delays after the array signals are fully defined, it is also possible to use the correct speaker location while generating the signal, to avoid reworking the signal definition.

A more advanced analytical radiation model for each loudspeaker may be obtained by a multipole expansion, as is known in the art. (See, e.g., V. Rokhlin, "Diagonal forms of translation operators for the Helmholtz equation in three dimensions", Applied and Computations Harmonic Analysis, 1:82-93, 1993.)

A vector p(f) is defined with M elements representing the target sound field at the locations identified by the control points 92 and as a function of the frequency f. There are several choices of the target field. One possibility is to assign the value of 1 to the control point(s) that identify the direction(s) of the desired sound beam(s) and zero to all other control points.

The digital filter coefficients are defined in the frequency (f) domain or digital-sampled (z)-domain and are the N elements of the vector a(f) or a(z), which is the output of the filter computation algorithm. The filer may have different topologies, such as FIR, IIR, or other types. The vector a is computed by solving, for each frequency f or sample parameter z, a linear optimization problem that minimizes e.g., the following cost function $$J(f)=\|H(f)a(f)-p(f)\|^2+\beta\|a(f)\|^2.$$

The symbol ‖ . . . ‖ indicates the $L^2$ norm of a vector, and R is a regularization parameter, whose value can be defined by the designer. Standard optimization algorithms can be used to numerically solve the problem above.

Figure 4:
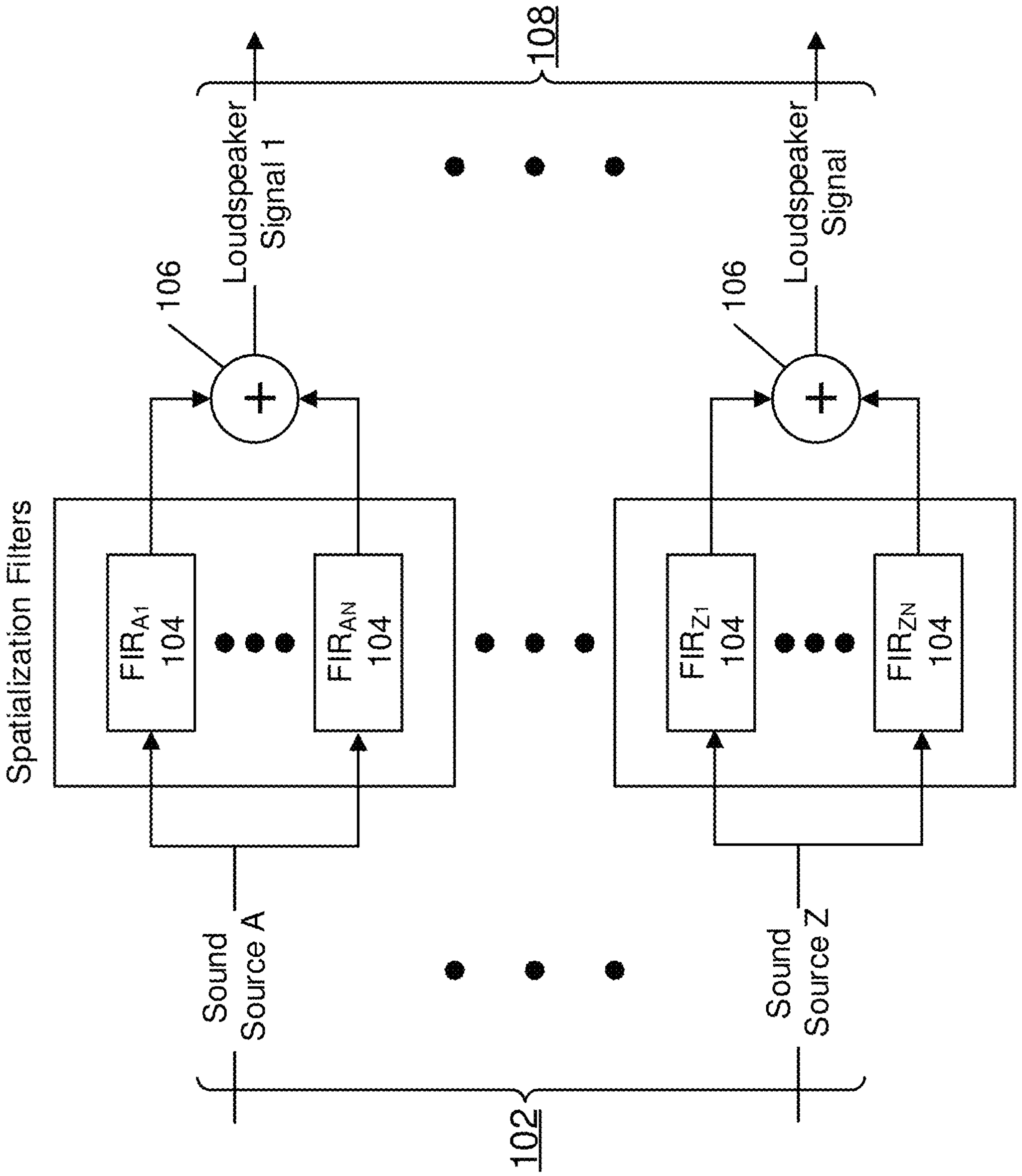
Fig. 4 Prior Art
FIG. 4 is a diagrammatic view of a first embodiment of a signal processing scheme for WFS mode operation.

Referring now to FIG. 4, the input to the system is an arbitrary set of audio signals (from A through Z), referred to as sound sources 102. The system output is a set of audio signals (from 1 through N) driving the N units of the loudspeaker array 108. These N signals are referred to as "loudspeaker signals".

For each sound source 102, the input signal is filtered through a set of N digital filters 104, with one digital filter 104 for each loudspeaker of the array. These digital filters 104 are referred to as "spatialization filters", which are generated by the algorithm disclosed above and vary as a function of the location of the listener(s) and/or of the intended direction of the sound beam to be generated.

The digital filters may be implemented as finite impulse response (FIR) filters; however, greater efficiency and better modelling of response may be achieved using other filter topologies, such as infinite impulse response (IIR) filters, which employ feedback or re-entrancy. The filters may be implemented in a traditional DSP architecture, or within a graphic processing unit (GPU, developer.nvidia.com/vrworks-audio-sdk-depth) or audio processing unit (APU, www.nvidia.com/en-us/drivers/apu/). Advantageously, the acoustic processing algorithm is presented as a ray tracing, transparency, and scattering model.

For each sound source 102, the audio signal filtered through the $n^{th}$ digital filter 104 (i.e., corresponding to the $n^{th}$ loudspeaker) is summed at combiner 106 with the audio signals corresponding to the different audio sources 102 but to the same n.sup.th loudspeaker. The summed signals are then output to loudspeaker array 108.

Figure 5:
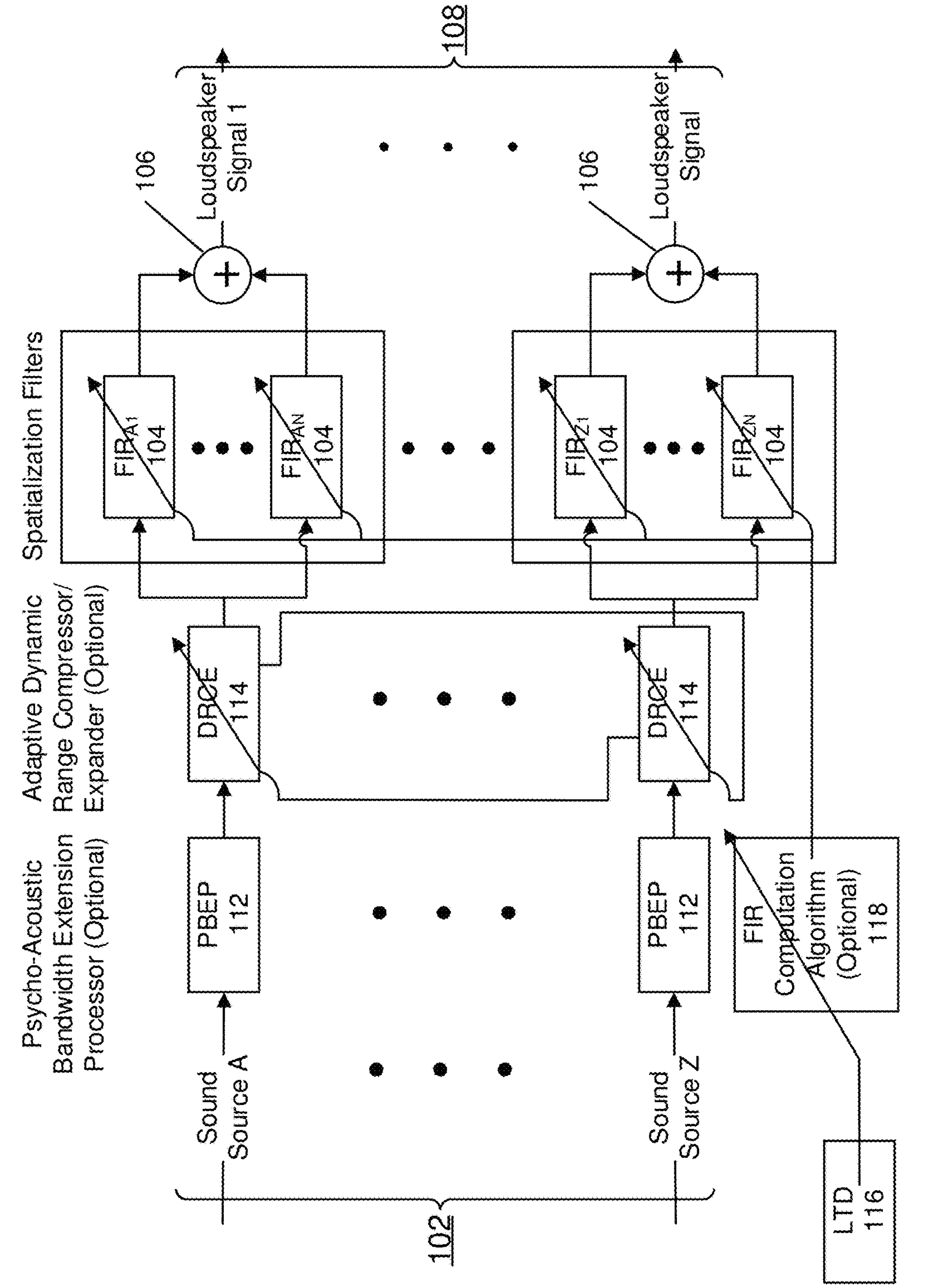
Fig. 5 Prior Art
FIG. 5 is a diagrammatic view of a second embodiment of a signal processing scheme for WFS mode operation.
Figure 6A:
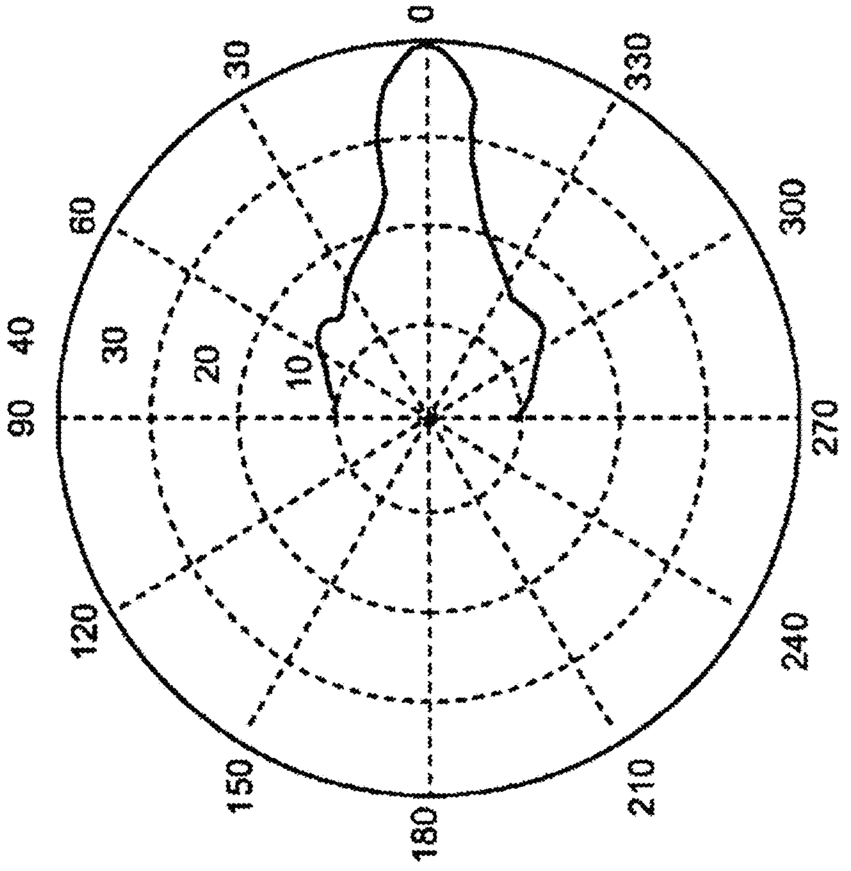
Fig. 6A Prior Art
FIGS. 6A-6E are a set of polar plots showing measured performance of a prototype speaker array with the beam steered to 0 degrees at frequencies of 10000, 5000, 2500, 1000 and 600 Hz, respectively.
Figure 6B:
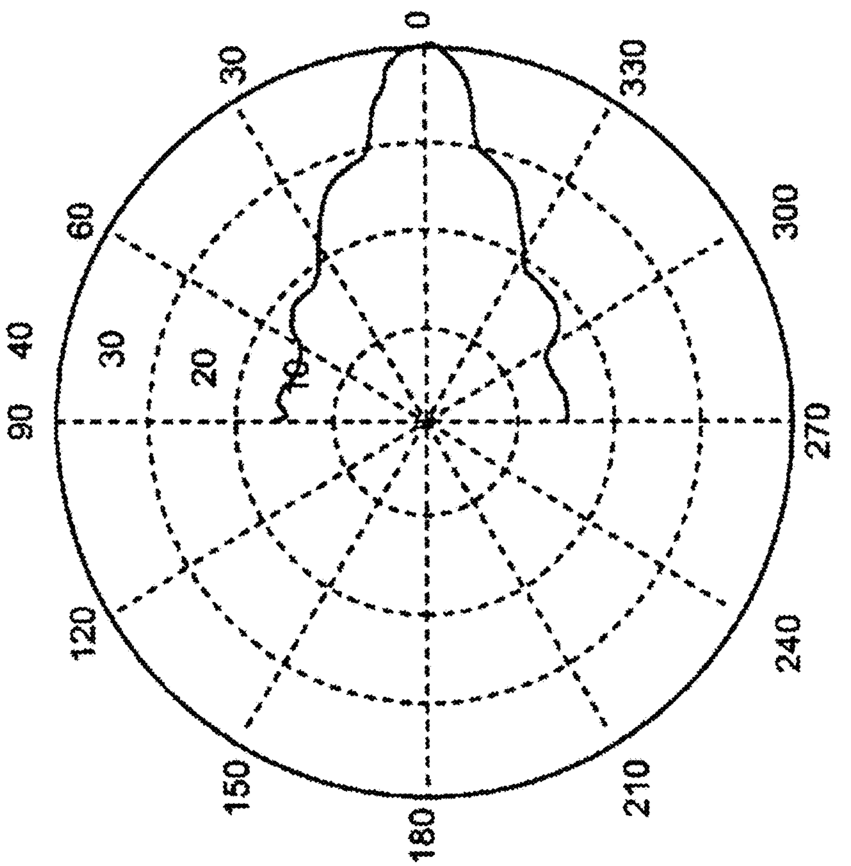
Fig. 6B Prior Art
Figure 6D:
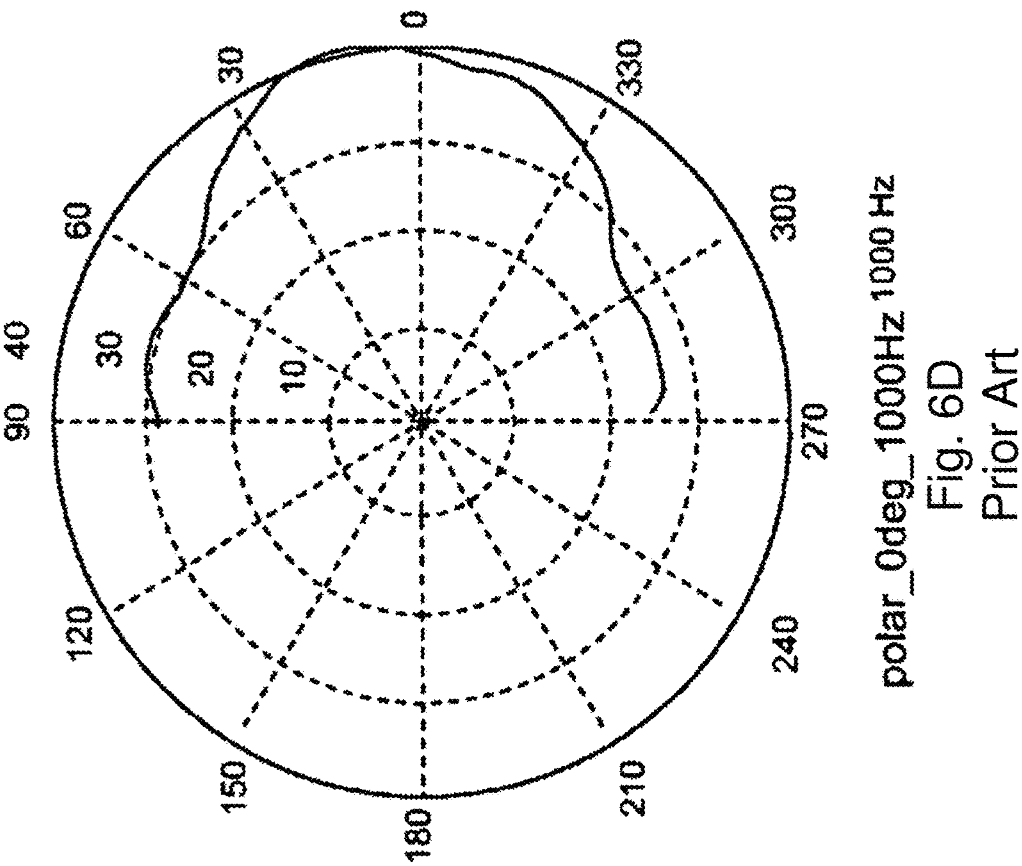
Fig. 6D Prior Art
Figure 6C:
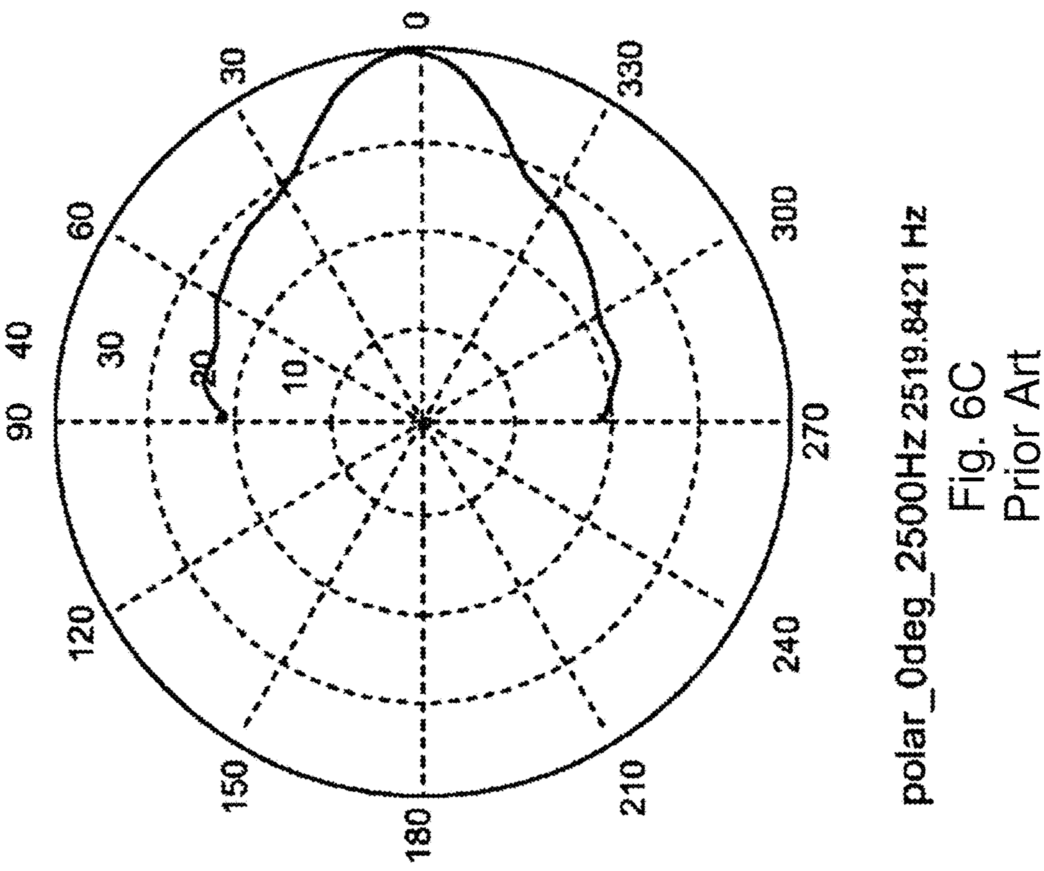
Fig. 6C Prior Art

FIG. 5 illustrates an alternative embodiment of the binaural mode signal processing chain of FIG. 4 which includes the use of optional components including a psychoacoustic bandwidth extension processor (PBEP) and a dynamic range compressor and expander (DRCE), which provides more sophisticated dynamic range and masking control, customization of filtering algorithms to particular environments, room equalization, and distance-based attenuation control.

The PBEP 112 allows the listener to perceive sound information contained in the lower part of the audio spectrum by generating higher frequency sound material, providing the perception of lower frequencies using higher frequency sound). Since the PBE processing is non-linear, it is important that it comes before the spatialization filters 104. If the non-linear PBEP block 112 is inserted after the spatial filters, its effect could severely degrade the creation of the sound beam. It is important to emphasize that the PBEP 112 is used in order to compensate (psycho-acoustically) for the poor directionality of the loudspeaker array at lower frequencies rather than compensating for the poor bass response of single loudspeakers themselves, as is normally done in prior art applications. The DRCE 114 in the DSP chain provides loudness matching of the source signals so that adequate relative masking of the output signals of the array 108 is preserved. In the binaural rendering mode, the DRCE used is a 2-channel block which makes the same loudness corrections to both incoming channels. As with the PBEP block 112, because the DRCE 114 processing is non-linear, it is important that it comes before the spatialization filters 104. If the non-linear DRCE block 114 were to be inserted after the spatial filters 104, its effect could severely degrade the creation of the sound beam. However, without this DSP block, psychoacoustic performance of the DSP chain and array may decrease as well.

Another optional component is a listener tracking device (LTD) 116, which allows the apparatus to receive information on the location of the listener(s) and to dynamically adapt the spatialization filters in real time. The LTD 116 may be a video tracking system which detects the listener's head movements or can be another type of motion sensing system as is known in the art. The LTD 116 generates a listener tracking signal which is input into a filter computation algorithm 118. The adaptation can be achieved either by re-calculating the digital filters in real time or by loading a different set of filters from a pre-computed database. Alternate user localization includes radar (e.g., heartbeat) or lidar tracking RFID/NFC tracking, breathsounds, etc.

FIGS. 6A-6E are polar energy radiation plots of the radiation pattern of a prototype array being driven by the DSP scheme operating in WFS mode at five different frequencies, 10,000 Hz, 5,000 Hz, 2,500 Hz, 1,000 Hz, and 600 Hz, and measured with a microphone array with the beams steered at 0 degrees.

Binaural Mode

The DSP for the binaural mode involves the convolution of the audio signal to be reproduced with a set of digital filters representing a Head-Related Transfer Function (HRTF).

Figure 7A:
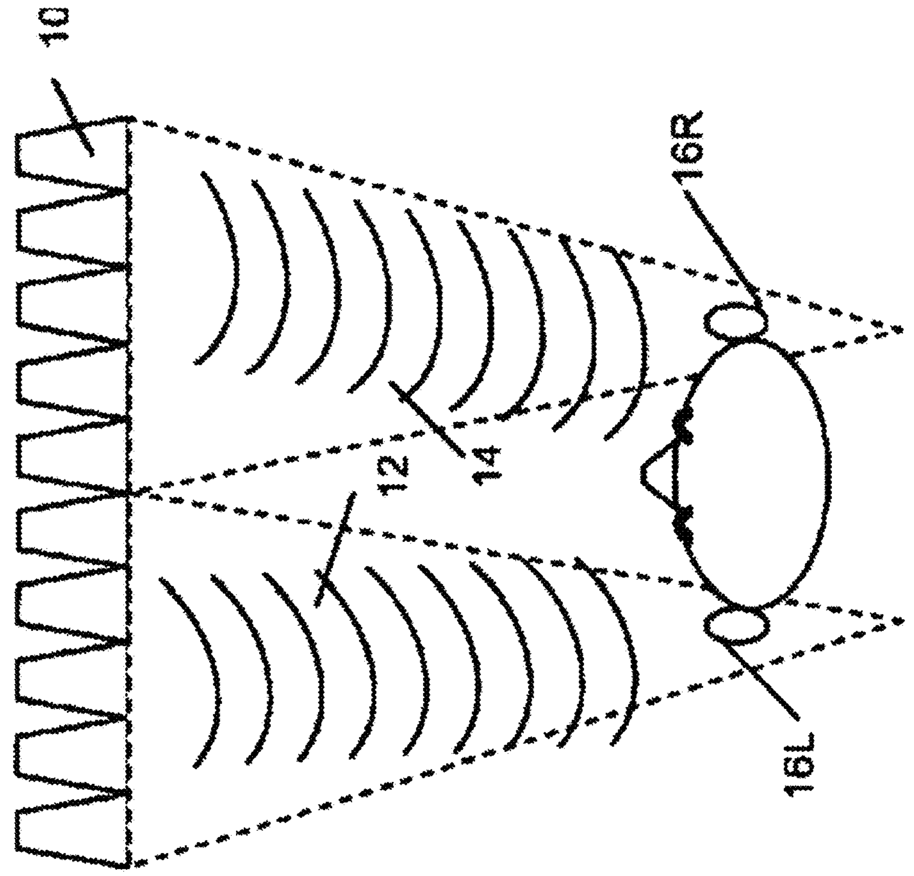
Fig. 7A Prior Art
FIG. 7A is a diagram illustrating the basic principle of binaural mode operation.
Figure 6E:
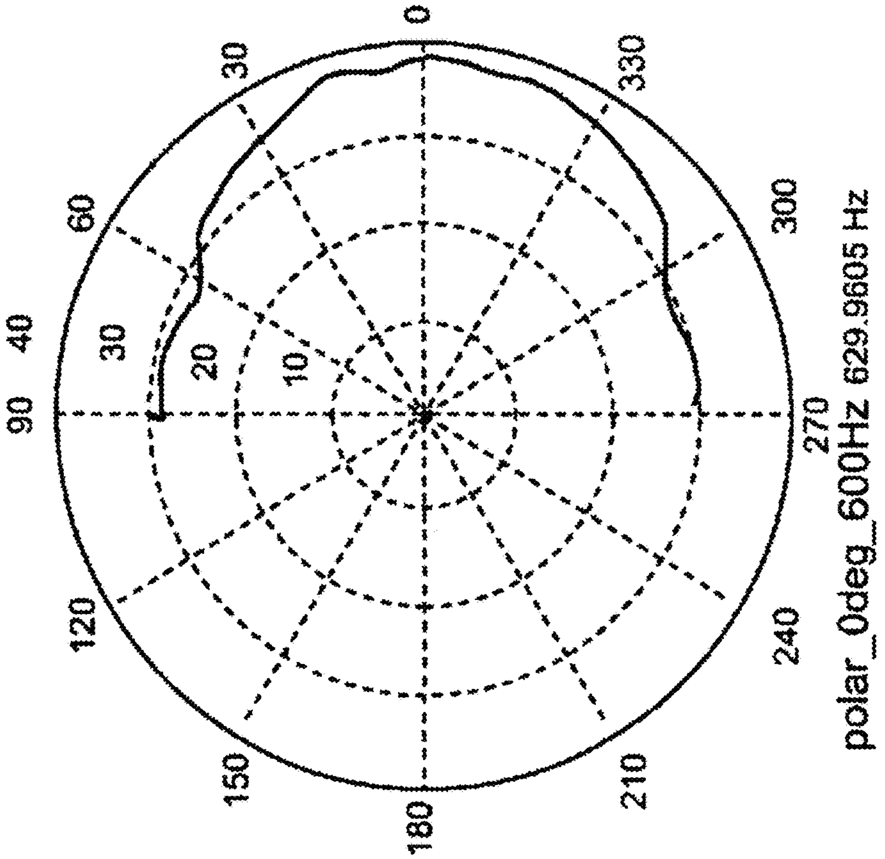
Fig. 6E Prior Art

FIG. 7A illustrates the underlying approach used in binaural mode operation, where an array of speaker locations 10 is defined to produce specially-formed audio beams 12 and 14 that can be delivered separately to the listener's ears 16L and 16R. Using this mode, cross-talk cancellation is inherently provided by the beams. However, this is not available after summing and presentation through a smaller number of speakers.

Figure 7B:
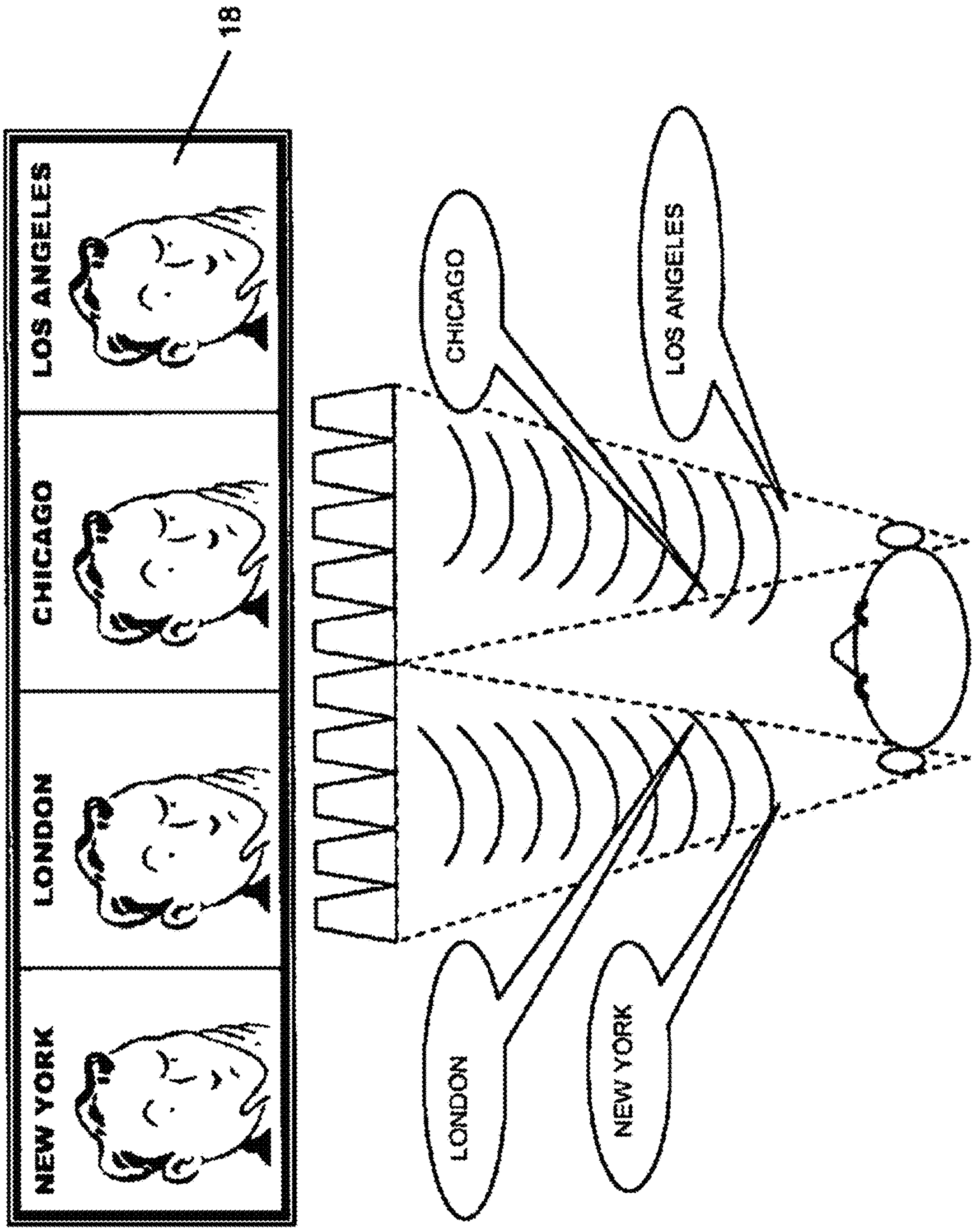
Fig. 7B Prior Art
FIG. 7B is a diagram illustrating binaural mode operation as used for spatialized sound presentation.

FIG. 7B illustrates a hypothetical video conference call with multiple parties at multiple locations. When the party located in New York is speaking, the sound is delivered as if coming from a direction that would be coordinated with the video image of the speaker in a tiled display 18. When the participant in Los Angeles speaks, the sound may be delivered in coordination with the location in the video display of that speaker's image. On-the-fly binaural encoding can also be used to deliver convincing spatial audio headphones, avoiding the apparent mis-location of the sound that is frequently experienced in prior art headphone set-ups.

Figure 8:
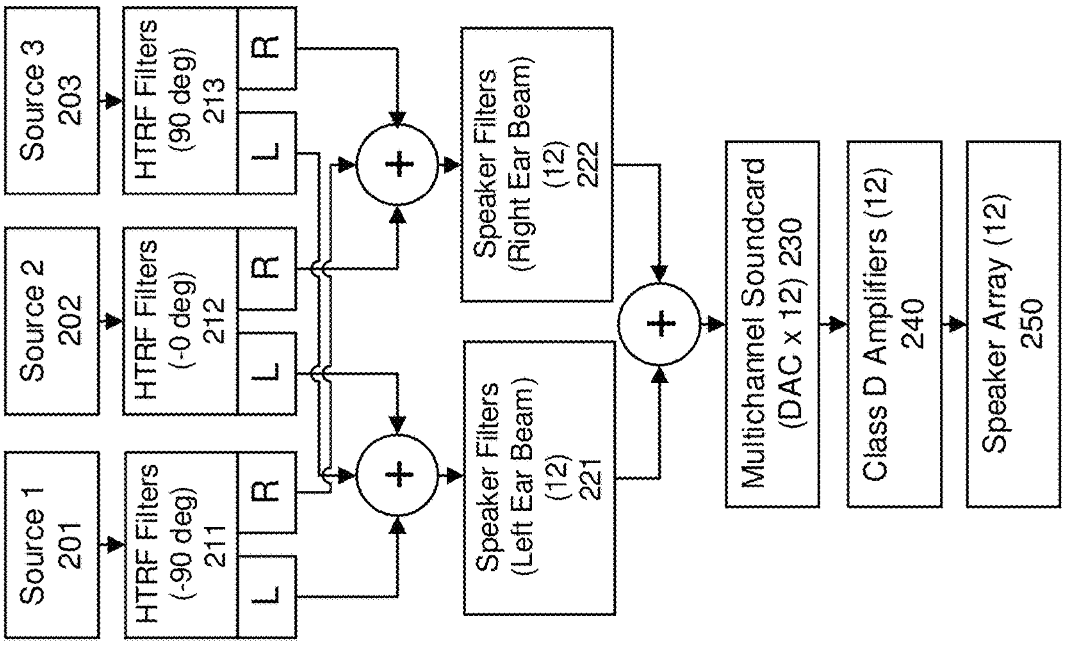
Fig. 8 Prior Art
FIG. 8 is a block diagram showing an exemplary binaural mode processing chain.

The binaural mode signal processing chain, shown in FIG. 8, consists of multiple discrete sources, in the illustrated example, three sources: sources 201, 202 and 203, which are then convolved with binaural Head Related Transfer Function (HRTF) encoding filters 211, 212 and 213 corresponding to the desired virtual angle of transmission from the nominal speaker location to the listener. There are two HRTF filters for each source—one for the left ear and one for the right ear. The resulting HRTF-filtered signals for the left ear are all added together to generate an input signal corresponding to sound to be heard by the listener's left ear. Similarly, the HRTF-filtered signals for the listener's right ear are added together. The resulting left and right ear signals are then convolved with inverse filter groups 221 and 222, respectively, with one filter for each virtual speaker element in the virtual speaker array. The virtual speakers are then combined into a real speaker signal, by a further time-space transform, combination, and limiting/peak abatement, and the resulting combined signal is sent to the corresponding speaker element via a multichannel sound card 230 and class D amplifiers 240 (one for each physical speaker) for audio transmission to the listener through speaker array 250.

In the binaural mode, the invention generates sound signals feeding a virtual linear array. The virtual linear array signals are combined into speaker driver signals. The speakers provide two sound beams aimed towards the primary listener's ears—one beam for the left ear and one beam for the right ear.

Figure 9:
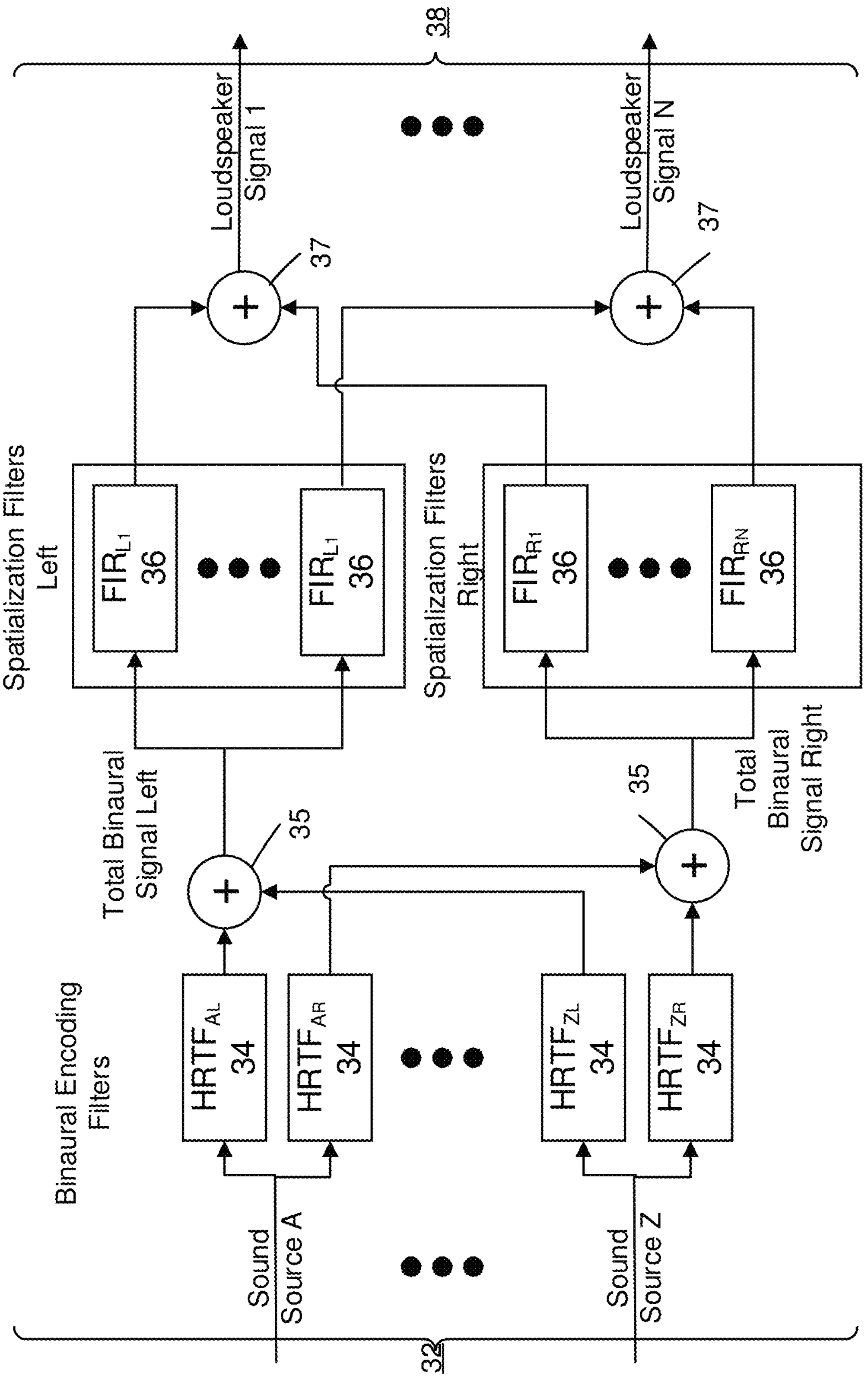
Fig. 9 Prior Art
FIG. 9 is a diagrammatic view of a first embodiment of a signal processing scheme for the binaural modality.

FIG. 9 illustrates the binaural mode signal processing scheme for the binaural modality with sound sources A through Z.

As described with reference to FIG. 8, the inputs to the system are a set of sound source signals 32 (A through Z) and the output of the system is a set of loudspeaker signals 38 (1 through N), respectively.

For each sound source 32, the input signal is filtered through two digital filters 34 (HRTF-L and HRTF-R) representing a left and right Head-Related Transfer Function, calculated for the angle at which the given sound source 32 is intended to be rendered to the listener. For example, the voice of a talker can be rendered as a plane wave arriving from 30 degrees to the right of the listener. The HRTF filters 34 can be either taken from a database or can be computed in real time using a binaural processor. After the HRTF filtering, the processed signals corresponding to different sound sources but to the same ear (left or right), are merged together at combiner 35 This generates two signals, hereafter referred to as "total binaural signal-left", or "TBS-L" and "total binaural signal-right" or "TBS-R" respectively.

Each of the two total binaural signals, TBS-L and TBS-R, is filtered through a set of N digital filters 36, one for each loudspeaker, computed using the algorithm disclosed below. These filters are referred to as "spatialization filters". It is emphasized for clarity that the set of spatialization filters for the right total binaural signal is different from the set for the left total binaural signal.

The filtered signals corresponding to the same $n^{th}$ virtual speaker but for two different ears (left and right) are summed together at combiners 37. These are the virtual speaker signals, which feed the combiner system, which in turn feed the physical speaker array 38.

Figure 10:
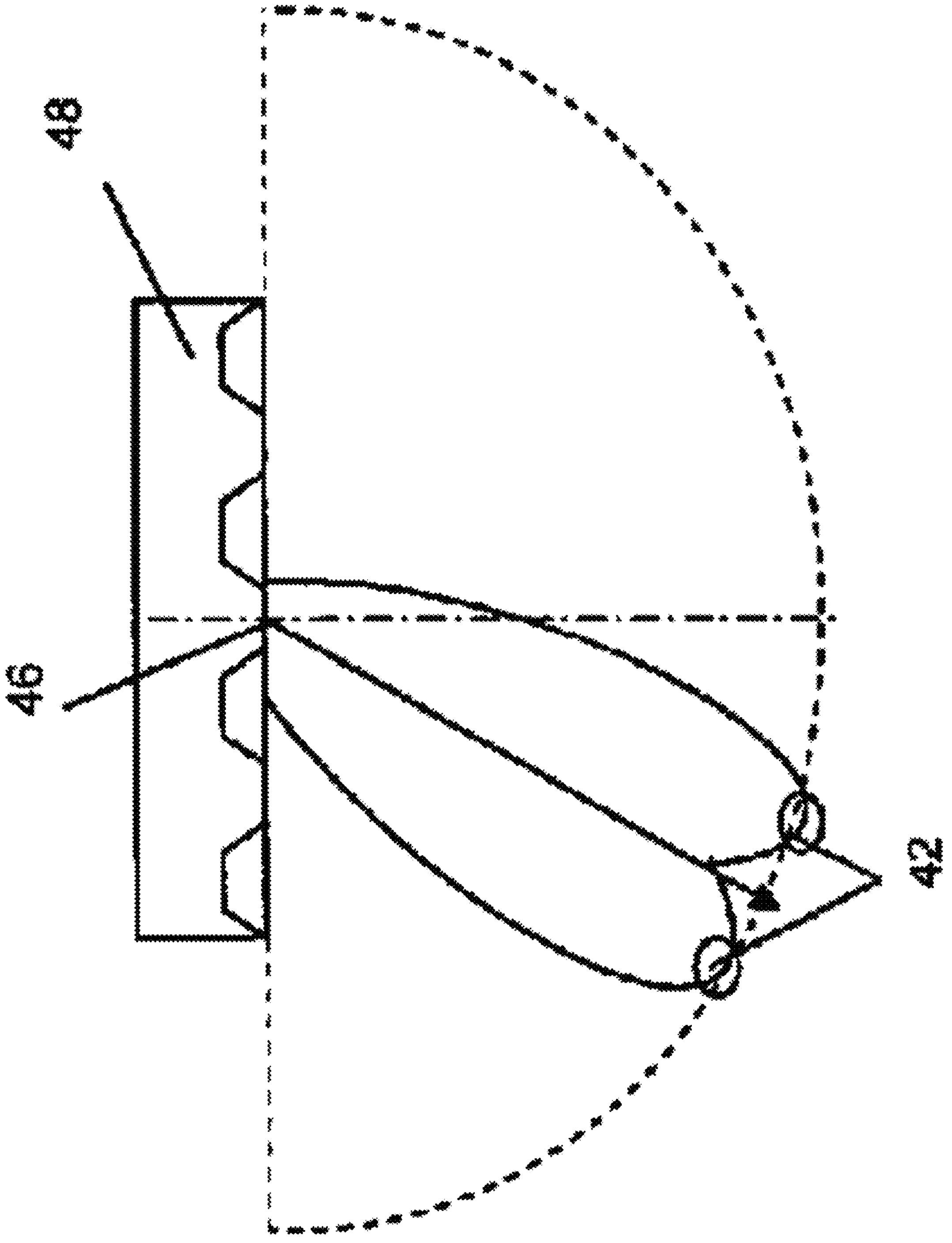
Fig. 10 Prior Art
FIG. 10 is a diagrammatic view of an exemplary arrangement of control points for binaural mode operation.

The algorithm for the computation of the spatialization filters 36 for the binaural modality is analogous to that used for the WFS modality described above. The main difference from the WFS case is that only two control points are used in the binaural mode. These control points correspond to the location of the listener's ears and are arranged as shown in FIG. 10. The distance between the two points 42, which represent the listener's ears, is in the range of 0.1 m and 0.3 m, while the distance between each control point and the center 46 of the loudspeaker array 48 can scale with the size of the array used, but is usually in the range between 0.1 m and 3 m.

The 2×N matrix H(f) is computed using elements of the electro-acoustical transfer functions between each loudspeaker and each control point, as a function of the frequency f. These transfer functions can be either measured or computed analytically, as discussed above. A 2-element vector p is defined. This vector can be either [1,0] or [0,1], depending on whether the spatialization filters are computed for the left or right ear, respectively. The filter coefficients for the given frequency f are the N elements of the vector a(f) computed by minimizing the following cost function:

$$J(f)=\|H(f)a(f)-p(f)\|^2+\beta\|a(f)\|^2.$$

If multiple solutions are possible, the solution is chosen that corresponds to the minimum value of the $L^2$ norm of a(f).

Figure 11:
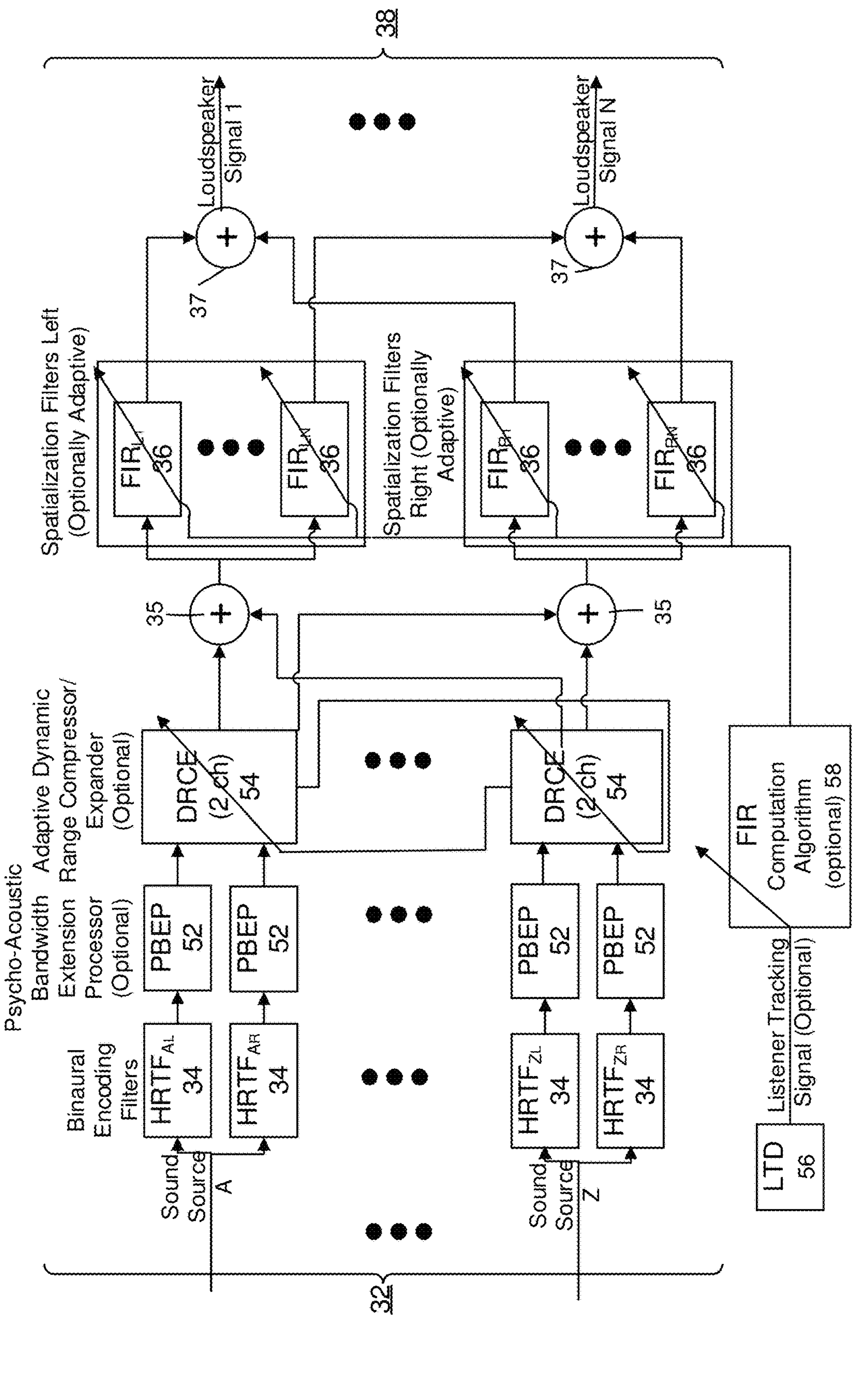
Fig. 11 Prior Art
FIG. 11 is a block diagram of a second embodiment of a signal processing chain for the binaural mode.

FIG. 11 illustrates an alternative embodiment of the binaural mode signal processing chain of FIG. 9 which includes the use of optional components including a psychoacoustic bandwidth extension processor (PBEP) and a dynamic range compressor and expander (DRCE). The PBEP 52 allows the listener to perceive sound information contained in the lower part of the audio spectrum by generating higher frequency sound material, providing the perception of lower frequencies using higher frequency sound). Since the PBEP processing is non-linear, it is important that it comes before the spatialization filters 36. If the non-linear PBEP block 52 is inserted after the spatial filters, its effect could severely degrade the creation of the sound beam.

It is important to emphasize that the PBEP 52 is used in order to compensate (psycho-acoustically) for the poor directionality of the loudspeaker array at lower frequencies rather than compensating for the poor bass response of single loudspeakers themselves.

The DRCE 54 in the DSP chain provides loudness matching of the source signals so that adequate relative masking of the output signals of the array 38 is preserved. In the binaural rendering mode, the DRCE used is a 2-channel block which makes the same loudness corrections to both incoming channels.

As with the PBEP block 52, because the DRCE 54 processing is non-linear, it is important that it comes before the spatialization filters 36. If the non-linear DRCE block 54 were to be inserted after the spatial filters 36, its effect could severely degrade the creation of the sound beam. However, without this DSP block, psychoacoustic performance of the DSP chain and array may decrease as well.

Another optional component is a listener tracking device (LTD) 56, which allows the apparatus to receive information on the location of the listener(s) and to dynamically adapt the spatialization filters in real time. The LTD 56 may be a video tracking system which detects the listener's head movements or can be another type of motion sensing system as is known in the art. The LTD 56 generates a listener tracking signal which is input into a filter computation algorithm 58. The adaptation can be achieved either by re-calculating the digital filters in real time or by loading a different set of filters from a pre-computed database.

Figure 12A:
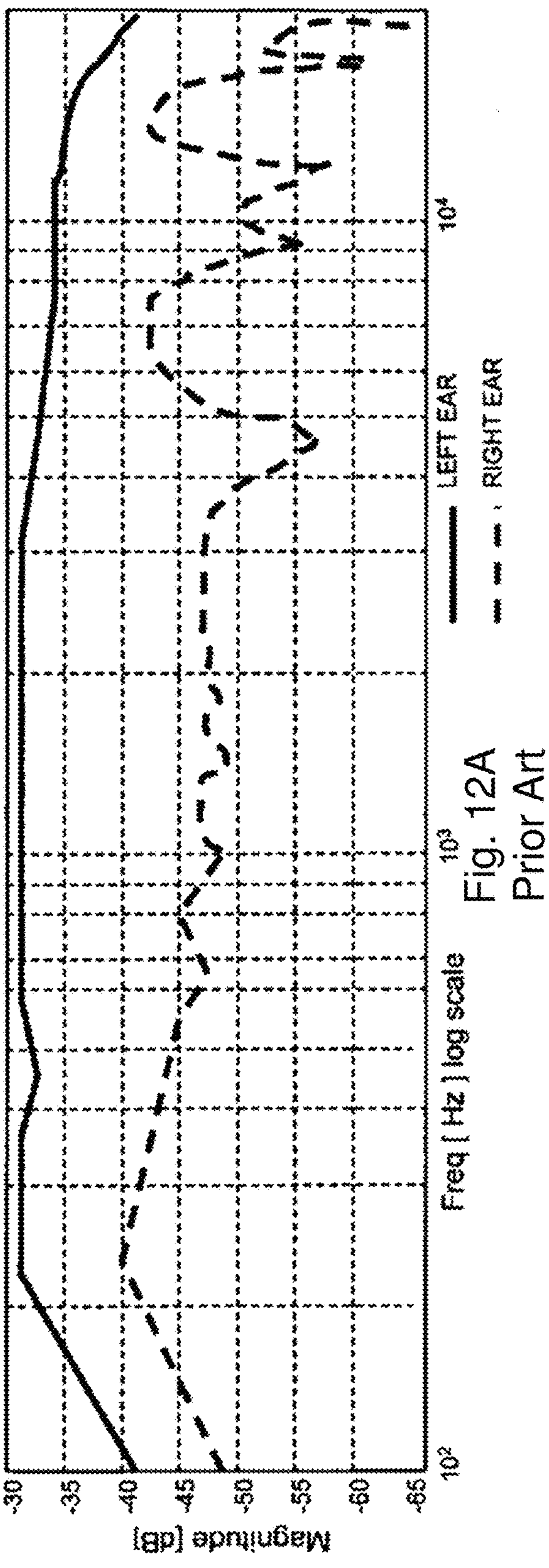
Fig. 12A Prior Art
FIGS. 12A and 12B illustrate simulated frequency domain and time domain representations, respectively, of predicted performance of an exemplary speaker array in binaural mode measured at the left ear and at the right ear.
Figure 12B:
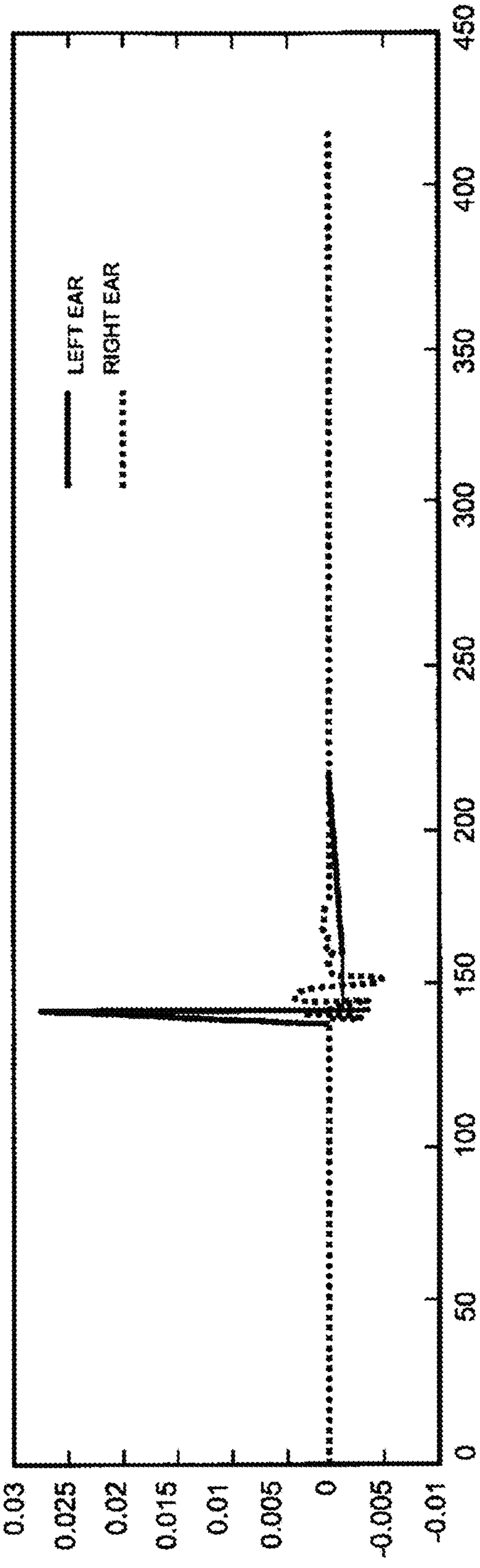
Fig. 12B Prior Art
Figure 13:
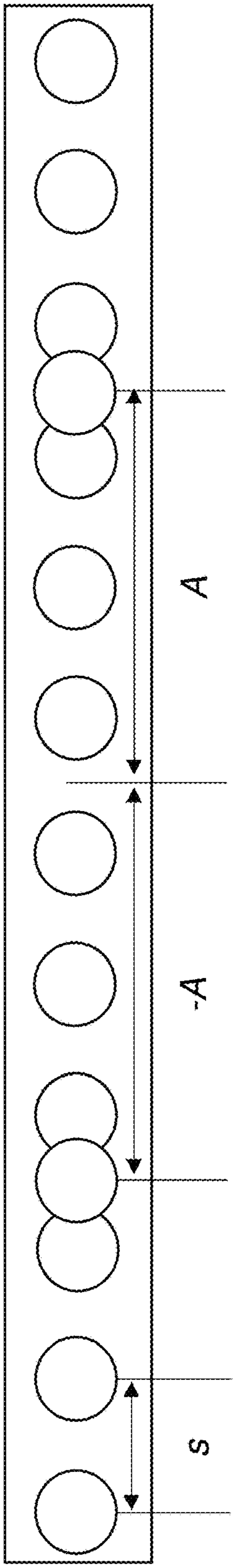
FIG. 13 shows the relationship between the virtual speaker array and the physical speakers.

FIGS. 12A and 12B illustrate the simulated performance of the algorithm for the binaural modes. FIG. 12A illustrates the simulated frequency domain signals at the target locations for the left and right ears, while FIG. 12B shows the time domain signals. Both plots show the clear ability to target one ear, in this case, the left ear, with the desired signal while minimizing the signal detected at the listener's right ear.

WFS and binaural mode processing can be combined into a single device to produce total sound field control. Such an approach would combine the benefits of directing a selected sound beam to a targeted listener, e.g., for privacy or enhanced intelligibility, and separately controlling the mixture of sound that is delivered to the listener's ears to produce surround sound. The device could process audio using binaural mode or WFS mode in the alternative or in combination. Although not specifically illustrated herein, the use of both the WFS and binaural modes would be represented by the block diagrams of FIG. 5 and FIG. 11, with their respective outputs combined at the signal summation steps by the combiners 37 and 106. The use of both WFS and binaural modes could also be illustrated by the combination of the block diagrams in FIG. 2 and FIG. 8, with their respective outputs added together at the last summation block immediately prior to the multichannel soundcard 230.

Example 1

A 12-channel spatialized virtual audio array is implemented in accordance with U.S. Pat. No. 9,578,440. This virtual array provides signals for driving a linear or curvilinear equally-spaced array of e.g., 12 speakers situated in front of a listener. The virtual array is divided into two or four. In the case of two, the "left" e.g., 6 signals are directed to the left physical speaker, and the "right" e.g., 6 signals are directed to the right physical speaker. The virtual signals are to be summed, with at least two intermediate processing steps.

The first intermediate processing step compensates for the time difference between the nominal location of the virtual speaker and the physical location of the speaker transducer. For example, the virtual speaker closest to the listener is assigned a reference delay, and the further virtual speakers are assigned increasing delays. In a typical case, the virtual array is situated such that the time differences for adjacent virtual speakers are incrementally varying, though a more rigorous analysis may be implemented. At a 48 kHz sampling rate, the difference between the nearest and furthest virtual speaker may be, e.g., 4 cycles.

The second intermediate processing step limits the peaks of the signal, in order to avoid over-driving the physical speaker or causing significant distortion. This limiting may be frequency selective, so only a frequency band is affected by the process. This step should be performed after the delay compensation. For example, a compander may be employed. Alternately, presuming only rare peaking, a simple limited may be employed. In other cases, a more complex peak abatement technology may be employed, such as a phase shift of one or more of the channels, typically based on a predicted peaking of the signals which are delayed slightly from their real-time presentation. Note that this phase shift alters the first intermediate processing step time delay; however, when the physical limit of the system is reached, a compromise is necessary.

With a virtual line array of 12 speakers, and 2 physical speakers, the physical speaker locations are between elements 3-4 and 9-10. If (s) is the center-to-center distance between speakers, then the distance from the center of the array to the center of each real speaker is: A=3s. The left speaker is offset −A from the center, and the right speaker is offset A.

The second intermediate processing step is principally a downmix of the six virtual channels, with a limiter and/or compressor or other process to provide peak abatement, applied to prevent saturation or clipping. For example, the left channel is:

$$L_{out}=\text{Limit}(L_1+L_2+L_3+L_4+L_5+L_6)$$

and the right channel is:

$$R_{out}=\text{Limit}(R_1+R_2+R_3+R_4+R_5+R_6)$$

Before the downmix, the difference in delays between the virtual speakers and the listener's ears, compared to the physical speaker transducer and the listener's ears, need to be taken into account. This delay can be significant particularly at higher frequencies, since the ratio of the length of the virtual speaker array to the wavelength of the sound increases. To calculate the distance from the listener to each virtual speaker, assume that the speaker, n, is numbered 1 to 6, where 1 is the speaker closest to the center, and 6 is the farthest from center. The distance from the center of the array to the speaker is: d=((n−1)+0.5)*s. Using the Pythagorean theorem, the distance from the speaker to the listener can be calculated as follows:

$$d_n=\sqrt{l^2+(((n-1)+0.5)*s)^2}.$$

The distance from the real speaker to the listener is:

$$d_r=\sqrt{l^2+(3*s)^2}.$$

The system, in this example, is intended to deliver spatialized audio to each of two listeners within the environment. A radar sensor, e.g., a Vayyar 60 GHz sensor is used to locate the respective listeners. venturebeat.com/2018/05/02/vayyar-unveils-a-new-sensor-for-capturing-your-life-in-3d/. Various types of analysis can be performed to determine which objects represent people, versus inanimate objects, and for the people, what the orientation of their heads are. For example, depending on power output and proximity, the radar can detect heartbeat (and therefore whether the person is face toward or away from the sensor for a person with normal anatomy). Limited degrees of freedom of limbs and torso can also assist in determining anatomical orientation, e.g., limits on joint flexion. With localization of the listener, the head location is determined, and based on the orientation of the listener, the location of the ears inferred. Therefore, using a generic HRTF and inferred ear location, spatialized audio can be directed to a listener. For multiple listeners, the optimization is more complex, but based on the same principles. The acoustic signal to be delivered at a respective ear of a listener is maximized with acceptable distortion, while minimizing perceptible acoustic energy at the other ears, and the ears of other listeners. A perception model may be imposed to permit non-obtrusive white or pink noise, in contrast to voice, narrowband or harmonic sounds, which may be perceptually intrusive.

The SLAM sensor also permits modelling of the inanimate objects, which can reflect or absorb sound. Therefore, both direct line-of sight paths from the transducers to the ear(s) and reflected/scattered paths can be employed within the optimization. The SLAM sensor permits determination of static objects and dynamically moving objects, and therefore permits the algorithm to be updated regularly, and to be reasonably accurate for at least the first reflection of acoustic waves between the transducer array and the listeners.

The sample delay for each speaker can be calculated by the different between the two listener distances. This can them be converted to samples (assuming the speed of sound is 343 m/s and the sample rate is 48 kHz:

$$\text{delay} = \frac{(d_n - d_r)}{343\ \frac{\text{m}}{\text{s}}} * 48000\ \text{Hz}.$$

This can lead to a significant delay between listener distances. For example, if the virtual array inter-speaker distance is 38 mm, and the listener is 500 mm from the array, the delay from the virtual far-left speaker (n=6) to the real speaker is:

$$d_n = \sqrt{.5^2 + (5.5 * .038)^2} = .541\ \text{m}$$

$$d_r = \sqrt{.5^2 + (3 * .038)^2} = .513\ \text{m}$$

$$\text{delay} = \frac{.541 - .512}{343} * 48000 = 4\ \text{samples}.$$

At higher audio frequencies, i.e., 12 kHz an entire wave cycle is 4 samples, to the difference amounts to a 3600 phase shift. See Table 1.

Thus, when combining the signals for the virtual speakers into the physical speaker signal, the time offset is preferably compensated based on the displacement of the virtual speaker from the physical one. The time offset may also be accomplished within the spatialization algorithm, rather than as a post-process.

Example 2

Figure 14:
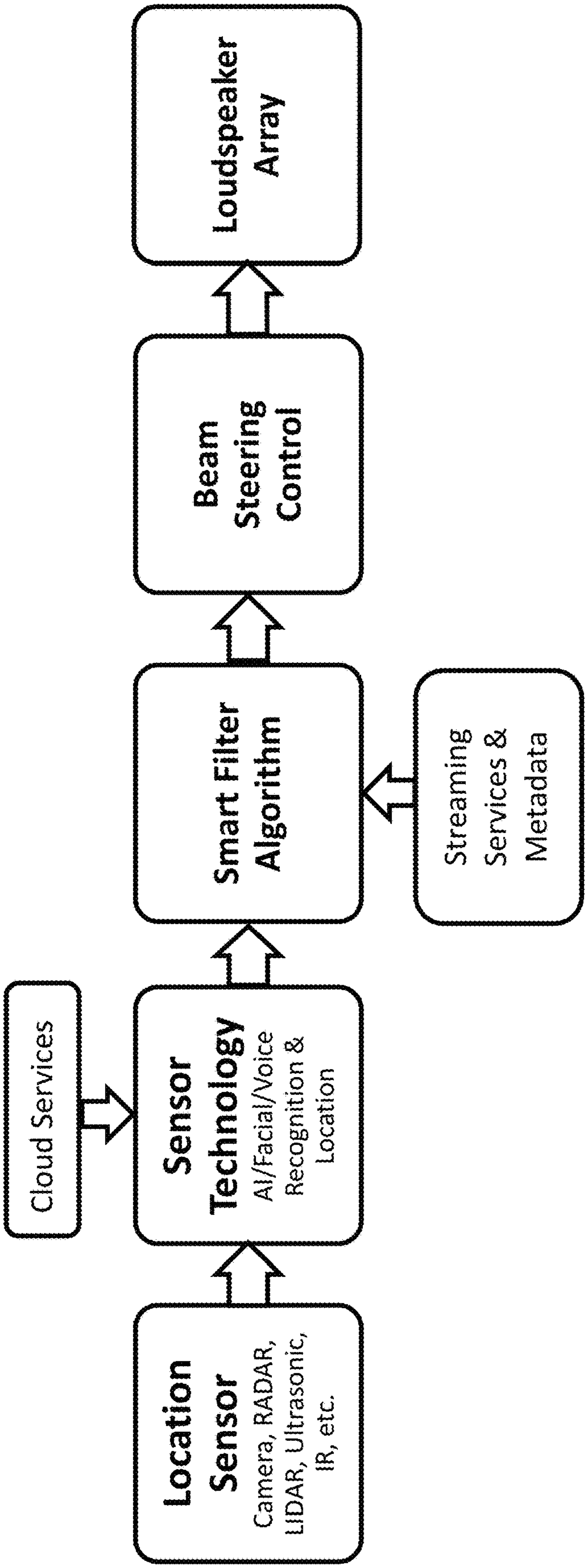
FIG. 14 shows a schematic representation of a spatial sensor-based spatialized audio adaptation system.

FIG. 14 demonstrates the control flow for using intelligent spatial sensor technology in a spatialized audio system. The sensor detects the location of listeners around the room. This information is passed to an AI/facial recognition component, which determines how best to present the audio to those listeners. This may involve the use of cloud services for processing. The cloud services are accessed through a network communication port via the Internet. The processing for determining how best to present 3D sound to each listener, to increase the volume to specific listeners (e.g., hearing-impaired listeners), or other effects based on the user's preferences, may be performed locally within a sound bar or its processor, remotely in a server or cloud system, or in a hybrid architecture spanning both. The communication may be wired or wireless (e.g., WiFi or Bluetooth).

Incoming streaming audio may contain metadata that the intelligent loudspeaker system control would use for automated configuration. For example, 5.1 or 7.1 surround sound from a movie would invoke the speaker to produce a spatialized surround mode aimed at the listener(s) (single, double or triple binaural beams). If the audio stream were instead a news broadcast, the control could auto-select Mono Beaming mode (width of beam dependent of listener(s) position) plus the option to add speech enhancement equalization; or a narrow high sound pressure level beam could be aimed at a listener who is hard of hearing (with or without equalization) and a large portion of the room could be 'filled' with defined wavefield synthesis derived waves (e.g., a "Stereo Everywhere" algorithm). Numerous configurations are possible by modifying speaker configuration parameters such as filter type (narrow, wide, asymmetrical, dual/triple beams, masking, wave field synthesis), target distance, equalization, head-related transfer function, lip sync delay, speech enhancement equalization, etc. Furthermore, a listener could enhance a specific configuration by automatically enabling bass boost in the case of a movie or game, but disabling it in the case of a newscast or music.

The type of program may be determined automatically or manually. In a manual implementation, the user selects a mode through a control panel, remote control, speech recognition interface, or the like. FIG. 14 shows that the smart filter algorithm may also receive metadata, which may be, for example, a stream of codes which accompany the media, which define a target sonic effect or sonic type, over a range of changing circumstances. Thus, in a movie, different scenes or implied sound sources may encode different sonic effects. It is noted that these cannot be directly or simply encoded in the source media, as the location and/or acoustic environment is not defined until the time of presentation, and different recipients will have different environments. Therefore, a real-time spatialization control system is employed, which receives a sensor signal or signals defining the environment of presentation and listener location, to modify the audio program in real time to optimize the presentation. It is noted that the same sensors may also be used to control a 3D television presentation to ensure proper image parallax at viewer locations. The sensor data may be a visual image type, but preferably, the sensors do not capture visual image data, which minimizes the privacy risk if that data is communicated outside of the local control system. As such, the sensor data, or a portion thereof, may be communicated to a remote server or for cloud processing with consumer acceptance. The remote or cloud processing allows application of a high level of computational complexity to map the environment, including correlations of the sensor data to acoustic interaction. This process may not be required continuously, but may be updated periodically without explicit user interaction.

The sensor data may also be used for accounting, marketing/advertising, and other purposes independent of the optimization of presentation of the media to a listener. For example, a fine-grained advertiser cost system may be implemented, which charges advertisers for advertisements that were listened to, but not for those in which no awake listener was available. The sensor data may therefore convey listener availability and sleep/wake state. The sleep/wake state may be determined by movement, or in some cases, by breathing and heart rate. The sensor may also be able to determine the identity of listeners, and link the identity of the listener to their demographics or user profile. The identity may therefore be used to target different ads to different viewing environments, and perhaps different audio programs to different listeners. For example, it is possible to target different listeners with different language programs if they are spatially separated. Where multiple listeners are in the same environment, a consensus algorithm may optimize a presentation of a program for the group, based on the identifications and in some cases their respective locations.

Generally, the beam steering control may be any spatialization technology, though the real-time sensor permits modification of the beam steering to in some cases reduce complexity where it is unnecessary, with a limiting case being no listener present, and in other cases, a single listener optimally located for simple spatialized sound, and in other cases, higher complexity processing, for example multiple listeners receiving qualitatively different programs. In the latter case, processing may be offloaded to a remote server or cloud, permitting use of a local control that is computationally less capable than a "worst case" scenario.

The loudspeaker control preferably receives far field inputs from a microphone or microphone array, and performs speech recognition on received speech in the environment, while suppressing response to media-generated sounds. The speech recognition may be Amazon Alexa, Microsoft Cortana, Hey Google, or the loke, or may be a proprietary platform. For example, since the local control includes a digital signal processor, a greater portion of the speech recognition, or the entirety of the speech recognition, may be performed locally, with processed commands transmitted remotely as necessary. This same microphone array may be used for acoustic tuning of the system, including room mapping and equalization, listener localization, and ambient sound neutralization or masking.

Once the best presentation has been determined, the smart filter generation uses techniques similar to those described above, and otherwise known in the art, to generate audio filters that will best represent the combination of audio parameters effects for each listener. These filters are then uploaded to a processor the speaker array for rendering, if this is a distinct processor.

Content metadata provided by various streaming services can be used to tailor the audio experience based on the type of audio, such as music, movie, game, and so on, and the environment in which it is presented, and in some cases based on the mood or state of the listener. For example, the metadata may indicate that the program is an action movie. In this type of media, there are often high intensity sounds intended to startle, and may be directional or non-directional. For example, the changing direction of a moving car may be more important than accuracy of the position of the car in the soundscape, and therefore the spatialization algorithm may optimize the motion effect over the positional effect. On the other hand, some sounds, such as a nearby explosion, may be non-directional, and the spatialization algorithm may instead optimize the loudness and crispness over spatial effects for each listener. The metadata need not be redefined, and the content producer may have various freedom over the algorithm(s) employed.

Thus, according to one aspect, the desired left and right channel separation for a respective listener is encoded by metadata associated with the a media presentation. Where multiple listeners are present, the encoded effect may apply for each listener, or may be encoded to be different for different listeners. A user preference profile may be provided for a respective listener, which then presents the media. According to the user preferences, in addition to the metadata. For example, a listener, may have different hearing response in each ear, and the preference may be to normalize the audio for the listener response. In other cases, different respective listeners may have different preferred sound separation. Indicated by their preference profile. According to another embodiment, the metadata encodes a "type" of media, and the user profile maps the media type to a user-preferred spatialization effect or spatialized audio parameters.

As discussed above, the spatial location sensor has two distinct functions: location of persons and objects for the spatialization process, and user information which can be passed to a remote service provider. The remote service provider can then use the information, which includes the number and location of persons (and perhaps pets) in the environment proximate to the acoustic transducer array, as well as their poses, activity state, response to content, etc. and may include inanimate objects. The local system and/or remote service provider may also employ the sensor for interactive sessions with users (listeners), which may be games (similar to Microsoft Xbox with Kinect, or Nintendo Wii), exercise, or other types of interaction.

Preferably, the spatial sensor is not a camera, and as such, the personal privacy issues raised by having such a sensor with remote communication capability. The sensor may be a radar (e.g., imaging radar, MIMO WiFi radar [WiVi, WiSee]), lidar, Microsoft Kinect sensor (includes cameras), ultrasonic imaging array, camera, infrared sensing array, passive infrared sensor, or other known sensor.

The spatial sensor may determine a location of a listener in the environment, and may also identify a respective listener. The identification may be based on video pattern recognition in the case of a video imager, a characteristic backscatter in the case of radar or radio frequency identification, or other known means. Preferably the system does not provide a video camera, and therefore the sensor data may be relayed remotely for analysis and storage, without significant privacy violation. This, in turn, permits mining of the sensor data, for use in marketing, and other purposes, with low risk of damaging misuse of the sensor data.

The invention can be implemented in software, hardware or a combination of hardware and software. The invention can also be embodied as computer readable code on a computer readable medium. The computer readable medium can be any data storage device that can store data which can thereafter be read by a computing device. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A spatialized sound system, comprising: a non-visual imaging spatial sensor comprising a radar sensor having an antenna array, configured to determine a head location and orientation of at least one listener in an environment with respect to an audio transducer array without producing a visual image of the at least one listener; a signal processor configured to: transform a received audio program according to a spatialization model and a head-related transfer function based on the determined head location and orientation of the at least one listener in an environment; and generate an array of audio transducer signals for the audio transducer array based on the transformed audio program representing spatialized audio; and a network port configured to communicate the determined head location and orientation of the at least one listener in the environment with respect to the audio transducer array to a remote server.

2. The spatialized sound system according to claim 1, wherein the non-visual imaging spatial sensor comprises the radar sensor operating in the 60 GHz band.

3. The spatialized sound system according to claim 1, wherein the antenna array comprises a patch antenna.

4. The spatialized sound system according to claim 1, wherein the non-visual imaging spatial sensor is further configured to determine characteristics of an object in the environment, and the signal processor is further configured to compensate the transformed audio program for scattering of the spatialized audio by the object.

5. The spatialized sound system according to claim 1, wherein the non-visual imaging spatial sensor is further configured to determine characteristics of an object in the environment, and the signal processor is further configured to compensate the transformed audio program for attenuation or absorption of the spatialized audio by the object.

6. The spatialized sound system according to claim 1, wherein the non-visual imaging spatial sensor is further configured to determine characteristics of an object in the environment, and the signal processor is further configured to compensate the transformed audio program for absorption reflection of the spatialized audio by the object.

7. The spatialized sound system according to claim 1, wherein the signal processor is further configured to determine a body pose of the at least one listener.

8. The spatialized sound system according to claim 1, wherein the signal processor is further configured to determine presence of at least two different listeners, and to deliver a qualitatively different audio program to each respective listener.

9. The spatialized sound system according to claim 1, further comprising a microphone array configured to receive audio feedback, wherein the spatialization model parameters are further dependent on the audio feedback, and wherein the signal processor is further configured to conduct a speech interaction with the at least one listener through the microphone array and spatialized audio.

10. The spatialized sound system according to claim 1, wherein the signal processor is further configured to detect an acoustically reflective object in the environment, and to direct sound from the audio transducer array to reflect off the acoustically reflective object to an ear of the listener.

11. The spatialized sound system according to claim 10, wherein the signal processor is further configured to transform each of a first audio program and a second audio program according to the spatialization model dependent on the acoustically reflective object, to generate the array of audio transducer signals for the audio transducer array representing the spatialized audio to deliver the first audio program to the first listener while suppressing the second audio program at the location of the first listener, and to deliver the second audio program to the second listener while suppressing the first audio program at the location of the second listener, selectively dependent on respective locations and head-related transfer functions for the first listener and the second listener, and the acoustically reflective object.

12. The spatialized sound system according to claim 1, further comprising at least one automated processor configured to track movements of the at least one listener during a presentation of the received audio program to the at least one listener.

13. The spatialized sound system according to claim 1, wherein the array of audio transducers signals comprises an equally spaced array of at least four audio transducers.

14. A spatialized sound method, comprising: determining a head location and orientation of at least one listener in an environment with respect to an audio transducer array using a non-visual imaging spatial radar sensor comprising an antenna array; transforming a received audio program according to a spatialization model and a head-related transfer function with a signal processor, based on the determined head location and orientation of the at least one listener in an environment; generating an array of audio transducer signals for the audio transducer array based on the transformed audio program representing spatialized audio; and communicating the determined head location and orientation of the at least one listener in the environment with respect to the audio transducer array to a remote server.

15. The spatialized sound method according to claim 14, wherein the non-visual imaging spatial sensor does not capture listener-identifying information.

16. The spatialized sound method according to claim 14, wherein the antenna array comprises a patch antenna.

17. The spatialized sound method according to claim 14, further comprising determining characteristics of an object in the environment with the non-visual imaging spatial sensor, and compensating the transformed audio program for the determined characteristics of the object.

18. The spatialized sound method according to claim 14, further comprising determining a body pose of the at least one listener, and communicating the determined body pose to the remote server.

19. The spatialized sound method according to claim 14, further comprising:

- determining the head location and orientation at least two different listeners;
- delivering a different audio program to each of the at least two listeners; and
- conducting a speech interaction with at least one listener through a microphone array and the spatialized audio.

20. A spatialized sound system, comprising: a housing having a transducer array comprising at least four independently controlled audio transducers; a non-optical imaging spatial radar sensor within the housing comprising an antenna array, configured to determine a head location and orientation of at least one listener, and location and characteristics of at least one object in an environment with respect to the housing; an audio signal processor within the housing, configured to transform a received audio program according to a spatialization model, and a head-related transfer function based on at least the determined head location and orientation of the at least one listener, and the location and characteristics of the at least one object in the environment with respect to an audio transducer array; and an amplifier within the housing, configured to generate an array of audio transducer signals for the audio transducer array based on the transformed audio program representing spatialize audio and a network interface configured to communicate nonpersonally identifying information relating to a pose of the at least one listener to a remote server.

* * * * *